(12) United States Patent
Itou et al.

(10) Patent No.: US 9,160,238 B2
(45) Date of Patent: Oct. 13, 2015

(54) POWER CONVERTER WITH CURRENT FEEDBACK LOOP

(71) Applicant: DENSO CORPORATION, Kariya, Aichi-pref. (JP)

(72) Inventors: Hideki Itou, Toyokawa (JP); Norihito Kimura, Hekinan (JP); Yuji Hayashi, Kasugai (JP)

(73) Assignee: DENSO CORPORATION, Kariya (JP)

( * ) Notice: Subject to any disclaimer, the term of this patent is extended or adjusted under 35 U.S.C. 154(b) by 75 days.

(21) Appl. No.: 14/160,704

(22) Filed: Jan. 22, 2014

(65) Prior Publication Data

US 2014/0204617 A1 Jul. 24, 2014

(30) Foreign Application Priority Data

Jan. 22, 2013 (JP) .................. 2013-009207

(51) Int. Cl.
*H02M 3/335* (2006.01)
*H02M 7/5387* (2007.01)
*H02M 3/156* (2006.01)

(52) U.S. Cl.
CPC .......... *H02M 3/33507* (2013.01); *H02M 3/156* (2013.01); *H02M 7/53871* (2013.01)

(58) Field of Classification Search
CPC ............ H02M 3/335; H02M 3/33507; H02M 3/33515; H02M 7/5387; H02M 7/53871; H02M 7/53873

USPC .......... 363/15–17, 97, 98, 131, 132
See application file for complete search history.

(56) References Cited

U.S. PATENT DOCUMENTS

| 7,515,446 B2 * | 4/2009 | Lin ................................ 363/98 |
| 7,660,135 B2 * | 2/2010 | Fang ............................... 363/17 |
| 2011/0188267 A1 * | 8/2011 | Lai et al. ......................... 363/17 |
| 2014/0198537 A1 * | 7/2014 | Kimura et al. ................... 363/17 |

FOREIGN PATENT DOCUMENTS

JP 2009-118571 5/2009

* cited by examiner

*Primary Examiner* — Gary L Laxton
(74) *Attorney, Agent, or Firm* — Nixon & Vanderhye P.C.

(57) ABSTRACT

In a power converter, a deviation calculator calculates, in each cycle, a deviation between a value of an input electrical parameter of a switch circuit and a target value selected by a selector in a previous cycle. The input electrical parameter depends on the input power to the switch circuit. A second calculator calculates, in each cycle, a value of a second feedback controlled variable such that the value of the second feedback variable approaches the value of the input electrical parameter. A controller controls, in each cycle, the selector to select one of the value of the first feedback controlled variable and the value of the second feedback controlled variable as the target value for the next cycle according to the deviation calculated by the deviation calculator.

15 Claims, 20 Drawing Sheets

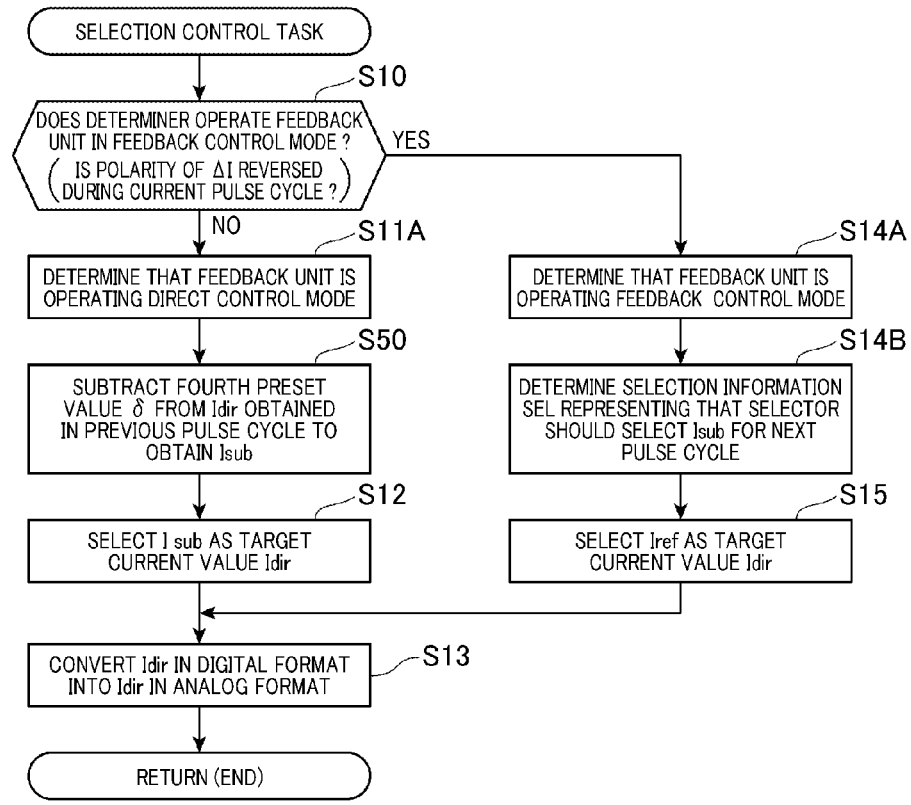
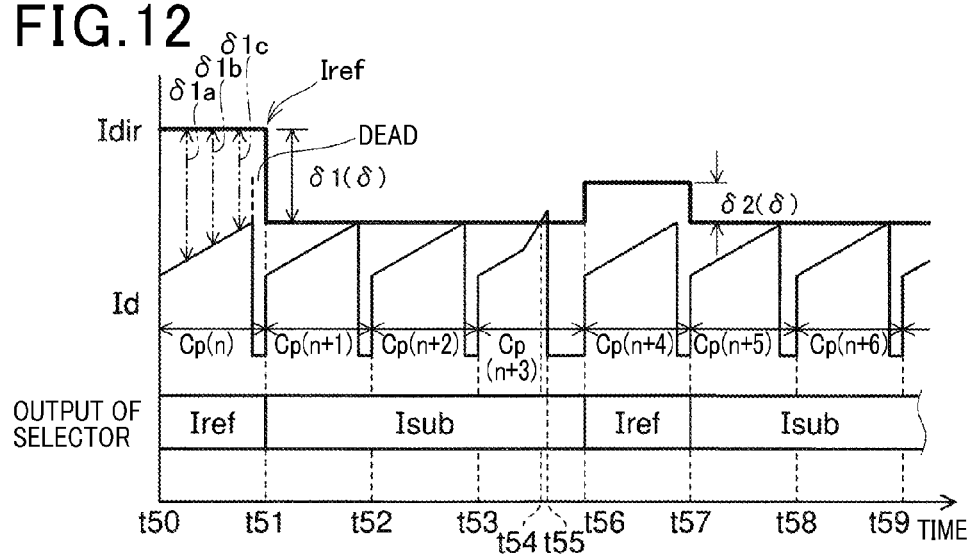

POWER CONVERTER WITH CURRENT FEEDBACK LOOP

CROSS REFERENCE TO RELATED APPLICATIONS

This application is based on and claims the benefit of priority from Japanese Patent Application 2013-009207 filed on Jan. 22, 2013, the disclosure of which is incorporated in its entirety herein by reference.

TECHNICAL FIELD

The present disclosure relates to power converters having a current feedback loop.

BACKGROUND

DC-DC converters, as an example of power converters, are often used in electronic devices, electronic systems, and the like. DC-DC converters normally use a switch circuit comprised of switching elements and an inductor, and perform on-off control of the switching elements to convert, via the switching elements and inductor, an input DC voltage into an output DC voltage different from the input DC voltage.

These DC-DC converters are classified broadly into voltage-mode control DC-DC converters and current-mode control DC-DC converters. A voltage-mode control DC-DC converter is designed to perform on-off control of each of the switching elements using a voltage feedback loop of its output voltage. In contrast, a current-mode DC-DC converter is designed to perform on-off control of each of the switching elements using the combination of the voltage feedback loop and a current feedback loop of a current flowing through the inductor as an inductor current.

A current-mode DC-DC converter performs feedback control that:

measures the difference of a measured output voltage and a target voltage;

performs a PI algorithm based on a proportional gain term and an integral gain term using the difference as an input of the PI algorithm to thereby determine a target value of an input current, which is an example of an input electrical parameter supplied to the switch circuit, which reduces the difference;

compares a measured value of the input current to the DC-DC converter with the target value of the input current to obtain the difference between the measured value and the target value of the input current; and determines a manipulated variable for each of the switching elements, thus reducing the difference between the measured value and the target value of the input current.

In such a current-mode DC-DC converter, there have been disclosed some technologies for reducing an overshoot of an output voltage occurring when the DC-DC converter is activated; one example of these technologies is disclosed in Japanese Patent Application Publication No. 2009-118571.

The technology applied in a DC-DC converter disclosed in the Patent Publication reduces a value of the integral gain term when the DC-DC converter is activated in comparison to a normal value of the integral gain term used when the DC-DC converter is operating normally. This reduces the increase of the output voltage based on the proportional gain term, thus preventing the occurrence of an overshoot of the output voltage.

SUMMARY

However, the technology disclosed in the Patent Publication may result in problems while the input DC voltage to the switch circuit is within a low-level range.

Specifically, in the aforementioned feedback control, while the input DC voltage to the switch circuit is within a low-level range, it may be difficult to follow the increase in the target voltage. This may result in deviation between the target value and the measured value of the input current. Thus, if the input DC voltage rapidly increases from the low-level range, the current deviation may cause the response based on the combination of the voltage feedback loop and the current feedback loop not to follow the rapid increase in the input DC voltage, resulting in a rapid increase of the output DC voltage.

If the switch circuit is designed as a full-bridge circuit, a push-pull circuit, or a half-bridge circuit, the current deviation may also cause positive and negative peak levels of the input current to the switch circuit for each predetermined switching cycle of the switching elements to be unbalanced. This imbalance between the positive and negative peak levels of the input current to the switch circuit for each predetermined switching cycle may result in the inductor of the switch circuit from being magnetically biased. This magnetically biased inductor may cause an overcurrent to flow through the switching elements and the inductor.

In view of the circumstances set forth above, one aspect of the present disclosure seeks to provide power converters, which are capable of solving the problems set forth above.

Specifically, an alternative aspect of the present disclosure aims to provide such power converters, each of which is capable of reducing a deviation between a target value and an actual value of an input electrical parameter to the power converter.

According to an exemplary aspect of the present disclosure, there is provided a power converter. The power converter includes a driver that drives a switching element of a switch circuit to convert input power to the switch circuit into output power of the switch circuit different from the input power. The power converter includes a first calculator that calculates a value of a first feedback controlled variable based on a value of an output electrical parameter of the switch circuit indicative of the output power of the switch circuit and a command value for the output electrical parameter. The power converter includes a selector that selects, in each cycle, one of the value of the first feedback controlled variable and a value of a second feedback controlled variable as a target value of an input electrical parameter of the switch circuit for a next cycle. The input electrical parameter depends on the input power to the switch circuit. The power converter includes a deviation calculator that calculates, in each cycle, a deviation between a value of the input electrical parameter of the switch circuit and the target value selected by the selector in a previous cycle. The power converter includes a second calculator that calculates, in each cycle, the value of the second feedback controlled variable such that the value of the second feedback controlled variable approaches the value of the input electrical parameter. The power converter includes a controller that controls, in each cycle, the selector to select one of the value of the first feedback controlled variable and the value of the second feedback controlled variable as the target value for the next cycle according to the deviation calculated by the deviation calculator.

Even if the value of the input electrical parameter is deviated from the target value due to, for example, the input power being within a low level range, so that it is difficult to match the value of the output electrical parameter of the switch circuit with the command value for the output electrical parameter, the configuration of the power converter according to the exemplary aspect of the present disclosure causes the target value to approach the value of the input electrical parameter for each cycle.

This reduces the current deviation between the value of the input electrical parameter and the target value. This makes it possible to solve the aforementioned problems due to the current deviation.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which:

FIG. 11 is a flowchart schematically illustrating the selection control task carried out by the feedback unit of a power converter according to the fourth embodiment;

FIG. 12 is a timing chart schematically illustrating an example of how: a target current value, a measured input-current value, and output of a selector vary during execution of the selection control task according to the fourth embodiment;

DETAILED DESCRIPTION OF EMBODIMENT

Embodiments of the present disclosure will be described hereinafter with reference to the accompanying drawings. In the embodiments, the phrase "A is/are connected to B" or the similar expressions represents that A is/are electrically connected to B unless otherwise is described. In each of the drawings, there are disclosed elements at least required to describe an allocated part of the present disclosure.

First Embodiment

Figure 1:
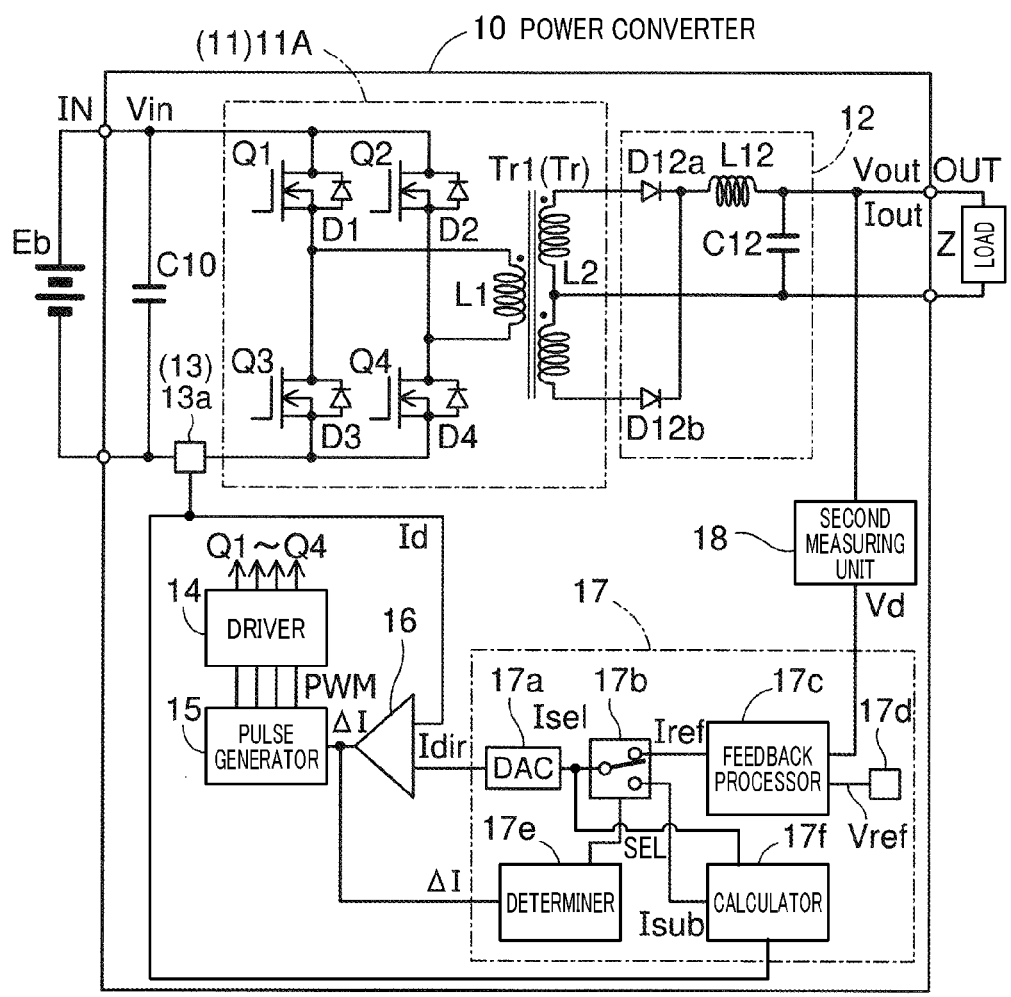
FIG. 1 is a circuit diagram schematically illustrating an example of the overall configuration of a power converter according to a first embodiment of the present disclosure.

Referring to FIG. 1, there is illustrated a power converter 10, in other words, a switching power supply, according to a first embodiment of the present disclosure; the switching power supply is an example of power converters according to the present disclosure.

The power converter 10 is operative to convert a variable input DC voltage Vin of, for example, 288 V, as an example of input power, into a required output voltage of, for example, 14 V, as an example of output power. That is, the power converter 10 has a wide dynamic range of voltage conversion.

The power converter 10 has input terminals, i.e. positive and negative input terminals, IN to which a DC power source Eb is connected, and has output terminals, i.e. positive and negative output terminals, OUT to which a load Z is connected. As the DC power source Eb, a battery, such as a secondary battery, a fuel battery, or the like, can be used. As the load Z, a DC battery having a predetermined capacity different from that of the DC power source Eb can be used. As the load Z, a rotary machine, such as an electric power generator, a power generator, a motor, or the like, a head lamp, or the other devices can also be used.

The power converter 10 includes a capacitor C10, a switch circuit 11A, a rectifying and smoothing circuit 12, and a first measuring unit 13. The power converter 10 also includes a driver 14, a pulse generator 15, a deviation calculator 16, a feedback unit 17, and a second measuring unit 18. These elements of the power converter 10 will be described hereinafter. Note that each element of the power converter 10 is designed to process, unless otherwise is described, at least one of various signals, which are communicated in the power converter 10, in a predetermined form that the element can handle. For example, each element of the power converters 10 is designed to process at least one of these various signals in an analog form or a digital form. These various signals include, as described later, a measured current value Id and a measured voltage value Vd.

The capacitor C10 has a first end connected to the positive input terminal IN, and a second end, which is opposite to the first end, connected to the negative input terminal IN. That is, the capacitor C10 is connected in parallel to the DC power source Eb, and is operative to smooth the input voltage Vin input thereto from the DC power source Eb.

The switch circuit 11A is comprised of series-connected switching elements Q1 and Q3, series-connected switching elements Q2 and Q4, diodes D1 to D4, and a transformer Tr1. For example, as the switching elements Q1 to Q4, IGBTs or power MOSFETs can be respectively used.

Each of the switching elements Q1 to Q4 has a first terminal, a second terminal, and a conductive path formed therebetween. The first terminal of the switching element Q1 is connected to the positive input terminal IN via a positive DC input line. The second terminal of the switching element Q1 is connected to the first terminal of the switching element Q3 to constitute the series-connected switching elements Q1 and Q3. The second terminal of the switching element Q3 is connected to the negative input terminal IN via a negative DC input line.

Similarly, the first terminal of the switching element Q2 is connected to the positive input terminal IN via the positive DC input line. The second terminal of the switching element Q2 is connected to the first terminal of the switching element Q4 to constitute the series-connected switching elements Q2 and Q4. The second terminal of the switching element Q4 is connected to the negative input terminal IN via the negative DC input line. For example, if power MOSFETs are used as the switching elements Q1 to Q4, the drain of each of the switching elements Q1 to Q4 serves as the first terminal, and the source serves as the second terminal.

With the configuration, the switching elements Q1 and Q2 will also be referred to as high-side switching elements, and the switching elements Q3 and Q4 will also be referred to as low-side switching elements.

Each of the diodes D1 to D4 is connected between the first end and second end of a corresponding one of the switching elements Q1 to Q4 in antiparallel thereto, and serves as a free-wheel diode.

If power MOSFETs are used as the switching elements Q1 to Q4, intrinsic diodes of the power MOSFETs can be used as the free-wheel diodes, thus eliminating the free-wheel diodes.

The series-connected switching elements Q1 and Q3 and the series-connected switching elements Q2 and Q4 are parallelly connected to each other in full-bridge configuration.

Each of the switching elements Q1 to Q4 has a control terminal connected to the driver 14. If power MOSFETs are used as the switching elements Q1 to Q4, the gate of each of the switching elements Q1 to Q4 serves as the control terminal thereof. As described later, a drive signal sent from the driver 14 and input to the control terminal of each of the switching elements Q1 to Q4 opens or closes the conductive path thereof, that is, turns on or off the corresponding switching element.

In the first embodiment, the driver 14 is designed to complementarily turn on the high- and low-side switching elements Q1 and Q3. Similarly, the driver 14 is designed to complementarily turn on the high- and low-side switching elements Q2 and Q4. In addition, the driver 14 is designed to alternately turn on the first set of high- and low-side switching elements Q1 and Q4 and the second set of high- and low-side switching elements Q2 and Q3. These operations of the driver 14 permits the switching circuit 11A to serve as an inverter that converts DC power, that is, the DC voltage Vin, input to the switching circuit 11A from the DC power source Eb into AC power, that is, an AC voltage, and applies the AC power to the transformer Tr1.

The transformer Tr1, which serves as an inductor, is comprised of a primary winding L1 and a secondary winding L2 with a center tap. The rectifying and smoothing circuit 12 is comprised of a first diode D12a, a second diode 12b, a capacitor C12, and a coil L12. A connecting point between the second end of the switching element Q1 and the first end of the switching element Q3 is connected to one end of the primary winding L1. A connecting point between the second end of the switching element Q2 and the first end of the switching element Q4 is connected to the other end of the primary winding L1.

The secondary winding L2 also has a first end and a second end opposite thereto. The first end of the secondary winding L2 is connected to the anode of the first diode 12a, and the second end thereof is connected to the anode of the second diode 12b. The center tap of the secondary winding L2 is connected to the negative output terminal OUT. The center tap divides the secondary winding L2 into a first winding portion and a second winding portion. The turns ratio representing the number of turns of each of the first and second winding portions of the secondary winding L2 to the number of turns of the primary winding L1 is set to a predetermined value.

The transformer Tr1 is operative to convert the AC voltage applied to the primary winding L1 into a different AC voltage induced across the secondary winding L2 while the primary winding L1 is electrically isolated from the secondary winding L2; the magnitude of the AC voltage induced across the secondary winding L2 is determined based on the turns ratio.

The cathode of the first diode 12a and the cathode of the second diode 12b are commonly connected to one end of the coil L12. The other end of the coil L12 is connected to the positive output terminal OUT. The capacitor C12 is connected between the coil L12 and the load Z to be in parallel to the load Z.

Specifically, the first and second diodes 12a and 12b constitute a full-wave rectifier that full-wave rectifies the AC voltage induced across the secondary winding L2, thus generating a DC voltage. The coil L12 and the capacitor C12 constitute an LC filter configured to smooth the DC voltage output from the full-wave rectifier, thus generating an output voltage Vout across the positive and negative output terminals OUT to be supplied to the load Z.

The other end of the coil L12, which is connected to the positive output terminal OUT of the power converter 10, is also connected to the second measuring unit 18.

The second measuring unit 18 is operative to measure a value Vd of the output voltage Vout in an analog format. The value Vd of the output voltage Vout is changed depending on the conditions of the load Z and the like. The second measuring unit 18 is also operative to output the measured value Vd of the output voltage Vout to the feedback unit 17.

The first measuring unit 13a is provided in the negative DC input line, and is connected between the second end of the capacitor C10 and the second end of the switching element Q3. The first measuring unit 13a is operative to measure a value Id of current input from the DC power source Eb to the switch circuit 11A in the analog format; this current will be referred to as an input current. In the first embodiment, control of switching of the switching elements Q1 to Q4 permits the measured input-current value Id to vary in a given waveform, that is, a pulse waveform.

The pulse generator 15 is connected to the deviation calculator 16 and to the driver 14. The pulse generator 15 is operative to generate, based on a current deviation ΔI supplied from the deviation calculator 16 described later, PWM signals for the respective switching elements Q1 to Q4. For example, the pulse generator 15 is operative to generate the PWM signals for the respective switching elements Q1 to Q4 such that the current deviation ΔI becomes zero.

Each of the PWM signals for a corresponding one of the switching elements Q1 to Q4 consists of a train of pulses having a predetermined duty, i.e. a duty factor, for each predetermined switching cycle. The duty factor represents a controllable on-pulse width for each predetermined switching cycle. In other words, the duty factor represents a predetermined ratio, i.e. percentage, of on duration to the total duration of each predetermined switching cycle.

Figure 3:
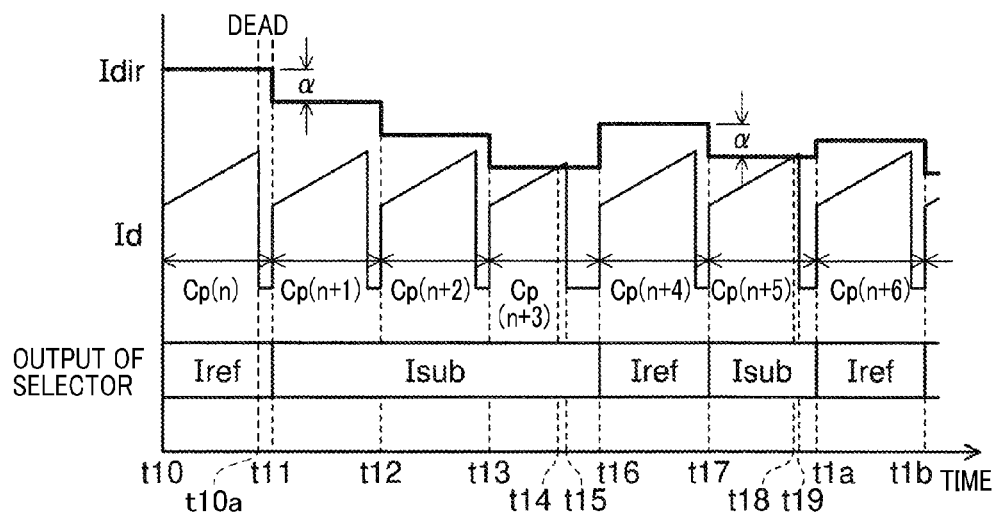
FIG. 3 is a timing chart schematically illustrating an example of how: a target current value, a measured input-current value, and output of a selector vary during execution of the selection control task according to the first embodiment.

The driver 14 is operative to amplify the PWM signals for the respective switching elements Q1 to Q4, and outputs the amplified PWM signals to the control terminals of the respective switching elements Q1 to Q4, thus individually driving, i.e. turning on or off, the switching elements Q1 to Q4. As illustrated in FIG. 3 described later, an input current flowing through the primary winding L1 based on the drive of the switching elements Q1 to Q4 increases with time due to the characteristic of the primary winding L1.

In the first embodiment, as an example of the first measuring unit 13a, because the input current increases with time, the first measuring unit 13a measures a peak value of the input current as a measured input-current value Id.

The deviation calculator 16, which serves as, for example, a comparator, has first and second input terminals and an output terminal. The first input terminal is connected to the feedback unit 17, the second terminal is connected to the first measuring unit 13a, and the output terminal is connected to the pulse generator 15. The deviation calculator 16 is operative to compare the measured input-current value Id with a target current value Idir sent from the feedback unit 17, thus calculating the current deviation ΔI between the measured input-current value Id and the target current value Idir. The deviation calculator 16 is also operative to supply the current deviation ΔI to the pulse generator 15. The deviation calculator 16 can calculate the current deviation ΔI using the measured input-current value Id as a reference value, or using the target current value Idir as a reference value.

The feedback unit 17 is for example comprised of a digital-analog converter (DAC) 17a, a selector 17b, a feedback processor 17c, a command-value setter 17d, a determiner 17e, and a calculator 17f. Note that the feedback unit 17 can be configured as a programmed logic unit, such as a computer, a hard-wired logic unit, or the combination of hardwired-logic and programmed-logic hybrid units. That is, the functional blocks of the feedback unit 17 can be designed as hardware modules, software modules, or the combinations of hardware and software modules.

The feedback unit 17 is operative to perform feedback control of the output voltage Vout of the power converter 10 relative to a command voltage value Vref for each predetermined switching cycle Csw. In the first embodiment, the predetermined switching cycle Csw represents a period required for all the switching elements Q1 to Q4 to be switched from one state (on or off state) to the other state. More specifically, a predetermined pulse cycle Cp consists of an on duration and an off duration of the first set of high- and low-side switching elements Q1 and Q4 or the second set of high- and low-side switching elements Q2 and Q3 (see FIG. 3 described later). That is, a switching cycle Csw consists of two pulse cycles Cp.

Note that the feedback unit 17 is configured to usually carry out processes of signals supplied thereto in a digital format when the signals are in the analog format. However, the feedback unit 17 can be configured to carry out processes of signals supplied thereto in the analog format.

The command-value setter 17d is operative to set the command voltage value Vref required for the load Z, and output the command voltage value Vref to the feedback processor 17c. The command-value setter 17d can be designed to set the command voltage value Vref based on signals and/or data supplied from an external unit, such as an external ECU or an external computer.

If the feedback unit 17 is operating in a feedback control mode, for each predetermined switching cycle Csw, the feedback processor 17c serves as, for example, a first calculator to perform:

calculation of a difference Δ between the measured value Vd of the output voltage Vout and the command voltage value Vref; and calculation of a feedback controlled variable, i.e. a feedback command-current value, Iref for the input current using the sum of a proportional gain term and an integral gain term of a PI feedback control algorithm (PI algorithm) using the difference Δ as its input.

In the PI algorithm, the feedback command-current value Iref is expressed based on the proportional gain term and the integral gain term.

The proportional gain term for the feedback controlled variable contributes to change in the feedback controlled variable in proportion to the difference Δ. The integral gain term is proportional to an accumulated offset of instantaneous values of the difference Δ over time to reset the accumulated offset (steady-state deviation) over time to zero. Note that the feedback processor 19c can calculate a feedback command-current value Iref using the sum of a proportional gain term, an integral gain term, and a derivative gain term of a known PID feedback control algorithm (PID algorithm) using the difference Δ as its input. The derivative term is proportional to a difference between a previous value of the difference Δ and a present value thereof to improve response of the feedback controlled variable to suppress fluctuations in the difference Δ.

Then, if the feedback unit 17 is operating in the feedback control mode, the feedback processor 17c is operative to output the feedback command-current value Iref to the selector 17b and the calculator 17f for each predetermined switching cycle Csw.

In contrast, if the feedback unit 17 is operating in a direct control mode, the feedback processor 17c disables the performance of the feedback process using the deviation Δ set forth above, thus disabling output of the feedback command-current value Iref to the selector 17b and the calculator 17f.

If the feedback unit 17 is operating in the direct control mode, the calculator 17f serves as, for example, a second calculator to subtract, from the target current value Idir selected by the selector 17b described later, a first preset value α to thereby obtain a subtracted current value Isub. Then, if the feedback unit 17 is operating in the direct control mode, the calculator 17 is operative to output the subtracted current value Isub to the selector 17b.

The determiner 17e is operatively connected to the output terminal of the deviation calculator 16 and the selector 17b. In each of the pulse cycles Cp, the determiner 17e serves as, for example, a controller to:

receive the current deviation ΔI supplied from the deviation calculator 16;

determine whether to operate the feedback unit 17 in the feedback control mode or the direct control mode based on the current deviation ΔI; and output, to the selector 17b, selection information SEL representing that the selector 17b should select one of the feedback command-current value Iref and the subtracted current value Isub for the next pulse cycle based on the determined results.

In the first embodiment, the determiner 17e determines to operate the feedback unit 17 in the feedback control mode if the polarity of the current deviation ΔI is reversed during a current pulse cycle Cp. This outputs the selection information SEL representing that the selector 17b should select, as the target current value Idir for the next pulse cycle, the feedback command-current value Iref output from the feedback processor 17c.

In contrast, the determiner 17e determines to operate the feedback unit 17 in the direct control mode if the polarity of the current deviation ΔI is not reversed during a current pulse cycle Cp. This outputs the selection information SEL representing that the selector 17b should select, as the target current value Idir for the next cycle, the subtracted current value Isub.

That is, the selector 17b is operative to change the target current value Idir for the next pulse cycle to one of the feedback command-current value Iref and the subtracted current value Isub according to the selection information SEL sent from the determiner 17e. Then, the selector 17b is operative to output the selected target current value Idir to the DAC 17a.

In each pulse cycle Cp, the DAC 17a is operative to convert the selected target current value Idir in the digital format into the target current value Idir in the analog format, and output the target current value Idir in the analog format to the deviation calculator 16.

Thus, as described above, the deviation calculator 16 is operative to compare, for each switching cycle Cw, the measured input-current value Id with the target current value Idir, thus calculating the current deviation ΔI between the measured input-current value Id and the target current value Idir. The deviation calculator 16 is also operative to supply, for each switching cycle Csw, the current deviation ΔI to the pulse generator 15.

For each switching cycle Csw, the pulse generator 15 generates, based on the current deviation ΔI supplied from the deviation calculator 16, PWM signals for the respective switching elements Q1 to Q4; each of the PWM signals has a predetermined duty cycle as a manipulated variable. The PWM signals are sent, for the next pulse cycle, to the respective switching elements Q1 to Q4 via the driver 14, so that the switching elements Q1 to Q4 are individually driven for the next switching cycle to reduce the current deviation ΔI, that is, to adjust the value Vd of the output voltage Vout to be equal to the command voltage value Vref.

Specifically, the power converter 10 is normally designed such that the feedback unit 17 is operating in the feedback control mode for each switching cycle to increase the output voltage Vout so as to be matched with the command voltage value Vref. In other words, the power converter 10 is normally designed such that the feedback unit 17 is operating in the feedback control mode to increase the input current Id so as to be matched with the target current value Idir, i.e. the feedback command-current value Iref, determined based on the command voltage value Vref. This matches the output voltage Vout with the command voltage value Vref.

That is, as described above, the power converter 10 uses, as the combination of a voltage feedback loop and a current feedback loop, the combination of the second measuring unit 18, the command-value setter 17d, the feedback processor 17c, the calculator 17f, the selector 17b, the determiner 17e, the DAC 17a, the deviation calculator 16, the first measuring unit 13a, and so on. Thus, the power converter 10 is configured as a current-mode control DC-DC converter.

Next, a selection control task of the power converter 10, which is carried out by the feedback unit 17 in each pulse cycle Cp to select, as the target current value Idir for the next pulse cycle, one of the feedback command-current value Iref and the subtracted current value Isub will be described in more detail with reference to FIGS. 2 and 3.

Note that, each time the power converter 10 is initialized, that is, reset or powered on, the feedback command-current value Iref is used as an initial value of the subtracted current value Isub in a first pulse cycle after initialization. This is because there are no previous cycles before the first pulse cycle. Thus, in the first pulse cycle after initialization, the selector 17b is configured to select, as the target current value Idir, freely one of the feedback command-current value Iref and the subtracted current value Isub identical thereto.

Figure 2:
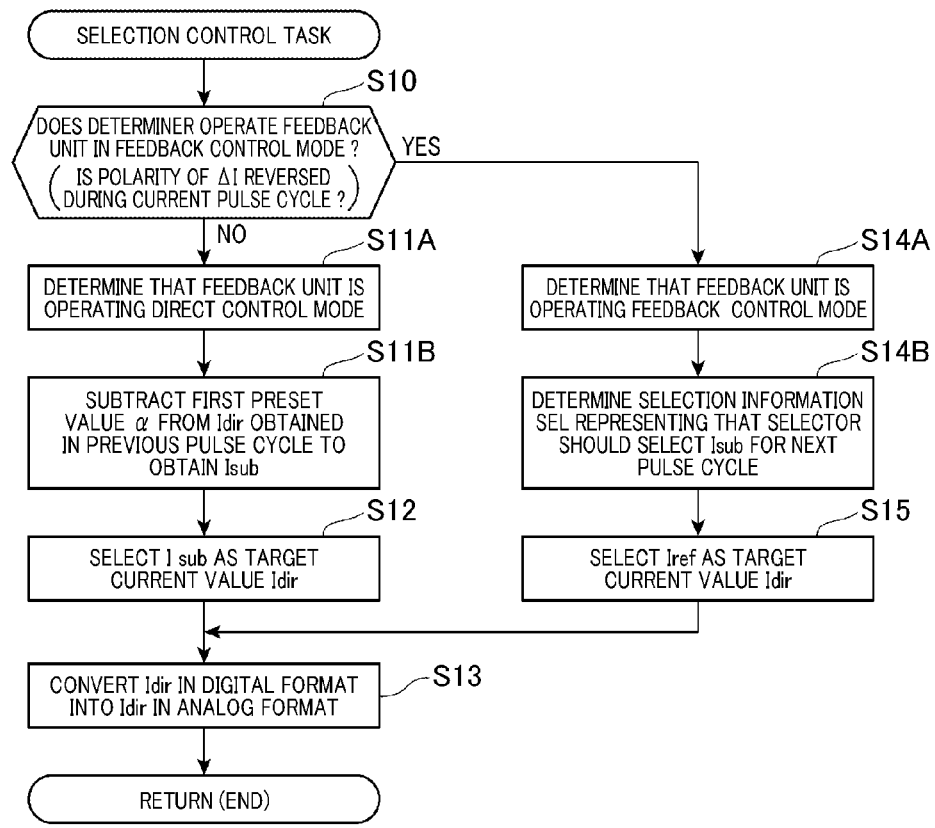
FIG. 2 is a flowchart schematically illustrating a selection control task carried out by a feedback unit of the power converter illustrated in FIG. 1.

FIG. 2 schematically illustrates specific operations of the selection control task carried out by the feedback unit 17. The feedback unit 17 performs the selection control task after initialization of the power converter 10 in each pulse cycle Cp.

In the selection control task illustrated in FIG. 2, the feedback unit 17 serves as the determiner 17e to determine whether to operate the feedback unit 17 in the feedback control mode based on the current deviation ΔI in step S10. Specifically, in step S10, the determiner 17e determines whether the polarity of the current deviation ΔI is reversed during a current pulse cycle Cp in step S10. In other words, the feedback unit 17 determines whether the polarity of the current deviation ΔI is reversed before the current pulse cycle Cp has elapsed since turn-on of a corresponding switching element in step S10.

Upon determination that the polarity of the current deviation ΔI is reversed during a current pulse cycle Cp (YES in step S10), the feedback unit 17 recognizes that the actual current value Id is not deviated from the feedback command-current value Iref.

Then, the feedback unit 17 serves as the determiner 17e to determine that the feedback unit 17 is operating in the feedback control mode in step S14A. This causes the feedback processor 17c to calculate the feedback command-current value Iref based on the difference Δ between the measured value Vd of the output voltage Vout and the command voltage value Vref. This results in the feedback control of the output voltage Vout of the power converter 10 being performed based on the target current value Idir corresponding to the feedback command-current value Iref.

Next, in step S14B, the feedback unit 17 serves as the determiner 17e to determine the selection information SEL representing that the feedback command-current value Iref should be selected as the target current value Idir in the digital format for the next pulse cycle.

Thus, in the next pulse cycle, the feedback unit 17 serves as the selector 17b to select the feedback command-current value Iref as the target current value Idir for the next pulse cycle based on the selection information SEL in step S15.

Following the operation in step S15, in the next pulse cycle, the feedback unit 17 serves as the DAC 17a to convert the target current value Idir in the digital format into the target current value Idir in the analog format, and to output the target current value Idir to the deviation calculator 16 in step S13. After the operation in step S13, the feedback unit 17 terminates the selection control task.

Otherwise, upon determination that the polarity of the current deviation ΔI is not reversed during the current pulse cycle Cp (NO in step S10), the feedback unit 17 recognizes that the actual current value Id is deviated from the target current value Idir due to, for example, the input DC voltage Vin to the switch circuit 11A being within a low-level range. As a result, the feedback control of the output voltage value Vd by the feedback calculator 17c may make it difficult to match the measured output-voltage value Vd with the command voltage value Vref in each pulse cycle Cp.

Then, the feedback unit 17 serves as the determiner 17e to determine that the feedback unit 17 is operating in the direct control mode in step S11A. Next, in step S11B, the feedback unit 17 serves as the calculator 17f to subtract the first preset value α from the target current value Idir selected by the selector 17b in the previous pulse cycle to obtain a subtracted current value Isub. The operation in step S11B is expressed as an equation as follows:

$$I\text{sub} = I\text{dir} - \alpha$$

That is, in step S11B, the feedback unit 17 causes the target current value Idir obtained in the previous pulse cycle Cp to approach, as the subtracted value Isub, the measured input-current value Id by the first preset value α.

In step S11B, the feedback unit 17 serves as the determiner 17e to determine the selection information SEL representing that the subtracted value Isb should be selected as the target current value Idir in the digital format for the next pulse cycle.

Thus, following the operation in step S11B, the feedback unit 17 serves as the selector 17b to select the subtracted current value Isub obtained in the current pulse cycle Cp as the target current value Idir in the digital format for the next pulse cycle based on the selection information SEL in step S12. Then, the feedback unit 17 serves as the DAC 17a to convert the target current value Idir in the digital format into the target current value Idir in the analog format, and to output the target current value Idir to the deviation calculator 16 in step S13. After the operation in step S13, the feedback unit 17 terminates the selection control task.

FIG. 3 schematically illustrates an example of how: the target current value Idir in the digital/analog format, the measured input-current value Id, and the output of the selector 17b vary during execution of the selection control task. The variations of the respective parameters illustrated in FIG. 3 are examples of them, and therefore, the variations of the respective parameters can be changed depending on variations of the output voltage Vout, the load Z, and other electrical parameters.

It is assumed that, during a previous pulse cycle Cp(n−1), previous to a pulse cycle Cp(n) from time t10 to time t11 illustrated in FIG. 3, the polarity of the current deviation ΔI between the measured input-current value Id and the target current value Idir is reversed. As a result, the operation mode of the feedback unit 17 is set to the feedback control mode, and the feedback command-current value Iref is selected as the target current value Idir used by the deviation calculator 16 for the next pulse cycle Cp(n) (see steps S14A, S14B, and S15).

At the start of the pulse cycle Cp(n), i.e. at the time t10, the driver 14 supplies the PWM signals to, for example, the first set of switching elements Q1 and Q4 to simultaneously turn them on while keeping off the second set of switching elements Q2 and Q3. The driver 14 continues the on state of the switching elements Q1 and Q4 to a time t10a that is defined before the time t11 at the end of the pulse cycle Cp(n) by a dead time DEAD. That is, time t10a=t11−DEAD. During the dead time DEAD, no PWM signals are supplied to the respective switching elements Q1 to Q4, in other words, all the switching elements Q1 to Q4 are off in order to prevent a short-circuit between the series-connected switching elements Q1 and Q3, or between the series-connected switching elements Q2 and Q4.

During the pulse cycle Cp(n), the polarity of the deviation ΔI between the measured input-current value Id and the target current value Idir is not reversed, which is expressed by the equation Idir>Id. For this reason, the operation mode of the feedback unit 17 is switched to the direct control mode. In the direct control mode, subtracting the first preset value α from the target current value Idir output in the pulse cycle Cp(n) obtains the subtracted current value Isub. The subtracted current value Isub is selected as the target current value Idir for the next pulse cycle Cp(n+1) from the time t11 to time t12 (see steps S10, S11A, S11B, and S12).

After lapse of the dead time DEAD, at the start of the next pulse cycle Cp(n+1), the driver 14 supplies the PWM signals to the second set of switching elements Q2 and Q3 to simultaneously turn them on while keeping off the first set of switching elements Q1 and Q4. The driver 14 continues the on state of the switching elements Q2 and Q3 up to time that is before time t12 corresponding to the end of the pulse cycle Cp(n+1) by the dead time DEAD. That is, as described above, the driver 14 alternately turns on the first set of switching elements Q1 and Q4 and the second set of switching elements Q2 and Q3 for each pulse cycle Cp.

During the pulse cycle Cp(n+1) from the time t11 to the time t12, the polarity of the deviation ΔI between the measured input-current value Id and the target current value Idir is not reversed, which is expressed by the equation Idir>Id. For this reason, the operation mode of the feedback unit 17 is kept in the direct control mode. In the direct control mode, subtracting the first preset value α from the target current value Idir output in the pulse cycle Cp(n+1) obtains the subtracted current value Isub. The subtracted current value Isub is selected as the target current value Idir for the next pulse cycle Cp(n+2) from the time t12 to time t13 (see steps S10, S11A, S11B, and S12).

During the pulse cycle Cp(n+2) from the time t12 to the time t13, the polarity of the deviation ΔI between the measured input-current value Id and the target current value Idir is also not reversed. Thus, the operation mode of the feedback unit 17 is kept in the direct control mode. In the direct control mode, subtracting the first preset value α from the target current value Idir output in the pulse cycle Cp(n+2) obtains the subtracted current value Isub. The subtracted current value Isub is selected as the target current value Idir for the next pulse cycle Cp(n+3) from the time t13 to time t16 (see steps S10, S11A, S11B, and S12).

That is, the target current value Idir output from the selector 17B is reduced by the first preset value α each time a pulse cycle Cp elapses as long as the polarity of the deviation ΔI is not reversed.

In contrast, during the pulse cycle Cp(n+3), the polarity of the deviation ΔI between the measured input-current value Id and the target current value Idir is reversed at time t14. This means that the measured input-current value Id instantly exceeds the target current value Idir at the time t14, which is expressed by the equation Idir<Id.

Then, output of the PWM signals for the corresponding pair of switching elements, that is Q2 and Q3, from the driver 14 are stopped (see time t15). This causes the corresponding switching elements Q2 and Q3 to be turned off at the time t15. Theoretically, it is preferable to turn off the corresponding switching elements Q2 and Q3 simultaneously with the reverse of the polarity of the deviation ΔI, i.e., the time t14 is identical to the time t15. The delay of the turnoff of the corresponding switching elements Q2 and Q3 relative to the reverse of the polarity of the deviation ΔI is based on the response delay of the feedback unit 17. Note that, at the time t15, because no PWM signals are output to the switching elements Q2 and Q3, no calculation of the deviation ΔI is performed. That is, at time t15, the polarity of the deviation ΔI cannot be considered.

In response to the reverse of the polarity of the deviation ΔI, the operation mode of the feedback unit 17 is switched to the feedback control mode. Thus, for the next pulse cycle Cp(n+4) from the time t16 to time t17, the feedback command-current value Iref is selected as the target current value Idir (see steps S10, S14A, S14B, and S15). At that time, the target current value Idir for the next pulse cycle Cp(n+4) is calculated based on the value Vd of the output voltage Vout measured during the pulse cycle Cp(n+3) and the command voltage value Vref determined during it. For this reason, the target current value Idir for the next pulse cycle Cp(n+4) is more likely to be different from that for the pulse cycle Cp(n). In addition, each of the target current value Idir for the pulse cycle Cp(n) and that obtained for the next pulse cycle Cp(n+4) is set to be higher than the input current Id.

During the pulse cycle Cp(n+4) from the time t16 to the time t17, the polarity of the deviation ΔI between the measured input-current value Id and the target current value Idir is not reversed, which is expressed by the equation Idir>Id. Thus, the operation mode of the feedback unit 17 is switched to the direct control mode. In the direct control mode, subtracting the first preset value α from the target current value Idir output in the pulse cycle Cp(n+4) obtains the subtracted current value Isub. The subtracted current value Isub is selected as the target current value Idir for the next pulse cycle Cp(n+5) from the time t17 to time t1a (see steps S10, S11A, S11B, and S12).

During the pulse cycle Cp(n+5), the polarity of the deviation ΔI between the measured input-current value Id and the target current value Idir is reversed at time t18. This means that the measured input-current value Id instantly exceeds the target current value Idir, which is expressed by the equation Idir<Id.

Then, output of the PWM signals for the corresponding pair of switching elements, that is Q2 and Q3, from the driver 14 are stopped (see time t19). This causes the corresponding switching elements Q2 and Q3 to be turned off at the time t19.

In response to the reverse of the polarity of the deviation ΔI, the operation mode of the feedback unit 17 is switched to the feedback control mode. Note that, at the time t19, because no PWM signals are output to the switching elements Q2 and Q3, no calculation of the deviation ΔI is performed. That is, at time t19, the polarity of the deviation ΔI cannot be considered.

Thus, for the next pulse cycle Cp(n+6) from the time t1a to time t1b, the feedback command-current value Iref is selected as the target current value Idir (see steps S10, S14A, S14B, and S15). At that time, the target current value Idir for the next pulse cycle Cp(n+6) is calculated based on the value Vd of the output voltage Vout measured during the pulse cycle Cp(n+5) and the command voltage value Vref determined during it. For this reason, the target current value Idir for the next pulse cycle Cp(n+6) is more likely to be different from that for the pulse cycle Cp(n) and from that for the pulse cycle Cp(n+4). In addition, the target current value Idir for the pulse cycle Cp(n+6) is also set to be higher than the input current Id.

After the time t1a, during a current pulse cycle, selection of one of the feedback command-current value Iref and the subtracted current value Isub as the target current value Idir for the next pulse cycle is carried out as described above. Specifically, if the polarity of the deviation ΔI between the measured input-current value Id and the target current value Idir is reversed during the current pulse cycle, the feedback command-current value Iref obtained during the current pulse cycle is selected as the target current value Idir for the next pulse cycle. Otherwise, if the polarity of the deviation ΔI between the measured input-current value Id and the target current value Idir is not reversed during the current pulse cycle, the subtracted current value Isub is selected as the target current value Idir for the next pulse cycle.

As described above, the power converter 10 according to the first embodiment is configured such that:

if the operation mode of the feedback unit 17 is set to the feedback control mode, the feedback processor 17c calculates, in a current pulse cycle Cp, the feedback command-current value Iref based on the difference Δ between the measured value Vd of the output voltage Vout and the command voltage value Vref;

if the operation mode of the feedback unit 17 is set to the direct control mode, the calculator 17f subtracts, in a current pulse cycle Cp, the first preset value α from the target current value Idir selected by the selector 17b in the previous pulse cycle, thus outputting a subtracted current value Isub as a result of the subtraction;

the selector 17b selects, in a current pulse cycle Cp, one of the feedback command-current value Iref and the subtracted current value Isub as the target current value Idir for the next pulse cycle according to selection information SEL representing that the selector 17b should select one of the feedback command-current value Iref and the subtracted current value Isub;

the deviation calculator 16 calculates, in a current pulse cycle Cp, the current deviation ΔI between the measured input-current value Id and the target current value Idir; and the determiner 17e determines whether to operate the feedback unit 17 in the feedback control mode or the direct control mode based on the current deviation ΔI, and outputs, to the selector 17b, the selection information SEL representing which one of the feedback command-current value Iref and the subtracted current value Isub the selector 17b should select as the target current value Idir for the next pulse cycle based on the determined results.

Even if the measured input-current value Id is deviated from the target current value Idir due to, for example, the input DC voltage Vin being within a low level range, so that it is difficult to match the output voltage value Vd with the command voltage value Vref, the configuration of the power converter 10 causes the target current value Idir to approach the measured input-current value Id by the first preset value α for each pulse cycle Cp. This reduces the deviation between the measured input-current value Id and the target current value Idir. Therefore, even if there is a disturbance, such as rapid increase in the input DC voltage Vin (rapid increase in the measured input-current value Id) or rapid decrease in the command voltage Vref required for the load Z, it is possible to:

prevent a rapid increase of the output voltage Vout to thereby prevent an overvoltage from being applied to the load Z; and eliminate the need to increase the withstand-voltage characteristics of the load Z and some elements of the power converter 10.

This results in reduction of the manufacturing cost of the power converter 10.

In addition, reducing the deviation between the target current value Idir and the measured input-current value Id makes it possible to reliably maintain, at a high level, the balance between a positive peak level of the input current flowing through the primary winding L1 and a negative peak level of the input current flowing through the primary winding L1 during one switching cycle Csw. This suppresses any magnetic bias of the transformer Tr1, thus preventing the occurrence of an overcurrent through the switching elements Q1 to Q4 of the switch circuit 11A.

The power converter 10 is also configured such that, if the operation mode of the feedback unit 17 is set to the direct control mode, i.e. the polarity of the current deviation ΔI is not reversed during a current pulse cycle Cp, the determiner 17e selects the subtracted current value Isub as the target current value Idir for the next pulse cycle.

Why the polarity of the current deviation ΔI is not reversed during a current pulse cycle Cp is that there is a redundant offset between the measured input-current value Id and the target current value Idir during the current pulse cycle Cp. Thus, this aforementioned configuration selects the subtracted current value Isub, which is reduced by the first preset value α from the previous target current value Idir, as the target current value Idir for the next pulse cycle, thus reducing the current deviation ΔI. Therefore, even if there is a disturbance, such as rapid increase in the input DC voltage Vin (rapid increase in the measured input-current value Id) or rapid decrease in the command voltage Vref required for the load Z, it is possible to reduce the adverse effect caused by the response delay of the feedback unit 17 due to the occurrence of a disturbance.

The power converter 10 is further configured such that, if the operation mode of the feedback unit 17 is set to the feedback control mode, i.e. the polarity of the current deviation ΔI is reversed during a current pulse cycle Cp, the determiner 17e selects the feedback command-current value Iref as the target current value Idir for the next pulse cycle.

Why the polarity of the current deviation ΔI is reversed during a current pulse cycle Cp is that the deviation between the measured input-current value Id and the target current value Idir during the current pulse cycle Cp can be sufficiently reduced to permit the feedback control of the output voltage Vout following the command voltage Vref. Thus, this aforementioned configuration selects the feedback command current value Iref, which is calculated to zero the difference between the output voltage Vout and the command voltage value Vref, as the target current value Idir for the next pulse cycle. This makes it possible to accurately adjust the output voltage Vout to the command voltage value Vref.

In the power converter 10, if the operation mode of the feedback unit 17 is set to the feedback control mode, each time a current pulse cycle Cp elapses, the calculator 17f is configured to reduce the target current value Idir obtained in the previous pulse cycle by the first preset value α, thus outputting the subtracted current value Isub to be selected as the target current value Idir (see the operations in steps S11A, 11B, and 12). This configuration reduces the current deviation ΔI between the measured input-current value Id and the subtracted value Isub selected as the target current value Idir, thus accurately adjusting the output voltage Vout to the command voltage value Vref.

In the power converter 10, the switch circuit 11A is configured such that:

the series-connected switching elements Q1 and Q3 and the series-connected switching elements Q2 and Q4 are parallelly connected to each other in full-bridge configuration; and values Id of the input current to the switch circuit 11A are measured, for each switching cycle Csw, while both the first pair of switching elements Q1 and Q4 is in the on state and the second pair of switching elements Q2 and Q3 is in the on state.

Thus, proper adjustment of the first preset value α permits the current deviations ΔI between the respective measured input-current values Id and the target current values Idir corresponding thereto to be smoothly reduced.

In the power converter 10, the switch circuit 11A includes the transformer Tr1 comprised of the primary winding L1 and the secondary winding L2, and the feedback unit 17 and the deviation calculator 16 use measured input-current values Id flowing through the primary winging L1 as values of an input electrical parameter input to the switch circuit 11A, and measured output-voltage values Vd output from the switch circuit 11A as values of an output electrical parameter output therefrom. This configuration reliably prevents the transformer Tr from being magnetically biased due to a transient increase of DC components caused by the rapid increase of the input voltage Vin, making it possible to prevent the occurrence of an overcurrent due to the magnetically biased transformer Tr.

Second Embodiment

Figure 4:
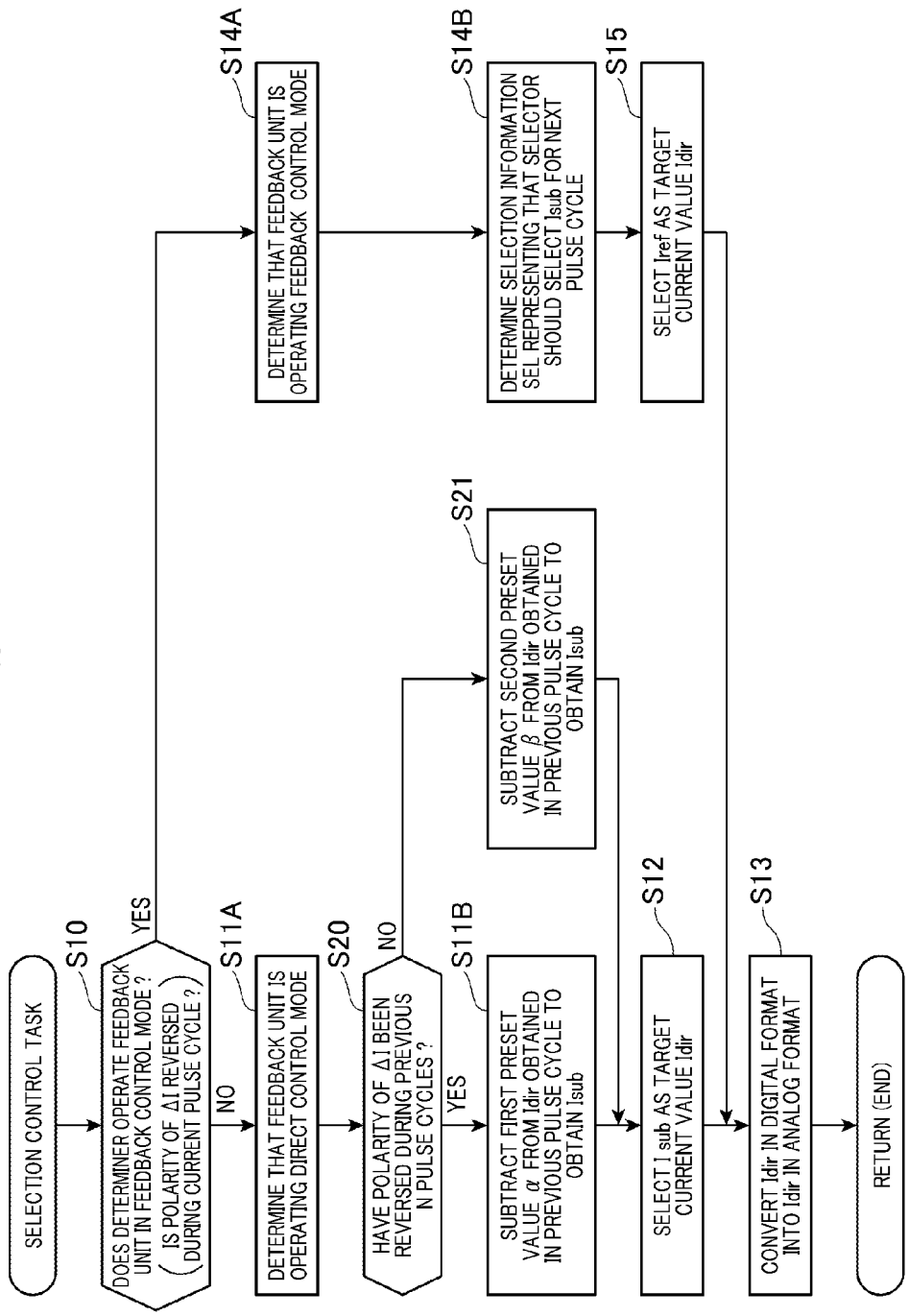
FIG. 4 is a flowchart schematically illustrating the selection control task carried out by the feedback unit of a power converter according to a second embodiment of the present disclosure.

A power converter 10 according to a second embodiment of the present disclosure will be described hereinafter with reference to FIGS. 4 and 5.

The structure and/or functions of the power converter 10 according to the second embodiment are different from those of the power converter 10 by the following points. So, the different points will be mainly described hereinafter, and therefore, redundant descriptions of like parts between the embodiments, to which like reference characters are assigned, are omitted or simplified. Note that the power converter 10 according to the second embodiment will be referred to as a power converter 10A hereinafter. This aims to distinguish the power converter 10A according to the second embodiment from the power converter 10 according to the first embodiment.

In the second embodiment, the selection control task is slightly different from that according to the first embodiment. The different points therebetween will be described hereinafter.

The operations in steps S10 and S11A are the same as those according to the first embodiment.

Following the operation in step S11A, the feedback unit 17 determines whether the polarity of the current deviation ΔI has been reversed at any time during the previous N pulse cycles Cp including the current pulse cycle in step S20. The N is set to an integer equal to or higher than 1.

Upon determination that the polarity of the current deviation ΔI has been reversed at any time during the previous N pulse cycles Cp including the current pulse cycle (YES in step S20), the feedback unit 17 performs the operation in step S11B in the same manner as the feedback unit 17 according to the first embodiment. That is, the operation in step S11B subtracts the first preset value α from the target current value Idir selected by the selector 17b in the current pulse cycle to obtain a subtracted current value Isub.

Otherwise, upon determination that the polarity of the current deviation ΔI has not been reversed during the previous N pulse cycles Cp including the current pulse cycle (NO in step S20), the feedback unit 17 serves as the calculator 17f to perform an operation in step S21. The operation subtracts a second preset value β from the target current value Idir selected by the selector 17b in the current pulse cycle to obtain a subtracted current value Isub. The operation in step S21 is expressed as an equation as follows:

$$I\text{sub} = I\text{dir} - \beta$$

That is, in step S21, the feedback unit 17 causes the target current value Idir obtained in the previous pulse cycle Cp to approach, as the subtracted value Isub, the measured input-current value Id in an increment which is the second preset value β. The second preset value β is set to be higher than the first preset value α.

In step S21, the feedback unit 17 serves as the determiner 17e to determine the selection information SEL representing that the subtracted value Isb should be selected as the target current value Idir in the digital format for the next pulse cycle.

The other operations in the selection control task according to the second embodiment are identical to those in the selection control task according to the first embodiment, and therefore, descriptions of them are omitted.

Figure 5:
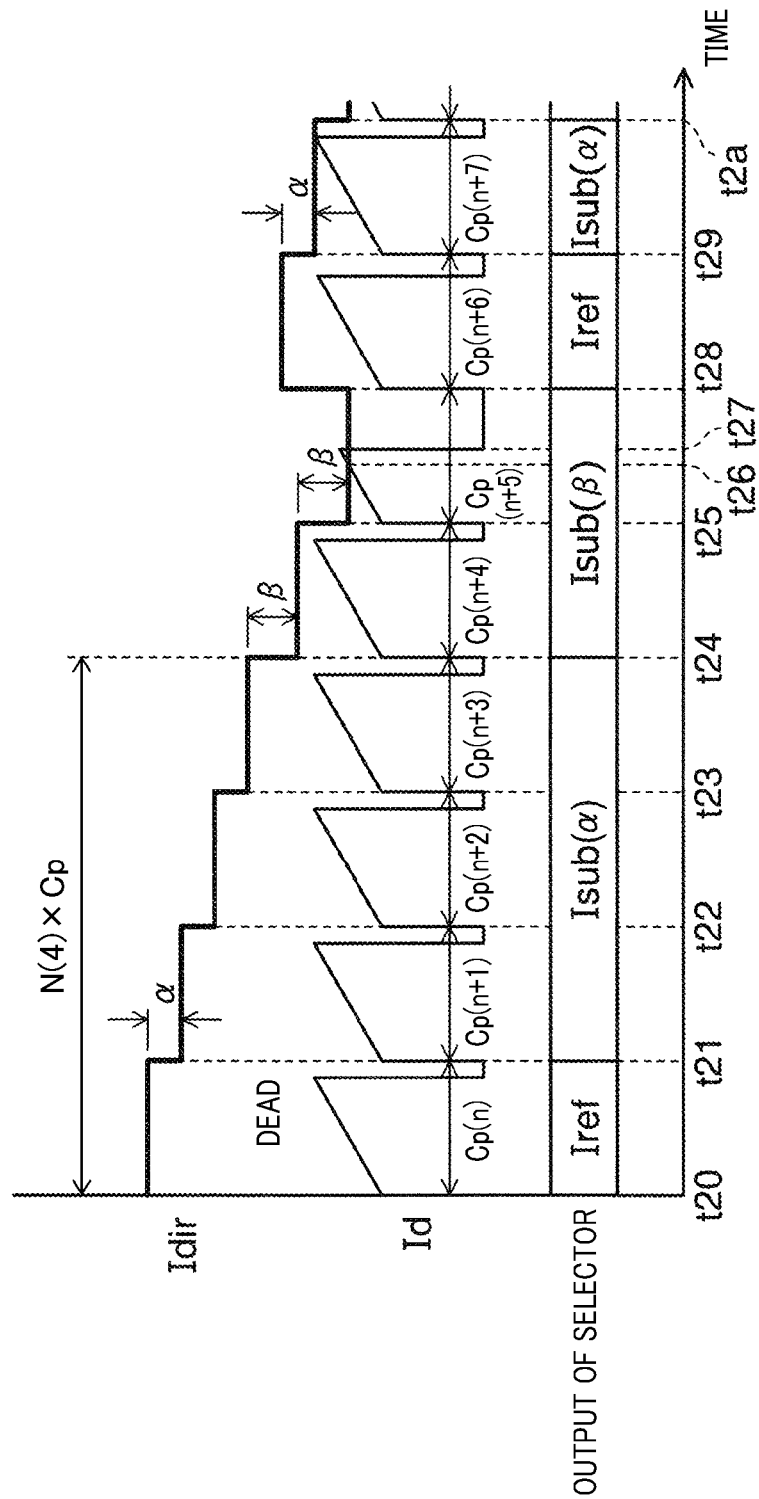
FIG. 5 is a timing chart schematically illustrating an example of how: a target current value, a measured input-current value, and output of a selector vary during execution of the selection control task according to the second embodiment.

FIG. 5 schematically illustrates an example of how: the target current value Idir in the digital/analog format, the measured input-current value Id, and the output of the selector 17b vary during execution of the selection control task according to the second embodiment. The variations of the respective parameters illustrated in FIG. 5 are examples of them, and therefore, the variations of the respective parameters can be changed depending on variations of the output voltage Vout, the load Z, and other electrical parameters.

In the example illustrated in FIG. 5, the number N is set to 4.

It is assumed that, during a previous pulse cycle Cp(n−1) previous to a pulse cycle Cp(n) from time t20 to time t21 illustrated in FIG. 5, the polarity of the current deviation ΔI between the measured input-current value Id and the target current value Idir is reversed. As a result, the operation mode of the feedback unit 17 is set to the feedback control mode, and the feedback command-current value Iref is selected as the target current value Idir used by the deviation calculator 16 for the next pulse cycle Cp(n) (see steps S14A, S14B, and S15).

At the start of the pulse cycle Cp(n), i.e. at the time t20, the driver 14 supplies the PWM signals to, for example, the first set of switching elements Q1 and Q4 to simultaneously turn them on while keeping off the second set of switching elements Q2 and Q3. The driver 14 continues the on state of the switching elements Q1 and Q4 to a time that is defined to be before, by the dead time DEAD, the time t21 representing the end of the pulse cycle Cp(n), i.e. at the time t21 minus the dead time DEAD.

During the pulse cycle Cp(n), the polarity of the deviation ΔI between the measured input-current value Id and the target current value Idir is not reversed, which is expressed by the equation Idir>Id. For this reason, the operation mode of the feedback unit 17 is switched to the direct control mode. In addition, the polarity of the deviation ΔI between the measured input-current value Id and the target current value Idir has been reversed at least once during the previous two pulse cycles Cp(n−1) and Cp(n).

Thus, in the direct control mode, subtracting the first preset value α from the target current value Idir output in the pulse cycle Cp(n) obtains the subtracted current value Isub. The subtracted current value Isub is selected as the target current value Idir for the next pulse cycle Cp(n+1) from the time t21 to time t22 (see steps S11A, S20, A11B, and S12).

After lapse of the dead time DEAD, at the start of the next pulse cycle Cp(n+1), the driver 14 supplies the PWM signals to the second set of switching elements Q2 and Q3 to simultaneously turn them on while keeping off the first set of switching elements Q1 and Q4. The driver 14 continues the on state of the switching elements Q2 and Q3 up to time that is before time t22 corresponding to the end of the pulse cycle Cp(n+1) by the dead time DEAD. That is, as described above, the driver 14 alternately turns on the first set of switching elements Q1 and Q4 and the second set of switching elements Q2 and Q3 for each pulse cycle Cp.

During the pulse cycle Cp(n+1) from the time t21 to the time t22, the polarity of the deviation ΔI between the measured input-current value Id and the target current value Idir is not reversed, which is expressed by the equation Idir>Id. For this reason, the operation mode of the feedback unit 17 is kept in the direct control mode. In addition, the polarity of the deviation ΔI has been reversed at least once during the previous three pulse cycles Cp(n+1), Cp(n), and Cp(n−1). Thus, in the direct control mode, subtracting the first preset value α from the target current value Idir output in the pulse cycle Cp(n+1) obtains the subtracted current value Isub. The subtracted current value Isub is selected as the target current value Idir for the next pulse cycle Cp(n+2) from the time t22 to time t23 (see steps S10, S11A, S20, S11B, and S12).

During the pulse cycle Cp(n+2) from the time t22 to the time t23, the polarity of the deviation ΔI between the measured input-current value Id and the target current value Idir is not reversed, which is expressed by the equation Idir>Id. For this reason, the operation mode of the feedback unit 17 is kept in the direct control mode. In addition, the polarity of the deviation ΔI has been reversed at least once during the previous four pulse cycles Cp(n+2), Cp(n+1), Cp(n), and Cp(n−1). Thus, in the direct control mode, subtracting the first preset value α from the target current value Idir output in the pulse cycle Cp(n+2) obtains the subtracted current value Isub. The subtracted current value Isub is selected as the target current value Idir for the next pulse cycle Cp(n+3) from the time t23 to time t24 (see steps S11A, S20, S11B, and S12).

During the pulse cycle Cp(n+3) from the time t23 to the time t24, the polarity of the deviation ΔI between the measured input-current value Id and the target current value Idir is not reversed, which is expressed by the equation Idir>Id. Thus, the operation mode of the feedback unit 17 is kept in the direct control mode. However, the polarity of the deviation ΔI has never been reversed during the previous four pulse cycles Cp(n+3), Cp(n+2), Cp(n+1), and Cp(n). Thus, in the direct control mode, subtracting the second preset value β from the target current value Idir output in the pulse cycle Cp(n+3)

obtains the subtracted current value Isub. The subtracted current value Isub is selected as the target current value Idir for the next pulse cycle Cp(n+4) from the time t24 to time t25 (see steps S11A, S20, S21, and S12).

During the pulse cycle Cp(n+4) from the time t24 to the time t25, the polarity of the deviation ΔI between the measured input-current value Id and the target current value Idir is not reversed. Thus, the operation mode of the feedback unit 17 is kept in the direct control mode. In addition, the polarity of the deviation ΔI has not been reversed at any time during the previous four pulse cycles Cp(n+4), Cp(n+3), Cp(n+2), and Cp(n+1). Thus, in the direct control mode, subtracting the second preset value β from the target current value Idir output in the pulse cycle Cp(n+4) obtains the subtracted current value Isub. The subtracted current value Isub is selected as the target current value Idir for the next pulse cycle Cp(n+5) from the time t25 to time t28 (see steps S11A, S20, S21, and S12).

In contrast, during the pulse cycle Cp(n+5), the polarity of the deviation ΔI between the measured input-current value Id and the target current value Idir is reversed at time t26. This means that the measured input-current value Id instantly exceeds the target current value Idir, which is expressed by the equation Idir<Id.

Then, output of the PWM signals for the corresponding pair of switching elements, that is Q2 and Q3, from the driver 14 are stopped from the driver 14 (see time t27). This causes the corresponding switching elements Q2 and Q3 to be turned off at the time t27. Theoretically, it is preferable to turn off the corresponding switching elements Q2 and Q3 simultaneously with the reverse of the polarity of the deviation ΔI, i.e., the time t26 is identical to the time t27. The delay of the turnoff of the corresponding switching elements Q2 and Q3 relative to the reverse of the polarity of the deviation ΔI is based on the response delay of the feedback unit 17.

Note that, at the time t27, because no PWM signals are output to the switching elements Q2 and Q3, no calculation of the deviation ΔI is performed. That is, at time t27, the polarity of the deviation ΔI cannot be considered.

In response to the reverse of the polarity of the deviation current deviation ΔI, the operation mode of the feedback unit 17 is switched to the feedback control mode. Thus, for the next pulse cycle Cp(n+6) from the time t28 to time t29, the feedback command-current value Iref is selected as the target current value Idir (see steps S10, S14A, S14B, and S15). At that time, the target current value Idir for the next pulse cycle Cp(n+6) is calculated based on the value Vd of the output voltage Vout measured during the pulse cycle Cp(n+5) and the command voltage value Vref determined during it. For this reason, the target current value Idir for the next pulse cycle Cp(n+6) is more likely to be different from that for the pulse cycle Cp(n). In addition, each of the target current value Idir for the pulse cycle Cp(n) and that obtained for the next pulse cycle Cp(n+7) is set to be higher than the input current Id.

During the pulse cycle Cp(n+6) from the time t28 to the time t29, the polarity of the deviation ΔI between the measured input-current value Id and the target current value Idir is not reversed, which is expressed by the equation Idir>Id. For this reason, the operation mode of the feedback unit 17 is switched to the direct control mode. In addition, the polarity of the deviation ΔI between the measured input-current value Id and the target current value Idir has been reversed at least once during the previous pulse cycle Cp(n+5). Thus, in the direct control mode, subtracting the first preset value α from the target current value Idir output in the pulse cycle Cp(n+6) obtains the subtracted current value Isub. The subtracted current value Isub is selected as the target current value Idir for the next pulse cycle Cp(n+7) from the time t129 to time t2a (see steps S10, S11A, S20, S11B, and S12).

As described above, if the polarity of the current deviation ΔI has never been reversed during previous N pulse cycles including a current pulse cycle Cp (NO in step S20), the feedback unit 17 according to the second embodiment subtracts, in the current pulse cycle Cp, the second preset value β, which is higher than the first preset value α, from the target current value Idir selected by the selector 17b in the previous pulse cycle, thus outputting a subtracted current value Isub for the next pulse cycle as a result of the subtraction.

This configuration immediately reduces, by the second preset value β higher than the first preset value α, the current deviation ΔI between the measured input-current value Id and the subtracted value Isub even if the feedback control of the output voltage value Vd by the feedback calculator 17c may make it difficult to match the measured output-voltage value Vd with the command voltage value Vref in each pulse cycle Cp. This achieves an effect of eliminating the need to increase the withstand-voltage characteristics of the load Z and some elements of the power converter 10A, resulting in greater reduction of the manufacturing cost of the power converter 10A in addition to the aforementioned effects achieved by the power converter 10.

In addition, rapidly reducing the deviation between the target current value Idir and the measured input-current value Id makes it possible to more reliably maintain, at a high level, the balance between a positive peak level of the input current flowing through the primary winding L1 and a negative peak level of the input current flowing through the primary winding L1 during one switching cycle Csw. This more reliably suppresses the transformer Tr1 from being magnetically biased, thus preventing the occurrence of an overcurrent through the switching elements Q1 to Q4 of the switch circuit 11A.

Note that, in the second embodiment, the N showing the number of pulse cycles Cp that has sequentially elapsed in the direct control mode is set to 3, but a given integer equal to or higher than 1 can be used as the N.

Third Embodiment

Power converters 10 according to a third embodiment of the present disclosure will be described hereinafter with reference to FIGS. 6 to 9.

The structure and/or functions of the power converters 10 according to the third embodiment are different from those of the power converter 10 by the following points. So, the different points will be mainly described hereinafter, and therefore, redundant descriptions of like parts between the embodiments, to which like reference characters are assigned, are omitted or simplified.

One of the power converters 10 according to a first aspect of the third embodiment, which will be referred to as a power converter 10B hereinafter, is operative to perform, for each switching cycle Csw, one of different subtraction processes that uses the respective first preset value α and third preset value γ lower than the first preset value α according to the number that the polarity of the current deviation ΔI is reversed during the corresponding switching cycle Csw.

The other of the power converters 10 according to a second aspect of the third embodiment, which will be referred to as a power converter 10C hereinafter, is operative to perform, for each switching cycle Csw, the other of the different subtraction processes that uses the respective first preset value α and third preset value γ according to how an input current flowing through the switching elements Q1 and Q4 or the switching elements Q2 and Q3 flows.

Note that an input current flowing through the switching elements Q1 and Q4 when the switching elements Q1 and Q4 are simultaneously on will be referred to as a Q1-side current. Similarly, an input current flowing through the switching elements Q2 and Q3 when the switching elements Q2 and Q3 are simultaneously on will be referred to as a Q2-side current.

In the power converter 10B according to the first aspect of the third embodiment, the selection control task is slightly different from that according to the first embodiment. The different points therebetween will be described hereinafter.

Figure 6:
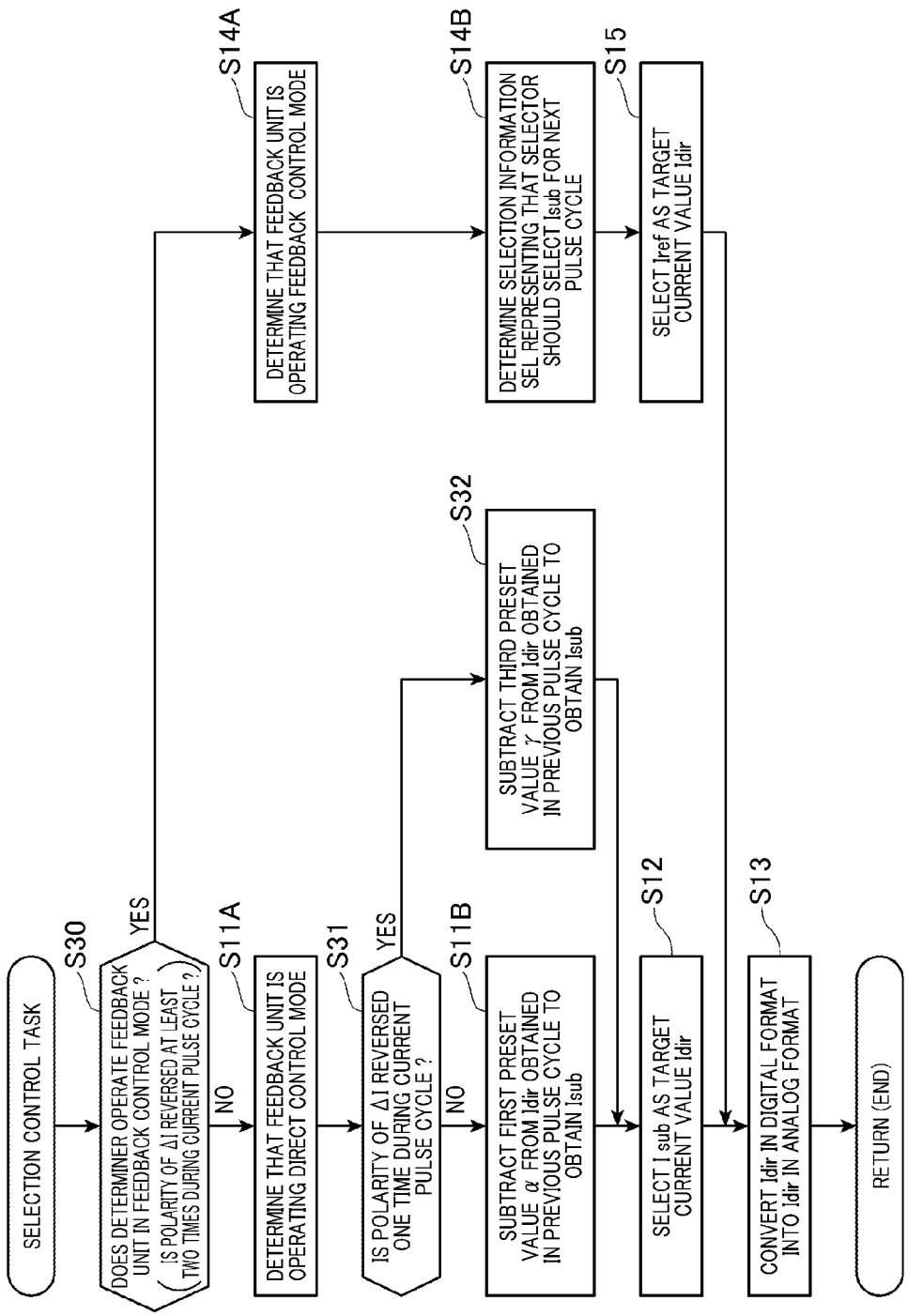
FIG. 6 is a flowchart schematically illustrating the selection control task carried out by the feedback unit of a power converter according to a first aspect of a third embodiment of the present disclosure.

FIG. 6 schematically illustrates specific operations of the selection control task according to the first aspect of the third embodiment. The feedback unit 17 performs the selection control task after initialization of the power converter 10 in each switching cycle Csw.

In the selection control task illustrated in FIG. 6, the feedback unit 17 serves as the determiner 17e to determine whether to operate the feedback unit 17 in the feedback control mode based on the current deviation ΔI in step S30. Specifically, in step S30, the determiner 17e determines whether the polarity of the current deviation ΔI is reversed at least two times during a current switching cycle Csw in step S30. In other words, the feedback unit 17 determines whether the polarity of the current deviation ΔI is reversed at least two times before the current switching cycle Csw has elapsed since turn-on of a corresponding pair of switching elements in step S30.

Upon determination that the polarity of the current deviation ΔI is reversed at least two times during a current switching cycle Csw (YES in step S30), the feedback unit 17 recognizes that the actual current value Id is not deviated from the feedback command-current value Iref.

Then, the feedback unit 17 serves as the determiner 17e to determine that the feedback unit 17 is operating in the feedback control mode in step S14B. This causes the feedback processor 17c to calculate the feedback command-current value Iref based on the difference Δ between the measured value Vd of the output voltage Vout and the command voltage value Vref. This results in the feedback control of the output voltage Vout of the power converter 10 being performed based on the target current value Idir corresponding to the feedback command-current value Iref.

Next, in step S14B, the feedback unit 17 serves as the determiner 17e to determine the selection information SEL representing that the feedback command-current value Iref should be selected as the target current value Idir in the digital format for the next switching cycle.

Thus, in the next switching cycle, the feedback unit 17 serves as the selector 17b to select the feedback command-current value Iref as the target current value Idir for the next switching cycle based on the selection information SEL in step S15.

Following the operation in step S15, in the next switching cycle, the feedback unit 17 serves as the DAC 17a to convert the target current value Idir in the digital format into the target current value Idir in the analog format, and to output the target current value Idir to the deviation calculator 16 in step S13. After the operation in step S13, the feedback unit 17 terminates the selection control task.

Otherwise, upon determination that the polarity of the current deviation ΔI is not reversed at least two times during the current switching cycle Csw (NO in step S30), the feedback unit 17 recognizes that the actual current value Id is deviated from the target current value Idir due to, for example, the input DC voltage Vin to the switch circuit 11A being within a low-level range. As a result, the feedback control of the output voltage value Vd by the feedback calculator 17c may make it difficult to match the measured output-voltage value Vd with the command voltage value Vref in each switching cycle Csw.

Then, the feedback unit 17 serves as the determiner 17e to determine that the feedback unit 17 is operating in the direct control mode in step S11A.

Next, in step S31, the determiner 17e determines whether the polarity of the current deviation ΔI is reversed one time during a current switching cycle Csw in step S30.

Upon determination that the polarity of the current deviation ΔI is never reversed during a current switching cycle Csw (NO in step S31), the feedback unit 17 performs the operation in step S11B in the same manner as the feedback unit 17 according to the first embodiment. That is, the operation in step S11B subtracts the first preset value α from the target current value Idir selected by the selector 17b in the previous cycle to obtain a subtracted current value Isub.

Otherwise, upon determination that the polarity of the current deviation ΔI is reversed one time during a current switching cycle Csw (YES in step S31), the feedback unit 17 recognizes that the actual current value Id is slightly deviated from the target current value Idir. In other words, the current deviation ΔI is within a predetermined current level. Then, the feedback unit 17 serves as the calculator 17f to perform an operation in step S32. The operation subtracts the third preset value γ from the target current value Idir selected by the selector 17b in the previous switching cycle to obtain a subtracted current value Isub; the third preset value γ is lower than the first preset value α. The operation in step S32 is expressed as an equation as follows:

$$I\text{sub} = I\text{dir} - \gamma$$

That is, in step S32, the feedback unit 17 causes the target current value Idir obtained in the previous switching cycle Csw to approach, as the subtracted value Isub, the measured input-current value Id by the third preset value γ.

In step S32, the feedback unit 17 serves as the determiner 17e to determine the selection information SEL representing that the subtracted value Isb should be selected as the target current value Idir in the digital format for the next switching cycle.

The other operations in the selection control task carried out by the feedback unit 17 of the power converter 10B according to the first aspect of the third embodiment are identical to those in the selection control task according to the first embodiment, and therefore, descriptions of them are omitted.

Figure 7:
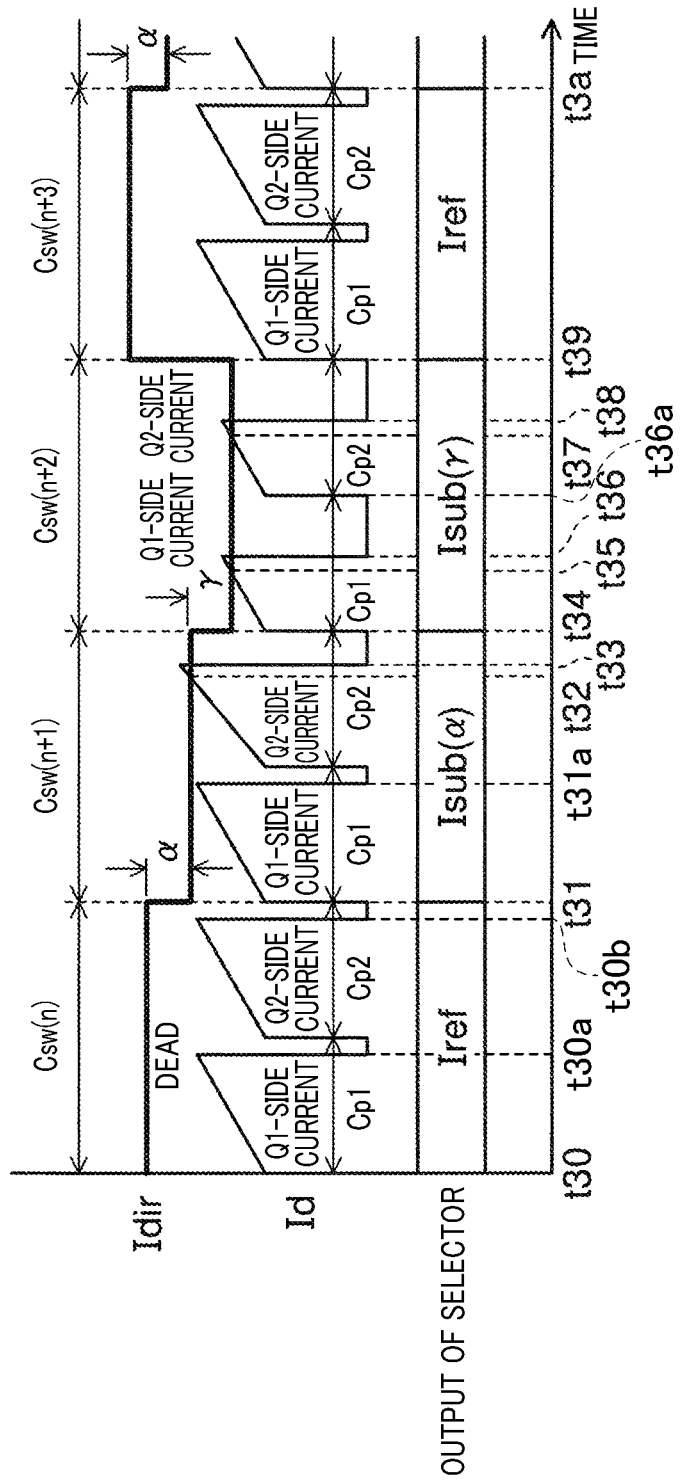
FIG. 7 is a timing chart schematically illustrating an example of how: a target current value, a measured input-current value, and output of a selector vary during execution of the selection control task according to the first aspect of the third embodiment.

FIG. 7 schematically illustrates an example of how: the target current value Idir in the digital/analog format, the measured input-current value Id, and the output of the selector 17b vary during execution of the selection control task according to the first aspect of the third embodiment. The variations of the respective parameters illustrated in FIG. 7 are examples of them, and therefore, the variations of the respective parameters can be changed depending on variations of the output voltage Vout, the load Z, and other electrical parameters. As described above, each switching cycle Csw consists of two pulse cycles Cp. In the first aspect of the third embodiment, the former pulse cycle Cp during a switching cycle Csw will be referred to as a first pulse cycle Cp1, and the latter pulse cycle Cp during the same switching cycle Csw will be referred to as a second pulse cycle Cp2.

It is assumed that, during a previous switching cycle Csw (n−1) previous to a pulse cycle Csw(n) from time t30 to time t31 illustrated in FIG. 7, the polarity of the current deviation ΔI between the measured input-current value Id and the target current value Idir is reversed two times. As a result, the operation mode of the feedback unit 17 is set to the feedback control mode, and the feedback command-current value Iref is selected as the target current value Idir used by the deviation calculator 16 for the next switching cycle Csw(n) (see steps S30, S14A, S14B, and S15).

At the start of the first pulse cycle Cp1 of the switching cycle Csw(n), i.e. at the time t30, the driver 14 supplies the PWM signals to, for example, the first set of switching elements Q1 and Q4 to simultaneously turn them on while keeping off the second set of switching elements Q2 and Q3. The driver 14 continues the on state of the switching elements Q1 and Q4 to time 30a that is before the time corresponding to the end of the first pulse cycle Cp1 by the dead time DEAD.

After lapse of the dead time DEAD, at the start of the second pulse cycle Cp2 of the switching cycle Csw(n), the driver 14 supplies the PWM signals to the second set of switching elements Q2 and Q3 to simultaneously turn them on while keeping off the first set of switching elements Q1 and Q4. The driver 14 continues the on state of the switching elements Q2 and Q3 up to time t30b that is before the time corresponding to the end of the pulse cycle Cp2, i.e., the end of the switching cycle Csw(n) by the dead time DEAD. That is, as described above, the driver 14 alternately turns on the first set of switching elements Q1 and Q4 and the second set of switching elements Q2 and Q3 during the switching cycle Csw (n).

During the switching cycle Csw(n), the polarity of the deviation ΔI between the measured input-current value Id and the target current value Idir is not reversed at least two times, and not reversed one time, which is expressed by the equation Idir>Id. For these reasons, the operation mode of the feedback unit 17 is switched to the direct control mode. In the direct control mode, subtracting the first preset value α from the target current value Idir output in the switching cycle Csw(n) obtains the subtracted current value Isub. The subtracted current value Isub is selected as the target current value Idir for the next switching cycle Csw(n+1) from the time t31 to time t32 (see steps S30, S11A, S31, S11B, and S12).

After lapse of the dead time DEAD, at the start of the first pulse cycle Cp1 of the switching cycle Csw(n+1), i.e. at the time t31, the driver 14 supplies the PWM signals to the first set of switching elements Q1 and Q4 to simultaneously turn them on while keeping off the second set of switching elements Q2 and Q3. The driver 14 continues the on state of the switching elements Q1 and Q4 to time 31a that is before the time corresponding to the end of the first pulse cycle Cp1 by the dead time DEAD.

After lapse of the dead time DEAD, at the start of the second pulse cycle Cp2 of the switching cycle Csw(n+1), the driver 14 supplies the PWM signals to the second set of switching elements Q2 and Q3 to simultaneously turn them on while keeping off the first set of switching elements Q1 and Q4.

During the switching cycle Csw(n+1) from the time t31 to time t34, the polarity of the deviation ΔI between the measured input-current value Id and the target current value Idir is not reversed at least two times, but is reversed one time at time t32. This means that the measured input-current value Id instantly exceeds the target current value Idir one time at the time t32, which is expressed by the equation Idir<Id.

Then, output of the PWM signals for the corresponding pair of switching elements, that is Q2 and Q3, are stopped from the driver 14 (see time t33). This causes the corresponding switching elements Q2 and Q3 to be turned off at the time t33. Theoretically, it is preferable to turn off the corresponding switching elements Q2 and Q3 simultaneously with the reverse of the polarity of the deviation ΔI, i.e., the time t32 is identical to the time t33. The delay of the turnoff of the corresponding switching elements Q2 and Q3 relative to the reverse of the polarity of the deviation ΔI is based on the response delay of the feedback unit 17.

Note that, at the time t33, because no PWM signals are output to the switching elements Q2 and Q3, no calculation of the deviation ΔI is performed. That is, at time t33, the polarity of the deviation ΔI cannot be considered.

The polarity of the deviation ΔI between the measured input-current value Id and the target current value Idir is reversed one time at time t32 during the switching cycle Csw(n+1). For this reason, for the next switching cycle Csw (n+2) from the time t34 to time t39, subtracting the third preset value γ from the target current value Idir output in the switching cycle Csw(n+1) obtains the subtracted current value Isub. The subtracted current value Isub is selected as the target current value Idir (see steps S30, S11A, S31, S32, and S12).

After lapse of the dead time DEAD, at the start of the first pulse cycle Cp1 of the switching cycle Csw(n+2), the driver 14 supplies the PWM signals to the first set of switching elements Q1 and Q4 to simultaneously turn them on while keeping off the second set of switching elements Q2 and Q3.

During the switching cycle Csw(n+2) from the time t34 to time t39, the polarity of the deviation ΔI between the measured input-current value Id and the target current value Idir is reversed first at time t35. This means that the measured input-current value Id instantly exceeds the target current value Idir at the time t35, which is expressed by the equation Idir<Id.

Then, output of the PWM signals for the corresponding pair of switching elements, that is Q1 and Q4, are stopped from the driver 14 (see time t36). This causes the corresponding switching elements Q1 and Q4 to be turned off at the time t36. Note that, at the time t36, because no PWM signals are output to the switching elements Q1 and Q4, no calculation of the deviation ΔI is performed. That is, at time t36, the polarity of the deviation ΔI cannot be considered.

Thereafter, at the start of the second pulse cycle Cp2 of the switching cycle Csw(n+2), the driver 14 supplies the PWM signals to the second set of switching elements Q2 and Q3 to simultaneously turn them on while keeping off the first set of switching elements Q1 and Q4.

During the switching cycle Csw(n+2), the polarity of the deviation ΔI between the measured input-current value Id and the target current value Idir is reversed again at time t37. This means that the measured input-current value Id instantly exceeds the target current value Idir at the time t37, which is expressed by the equation Idir<Id.

Then, output of the PWM signals for the corresponding pair of switching elements, that is Q2 and Q3, are stopped from the driver 14 (see time t38). This causes the corresponding switching elements Q2 and Q3 to be turned off at the time t38. Note that, at the time t38, because no PWM signals are output to the switching elements Q2 and Q3, no calculation of the deviation ΔI is performed. That is, at time t38, the polarity of the deviation ΔI cannot be considered.

That is, during the switching cycle Csw(n+2) from the time t34 to the time t39, the polarity of the deviation ΔI between the measured input-current value Id and the target current value Idir is reversed two times. Then, the operation mode of the feedback unit 17 for the next switching cycle Csw(n+3) is switched to the feedback control mode in response to the reverse of the polarity of the deviation ΔI. Thus, for the next switching cycle Csw(n+3) from the time t39 to time t3a, the feedback command-current value Iref is selected as the target current value Idir (see steps S30, S14A, S14B, and S15). At that time, the target current value Idir for the next switching cycle Csw(n+3) is calculated based on the value Vd of the output voltage Vout measured during the switching cycle Csw(n+2) and the command voltage value Vref determined during it. For this reason, the target current value Idir for the next switching cycle Csw(n+3) is more likely to be different from that for the switching cycle Csw(n) and for the pulse cycle Cp(n+4). In addition, each of the target current value Idir for the switching cycle Csw(n) and that obtained for the next switching cycle Csw(n+3) is set to be higher than the input current Id.

During the switching cycle Csw(n+3), the polarity of the deviation ΔI between the measured input-current value Id and the target current value Idir is not reversed two times, and not reversed one time, which is expressed by the equation Idir>Id. For these reasons, the operation mode of the feedback unit 17 is switched to the direct control mode. In the direct control mode, subtracting the first preset value α from the target current value Idir output in the switching cycle Csw(n+3) obtains the subtracted current value Isub. The subtracted current value Isub is selected as the target current value Idir for the next switching cycle (see steps S30, S11A, S31, S11B, and S12).

After the time t3a, during a current switching cycle, selection of one of the feedback command-current value Iref and the subtracted current value Isub as the target current value Idir for the next switching cycle is carried out as described above.

Specifically, if the polarity of the deviation ΔI between the measured input-current value Id and the target current value Idir is reversed two times during the current switching cycle, the feedback command-current value Iref obtained during the current switching cycle is selected as the target current value Idir for the next switching cycle. Otherwise, if the polarity of the deviation ΔI between the measured input-current value Id and the target current value Idir is reversed one time during the current switching cycle, the subtracted current value Isub based on the third preset value γ is selected as the target current value Idir for the next switching cycle. In addition, if the polarity of the deviation ΔI between the measured input-current value Id and the target current value Idir is not reversed during the current switching cycle, the subtracted current value Isub based on the first preset value α is selected as the target current value Idir for the next switching cycle.

In the power converter 10C according to the second aspect of the third embodiment, the selection control task is slightly different from that according to the first aspect of the third embodiment only by the following point. Thus, the different point therebetween will be described hereinafter.

Figure 8:
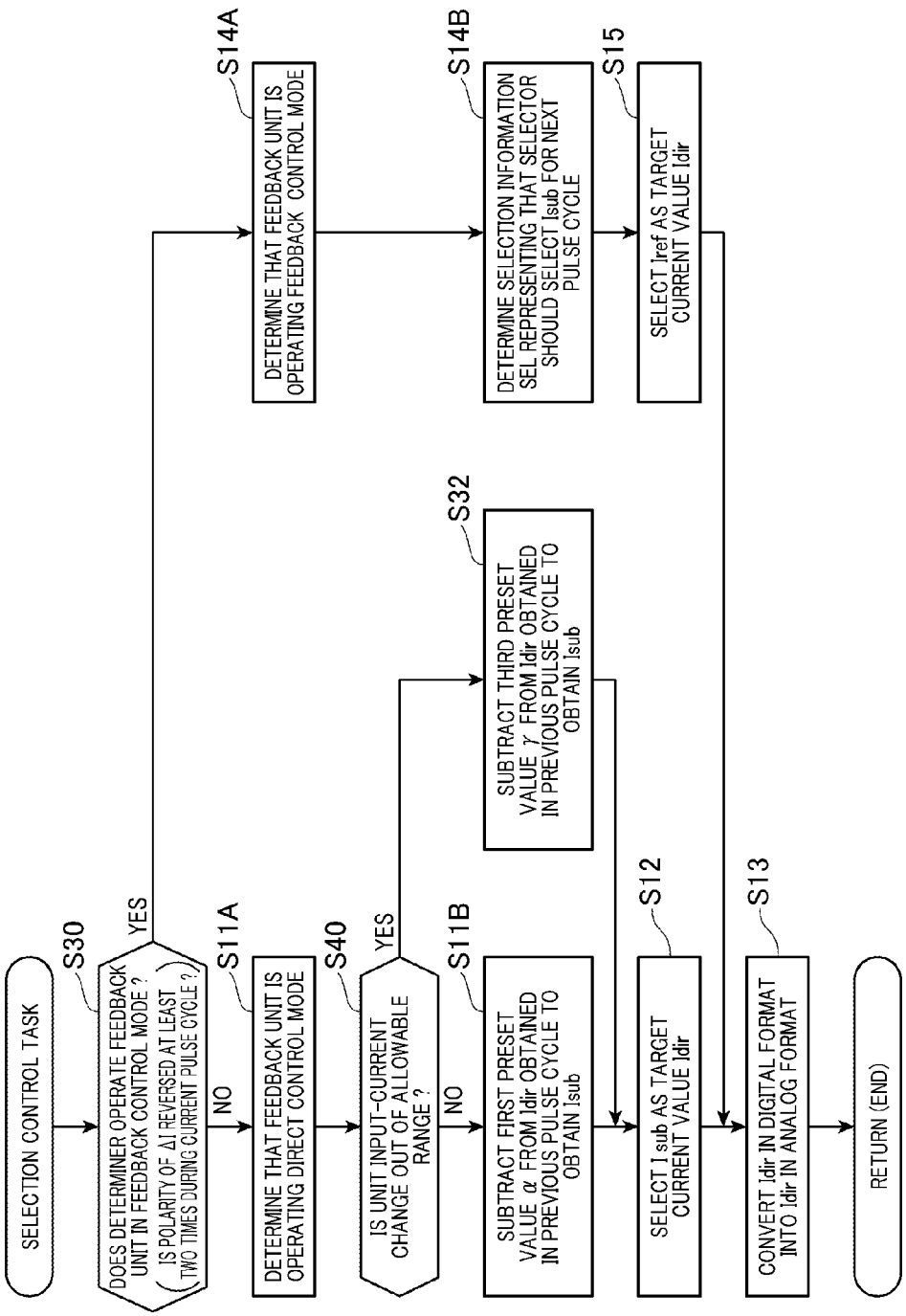
FIG. 8 is a flowchart schematically illustrating the selection control task carried out by the feedback unit of a power converter according to a second aspect of the third embodiment of the present disclosure.

FIG. 8 schematically illustrates specific operations of the selection control task according to the second aspect of the third embodiment. The feedback unit 17 performs the selection control task after initialization of the power converter 10 in each switching cycle Csw.

In the selection control task illustrated in FIG. 8, upon determination that the polarity of the current deviation ΔI is not reversed at least two times during the current switching cycle Csw (NO in step S30), the feedback unit 17 recognizes that the actual current value Id is deviated from the target current value Idir due to, for example, the input DC voltage Vin to the switch circuit 11A being within a low-level range. As a result, the feedback control of the output voltage value Vd by the feedback calculator 17c may make it difficult to match the measured output-voltage value Vd with the command voltage value Vref in each switching cycle Csw.

Then, the feedback unit 17 serves as the determiner 17e to determine that the feedback unit 17 is operating in the direct control mode in step S11A.

Following the operation in step S11A, the feedback unit 17 serves as the determiner 17e to perform an operation in step S40 different from the operation in step S31.

Specifically, in step S40, the determiner 17e determines whether a quantity of change of the measured input-current value Id per unit time is out of an allowable current range Ialw. In other words, the determiner 17e determines whether the rate of change of the measured input-current value Id is out of the allowable current range Ialw in step S40. The measured quantity of change of the measured input-current value Id per unit time will be referred to as a unit input-current change hereinafter. Note that the allowable current-range Ialw can be optionally set.

Upon determination that the unit input-current change is within the allowable current range Ialw (NO in step S31), the feedback unit 17 performs the operation in step S11B in the same manner as the feedback unit 17 according to the first embodiment. That is, the operation in step S11B subtracts the first preset value α from the target current value Idir selected by the selector 17b in the previous cycle to obtain a subtracted current value Isub.

Otherwise, upon determination that the unit input-current change is out of the allowable current range Ialw (YES in step S31), the feedback unit 17 recognizes that the actual current value Id is only slightly deviated from the target current value Idir. In other words, the current deviation ΔI is within the predetermined current level. Then, the feedback unit 17 serves as the calculator 17f to perform the operation in step S32. The operation subtracts the third preset value γ from the target current value Idir selected by the selector 17b in the previous switching cycle to obtain a subtracted current value Isub; the third preset value γ is lower than the first preset value α. In step S32, the calculator 17f can determine the third preset value γ using, for example, predetermined calculations based on the unit input-current change That is, in step S32, the feedback unit 17 causes the target current value Idir obtained in the previous switching cycle Csw to approach, as the subtracted value Isub, the measured input-current value Id by the third preset value γ.

In step S32, the feedback unit 17 serves as the determiner 17e to determine the selection information SEL representing that the subtracted value Isb should be selected as the target current value Idir in the digital format for the next switching cycle.

The other operations in the selection control task carried out by the feedback unit 17 of the power converter 10B according to the second aspect of the third embodiment are identical to those in the selection control task according to the first aspect of the third embodiment, and therefore, descriptions of them are omitted.

Figure 9:
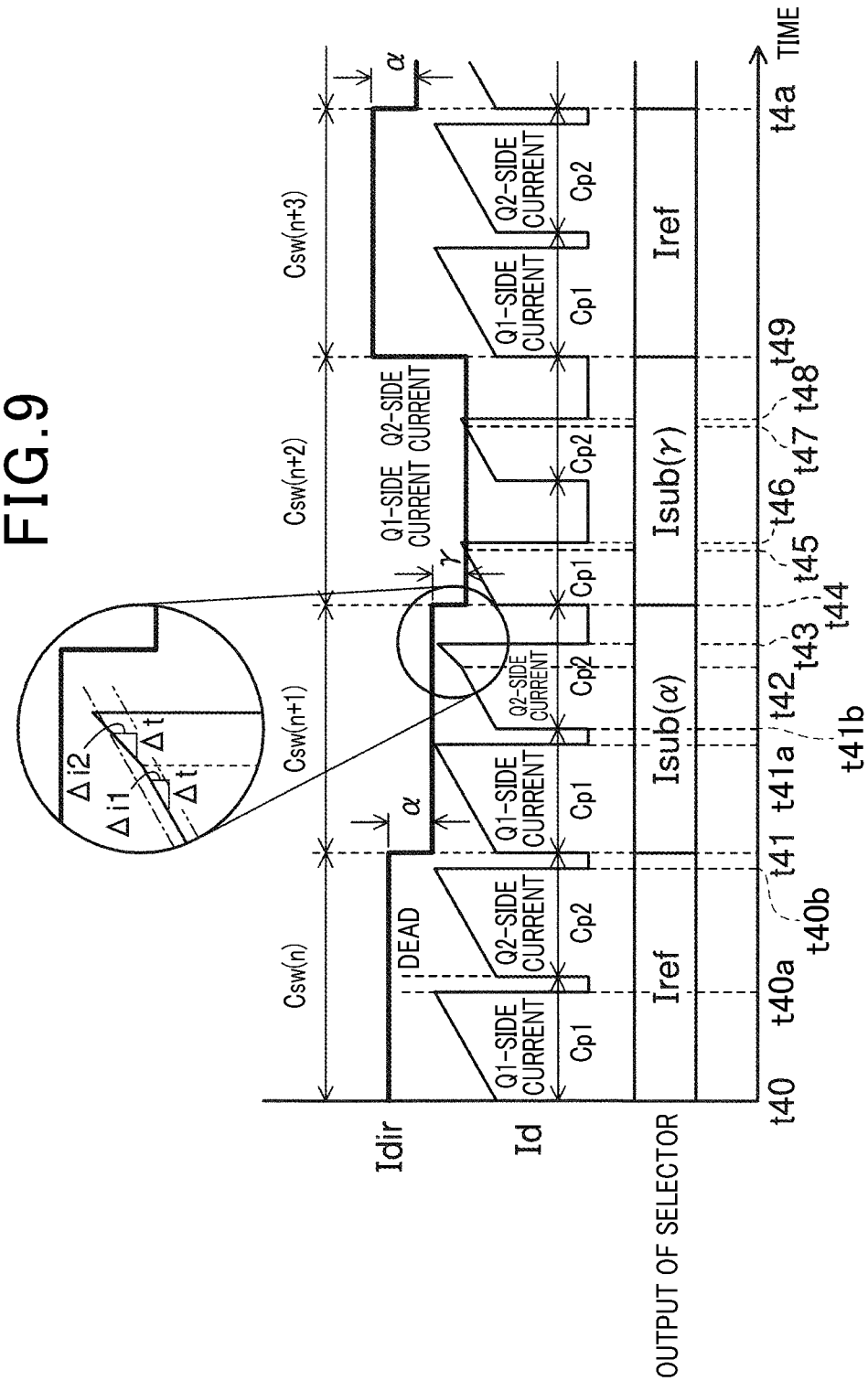
FIG. 9 is a timing chart schematically illustrating an example of how: a target current value, a measured input-current value, and output of a selector vary during execution of the selection control task according to the second aspect of the third embodiment.

FIG. 9 schematically illustrates an example of how: the target current value Idir in the digital/analog format, the measured input-current value Id, and the output of the selector 17b vary during execution of the selection control task according to the second aspect of the third embodiment. The variations of the respective parameters illustrated in FIG. 9 are examples of them, and therefore, the variations of the respective parameters can be changed depending on variations of the output voltage Vout, the load Z, and other electrical parameters. As described above, each switching cycle Csw consists of two pulse cycles Cp. Like the first aspect, the former pulse cycle Cp during a switching cycle Csw will be referred to as a first pulse cycle Cp1, and the latter pulse cycle Cp during the same switching cycle Csw will be referred to as a second pulse cycle Cp2. In addition, unit time will be referred to as Δt hereinafter.

It is assumed that, during a previous switching cycle Csw (n−1) previous to a pulse cycle Csw(n) from time t40 to time t41 illustrated in FIG. 9, the polarity of the current deviation ΔI between the measured input-current value Id and the target current value Idir is reversed two times. As a result, the operation mode of the feedback unit 17 is set to the feedback control mode, and the feedback command-current value Iref is selected as the target current value Idir used by the deviation calculator 16 for the next switching cycle Csw(n) (see steps S30, S14A, S14B, and S15).

At the start of the first pulse cycle Cp1 of the switching cycle Csw(n), i.e., at the time t40, the driver 14 supplies the PWM signals to, for example, the first set of switching elements Q1 and Q4 to simultaneously turn them on while keeping off the second set of switching elements Q2 and Q3. The driver 14 continues the on state of the switching elements Q1 and Q4 to time 40a that is before the time corresponding to the end of the first pulse cycle Cp1 by the dead time DEAD.

After lapse of the dead time DEAD, at the start of the second pulse cycle Cp2 of the switching cycle Csw(n), the driver 14 supplies the PWM signals to the second set of switching elements Q2 and Q3 to simultaneously turn them on while keeping off the first set of switching elements Q1 and Q4. The driver 14 continues the on state of the switching elements Q2 and Q3 up to time t40b that is before the time corresponding to the end of the pulse cycle Cp2, i.e., the end of the switching cycle Csw(n) by the dead time DEAD. That is, as described above, the driver 14 alternately turns on the first set of switching elements Q1 and Q4 and the second set of switching elements Q2 and Q3 during the switching cycle Csw (n).

During the switching cycle Csw(n), the polarity of the deviation ΔI between the measured input-current value Id and the target current value Idir is not reversed at least two times, which is expressed by the equation Idir>Id, and the unit input-current change, which is expressed as Δi1/Δt, of each of the Q1- and Q2-side currents during the time t40 to the time t41 is within the allowable current range Ialw. For these reasons, the operation mode of the feedback unit 17 is switched to the direct control mode. In the direct control mode, subtracting the first preset value α from the target current value Idir output in the switching cycle Csw(n) obtains the subtracted current value Isub. The subtracted current value Isub is selected as the target current value Idir for the next switching cycle Csw(n+1) from the time t41 to time t44 (see steps S30, S11A, S40, S11B, and S12).

After lapse of the dead time DEAD, at the start of the first pulse cycle Cp1 of the switching cycle Csw(n+1), i.e. at the time t41, the driver 14 supplies the PWM signals to the first set of switching elements Q1 and Q4 to simultaneously turn them on while keeping off the second set of switching elements Q2 and Q3. The driver 14 continues the on state of the switching elements Q1 and Q4 to time 41a that is before the time corresponding to the end of the first pulse cycle Cp1 by the dead time DEAD.

After lapse of the dead time DEAD, at time t41b corresponding to the start of the second pulse cycle Cp2 of the switching cycle Csw(n+1), the driver 14 supplies the PWM signals to the second set of switching elements Q2 and Q3 to simultaneously turn them on while keeping off the first set of switching elements Q1 and Q4.

During the switching cycle Csw(n+1) from the time t41 to time t44, the polarity of the deviation ΔI between the measured input-current value Id and the target current value Idir is not reversed at least two times. In addition, during each of the period from the time t41 to the time t41a and the period from the time t41b to time t42 in the switching cycle Csw(n+1), the unit input-current change Δi1/Δt of a corresponding one of the Q1- and Q2-side currents is within the allowable current range Ialw. However, at the time t42, the unit input-current change Δi2/Δt of the Q2-side current is out of the allowable current range Ialw.

Then, output of the PWM signals for the corresponding pair of switching elements, that is Q2 and Q3, are stopped from the driver 14 (see time t43). This causes the corresponding switching elements Q2 and Q3 to be turned off at the time t43. Theoretically, it is preferable to turn off the corresponding switching elements Q2 and Q3 simultaneously with the reverse of the polarity of the deviation ΔI, i.e., the time t42 is identical to the time t43. The delay of the turnoff of the corresponding switching elements Q2 and Q3 relative to the reverse of the polarity of the deviation ΔI is based on the response delay of the feedback unit 17.

Note that, at the time t43, because no PWM signals are output to the switching elements Q2 and Q3, no calculation of the deviation ΔI is performed. That is, at time t43, the polarity of the deviation ΔI cannot be considered.

The unit input-current change Δi2/Δt is out of the allowable current range Ialw at the time t42 during the switching cycle Csw (n+1). For this reason, for the next switching cycle Csw(n+2) from the time t44 to time t49, subtracting the third preset value γ from the target current value Idir output in the switching cycle Csw(n+1) obtains the subtracted current value Isub. The subtracted current value Isub is selected as the target current value Idir (see steps S30, S11A, S40, S32, and S12).

After lapse of the dead time DEAD, at the start of the first pulse cycle Cp1 of the switching cycle Csw(n+2), the driver 14 supplies the PWM signals to the first set of switching elements Q1 and Q4 to simultaneously turn them on while keeping off the second set of switching elements Q2 and Q3.

During the switching cycle Csw(n+2) from the time t44 to time t49, the polarity of the deviation ΔI between the measured input-current value Id and the target current value Idir is reversed first at time t45. This means that the measured input-current value Id instantly exceeds the target current value Idir at the time t45, which is expressed by the equation Idir<Id.

Then, output of the PWM signals for the corresponding pair of switching elements, that is Q1 and Q4, are stopped from the driver 14 (see time t46). This causes the corresponding switching elements Q1 and Q4 to be turned off at the time t46. Note that, at the time t46, because no PWM signals are output to the switching elements Q1 and Q4, no calculation of the deviation ΔI is performed. That is, at time t46, the polarity of the deviation ΔI cannot be considered.

Thereafter, at the start of the second pulse cycle Cp2 of the switching cycle Csw(n+2), the driver 14 supplies the PWM signals to the second set of switching elements Q2 and Q3 to simultaneously turn them on while keeping off the first set of switching elements Q1 and Q4.

During the switching cycle Csw(n+2), the polarity of the deviation ΔI between the measured input-current value Id and the target current value Idir is reversed again at time t47. This means that the measured input-current value Id instantly exceeds the target current value Idir at the time t47, which is expressed by the equation Idir<Id.

Then, output of the PWM signals for the corresponding pair of switching elements, that is Q2 and Q3, are stopped from the driver 14 (see time t48). This causes the corresponding switching elements Q2 and Q3 to be turned off at the time t48. Note that, at the time t48, because no PWM signals are output to the switching elements Q2 and Q3, no calculation of the deviation ΔI is performed. That is, at time t48, the polarity of the deviation ΔI cannot be considered.

That is, during the switching cycle Csw(n+2) from the time t44 to the time t49, the polarity of the deviation ΔI between the measured input-current value Id and the target current value Idir is reversed two times. Then, the operation mode of the feedback unit 17 for the next switching cycle Csw(n+3) is switched to the feedback control mode in response to the reverse of the polarity of the deviation ΔI. Thus, for the next switching cycle Csw(n+3) from the time t49 to time t4a, the feedback command-current value Iref is selected as the target current value Idir (see steps S30, S14A, S14B, and S15). At that time, the target current value Idir for the next switching cycle Csw(n+3) is calculated based on the value Vd of the output voltage Vout measured during the switching cycle Csw(n+2) and the command voltage value Vref determined during it. For this reason, the target current value Idir for the next switching cycle Csw(n+3) is more likely to be different from that for the switching cycle Csw(n). In addition, each of the target current value Idir for the switching cycle Csw(n) and that obtained for the next switching cycle Csw(n+3) is set to be higher than the input current Id.

During the switching cycle Csw(n+3), the polarity of the deviation ΔI between the measured input-current value Id and the target current value Idir is not reversed at least two times, and the unit input-current change Δi1/Δt is within the allowable current range Ialw. For these reasons, the operation mode of the feedback unit 17 is switched to the direct control mode. In the direct control mode, subtracting the first preset value α from the target current value Idir output in the switching cycle Csw(n+3) obtains the subtracted current value Isub. The subtracted current value Isub is selected as the target current value Idir for the next switching cycle (see steps S30, S11A, S40, S11B, and S12).

After the time t4a, during a current switching cycle, selection of one of the feedback command-current value Iref and the subtracted current value Isub as the target current value Idir for the next switching cycle is carried out as described above.

Specifically, if the polarity of the deviation ΔI between the measured input-current value Id and the target current value Idir is reversed at least two times during the current switching cycle, the feedback command-current value Iref obtained during the current switching cycle is selected as the target current value Idir for the next switching cycle. Otherwise, if the polarity of the deviation ΔI between the measured input-current value Id and the target current value Idir is not reversed at least two times during the current switching cycle, and a unit input-current change during the current switching cycle is out of the allowable current range Ialw, the subtracted current value Isub based on the third preset value γ is selected as the target current value Idir for the next switching cycle. In addition, if the polarity of the deviation ΔI between the measured input-current value Id and the target current value Idir is not reversed at least two times during the current switching cycle, and a unit input-current change during the current switching cycle is within the allowable current range Ialw, the subtracted current value Isub based on the first preset value α is selected as the target current value Idir for the next switching cycle.

As described above, the feedback unit 17 according to the third embodiment is configured to determine whether, in the direct control mode, the actual current value Id is slightly deviated from the target current value Idir, so that the current deviation ΔI is within the predetermined current level (see the operation in step S31 or S40).

Let us consider a case where the actual current value Id is slightly deviated from the target current value Idir (see YES in step S31 or S40). In this case, if the feedback unit 17 subtracted the first preset value α from the target current value Idir selected by the selector 17b in the previous switching cycle, thus outputting a subtracted current value Isub as the target current value Idir for the next switching cycle, a rapid decrease of the target current value Idir might cause undershoot of a corresponding one of the Q1- and Q2-side current.

Thus, the feedback unit 17 according to the third embodiment is configured to subtract the third preset value γ, which is lower than the first preset value α, from the target current value Idir selected by the selector 17b in the previous switching cycle if it is determined that the actual current value Id is slightly deviated from the target current value Idir (see YES in step S31 or S40).

This configuration prevents, even if the actual current value Id is slightly deviated from the target current value Idir, the occurrence of undershoot of a corresponding one of the Q1- and Q2-side currents in addition to the aforementioned effects achieved by the power converter 10.

Specifically, the feedback unit 17 according to the first aspect of the third embodiment is configured to determine whether, in the direct control mode, the polarity of the current deviation ΔI is reversed one time during a current switching cycle Csw (see step S31). This configuration easily determines whether the actual current value Id is slightly deviated from the target current value Idir, thus easily determining whether there is a risk of the occurrence of undershoot of a corresponding one of the Q1- and Q2-side currents. The feedback unit 17 according to the second aspect of the third embodiment is configured to determine whether, in the direct control mode, the unit input-current change is out of the allowable current range Ialw (see step S40). This configuration easily determines whether the actual current value Id is slightly deviated from the target current value Idir, thus also easily determining whether there is a risk of the occurrence of undershoot of a corresponding one of the Q1- and Q2-side currents.

Particularly, the feedback unit 17 according to the second aspect of the third embodiment is capable of determining the third preset value γ using, for example, predetermined calculations based on the unit input-current change of each of the Q1- and Q2-side currents. This can determine the third preset value γ suitable for the unit input-current change, thus more reliably preventing the occurrence of undershoot of a corresponding one of the Q1- and Q2-side currents.

Fourth Embodiment

A power converter 10D according to a fourth embodiment of the present disclosure will be described hereinafter with reference to FIGS. 10 to 12.

The structure and/or functions of the power converter 10D according to the fourth embodiment are different from those of the power converter 10 by the following points. So, the different points will be mainly described hereinafter, and therefore, redundant descriptions of like parts between the embodiments, to which like reference characters are assigned, are omitted or simplified.

Figure 10:
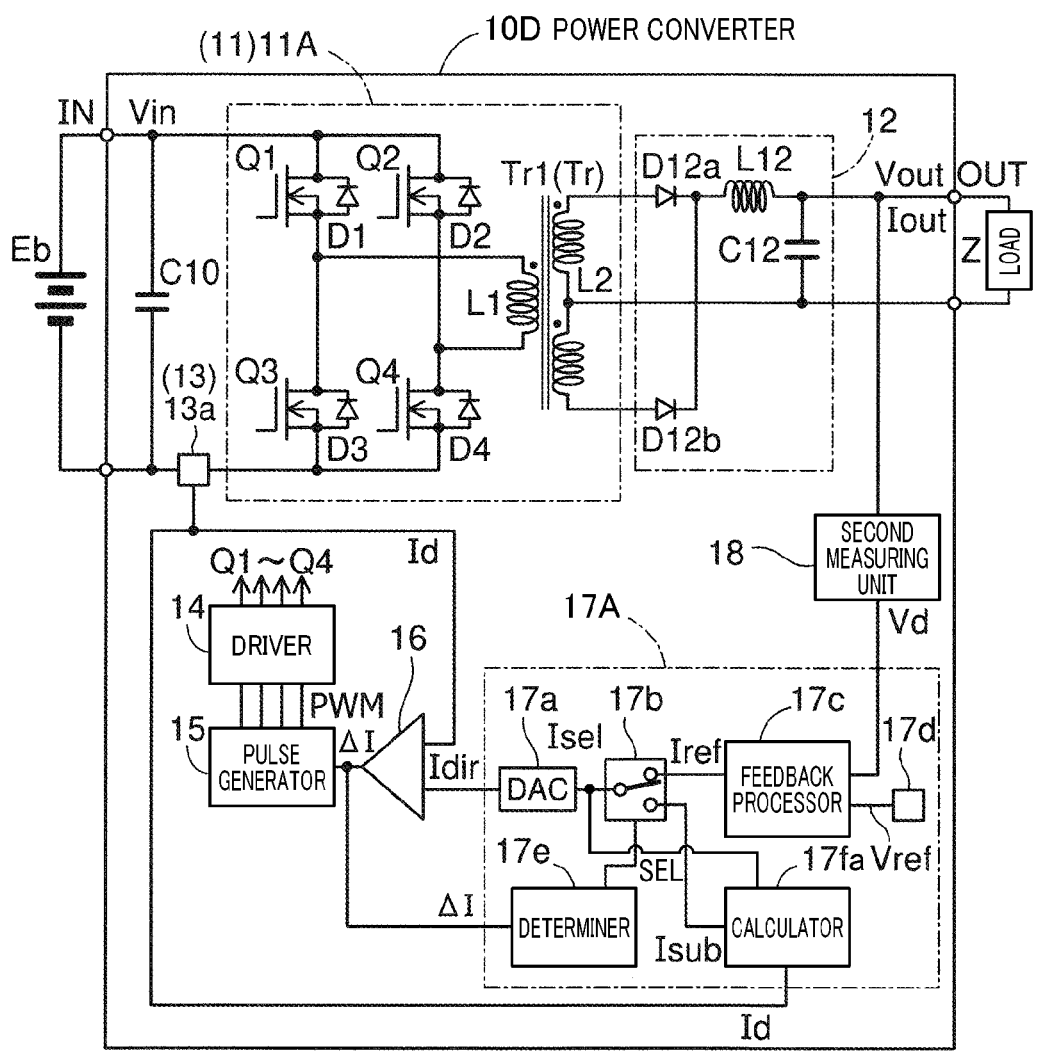
FIG. 10 is a circuit diagram schematically illustrating an example of the overall configuration of a power converter according to a fourth embodiment of the present disclosure.

Referring to FIG. 10, in the power converter 10D, the output of the first measuring unit 13a is connected to a feedback unit 17A in addition to the deviation calculator 16, so that the measured input-current value Id is input to a calculator 17fa of the feedback unit 17A in addition to the deviation calculator 16.

The calculator 17fa according to the fourth embodiment is operative to:

determine a fourth preset value δ based on a specified value Ids determined based on one or more measured input-current values Id supplied from the first measuring unit 13a during a current pulse cycle Cp; and subtract, from the target current value Idir selected by the selector 17b in the previous pulse cycle, the fourth preset value δ during the current pulse cycle Cp to thereby obtain a subtracted current value Isub.

The selection control task according to the fourth embodiment is slightly different from that according to the first embodiment. The different points therebetween will be described hereinafter with reference to FIG. 11.

The operations in steps S10 and S11A are the same as those according to the first embodiment.

Following the operation in step S11A, the feedback unit 17A serves as the calculator 17fa to perform an operation in step S50 in place of the operation in step S11B. In the operation S50, the calculator 17fa determines a specified value Ids based on one or more input-current values Id measured during a current pulse cycle Cp, and subtracts the specified value Ids from the target current value Idir selected by the selector 17b in the previous pulse cycle, thus determining the fourth preset value δ.

Then, the calculator 17fa subtracts, from the target current value Idir selected by the selector 17b in the previous pulse cycle, the fourth preset value δ to thereby obtain a subtracted current value Isub.

For example, the calculator 17fa can determine, as the specified value Ids, a minimum input-current value in the measured input-current values Id, a maximum input-current value therein, or an average value of the minimum and maximum input-current values in the measured input-current values Id. The calculator 17fa also can determine, as the specified value Ids, a value measured by the first measuring unit 13a at the time when a preset time has elapsed since the start of a corresponding current pulse cycle Cp. The calculator 17fa also can determine, as the specified value Ids, a value based on preset calculations of the measured input-current values Id.

The other operations in the selection control task according to the fourth embodiment are identical to those in the selection control task according to the first embodiment, and therefore, descriptions of them are omitted.

FIG. 12 schematically illustrates an example of how: the target current value Idir in the digital/analog format, the measured input-current value Id, and the output of the selector 17b vary during execution of the selection control task according to the second embodiment. The variations of the respective parameters illustrated in FIG. 12 are examples of them, and therefore, the variations of the respective parameters can be changed depending on variations of the output voltage Vout, the load Z, and other electrical parameters.

In the example illustrated in FIG. 12, for each of pulse cycle Cp, the fourth preset value δ is determined as the subtraction of a maximum input-current value (peak value) from the target current value Idir selected by the selector 17b in the previous pulse cycle.

It is assumed that, during a previous pulse cycle Cp(n−1) previous to a pulse cycle Cp(n) from time t50 to time t51 illustrated in FIG. 12, the polarity of the current deviation ΔI between the measured input-current value Id and the target current value Idir is reversed. As a result, the operation mode of the feedback unit 17 is set to the feedback control mode, and the feedback command-current value Iref is selected as the target current value Idir used by the deviation calculator 16 for the next pulse cycle Cp(n) (see steps S14A, S14B, and S15).

At the start of the pulse cycle Cp(n), i.e., at the time t50, the driver 14 supplies the PWM signals to, for example, the first set of switching elements Q1 and Q4 to simultaneously turn them on while keeping off the second set of switching elements Q2 and Q3. The driver 14 continues the on state of the switching elements Q1 and Q4 to time that is defined before the time t51 at the end of the pulse cycle Cp(n) by the dead time DEAD.

During the pulse cycle Cp(n), the polarity of the deviation ΔI between the measured input-current value Id and the target current value Idir is not reversed, which is expressed by the equation Idir>Id. For this reason, the operation mode of the feedback unit 17 is switched to the direct control mode.

In the direct control mode, a maximum input-current value (peak value) is selected as the specified value Ids in the measured input-current values Id. Subtracting the maximum input-current value Ids from the target current value Idir output in the pulse cycle Cp(n) obtains a value δ1 as the fourth preset value δ. In the fourth embodiment, because the command current value Iref is output as the target current value Idir in the pulse cycle Cp(n), the subtraction of the maximum input-current value Ids from the command current value Iref is obtained as the fourth preset value δ1, which is expressed as δ1=Iref−Ids.

Thus, subtracting the fourth preset value δ1 from the target current value Idir output in the pulse cycle Cp(n) obtains the subtracted current value Isub. The subtracted current value Isub is selected as the target current value Idir for the next pulse cycle Cp(n+1) from the time t51 to time t52 (see steps S11A, S50, and S12). Because the fourth preset value δ1 is expressed as Iref−Ids, the target current value Idir for the next pulse cycle Cp(n+1) is determined as the following equation:

$$Idir(n+1)=Idir(n)-\delta 1=Iref-(Iref-Ids)=Ids$$

where Idir (n+1) represents the target current value Idir for the next pulse cycle Cp(n+1), and the Idir (n) represents the target current value Idir for the pulse cycle Cp(n).

After lapse of the dead time DEAD, at the start of the next pulse cycle Cp(n+1), the driver 14 supplies the PWM signals to the second set of switching elements Q2 and Q3 to simultaneously turn them on while keeping off the first set of switching elements Q1 and Q4. The driver 14 continues the on state of the switching elements Q2 and Q3 up to time that is before time t52 corresponding to the end of the pulse cycle Cp(n+1) by the dead time DEAD. That is, as described above, the driver 14 alternately turns on the first set of switching elements Q1 and Q4 and the second set of switching elements Q2 and Q3 for each pulse cycle Cp.

During the pulse cycle Cp(n+1) from the time t51 to the time t52, the polarity of the deviation ΔI between the measured input-current value Id and the target current value Idir is not reversed, which is expressed by the equation Idir>Id. For this reason, the operation mode of the feedback unit 17 is kept in the direct control mode.

In addition, in the direct control mode, a maximum input-current value (peak value) is selected as the specified value Ids in the measured input-current values Id. Subtracting the maximum input-current value Ids from the target current value Idir output in the pulse cycle Cp(n+1) obtains a value δ1 as the fourth preset value δ. Because the maximum input-current value Ids is output as the target current value Idir in the pulse cycle Cp(n+1), the subtraction of the maximum input-current value Ids from the target current value Idir, which is zero, is obtained as the fourth preset value δ1. Thus, during the pulse cycle Cp(n+1), the fourth preset value δ1 is set to zero.

Thus, subtracting the fourth preset value δ1 from the target current value Idir output in the pulse cycle Cp(n+1) obtains the subtracted current value Isub. The subtracted current value Isub is selected as the target current value Idir for the next pulse cycle Cp(n+2) from the time t52 to time t53 (see steps S11A, S50, and S12). Because the fourth preset value δ1 is set to zero, the maximum input-current value Ids is determined as the target current value Idir for the next pulse cycle Cp(n+2) from the time t52 to the time t53 (see steps S11A, S50, and S12).

During the pulse cycle Cp(n+2) from the time t52 to time t53, the polarity of the deviation ΔI between the measured input-current value Id and the target current value Idir is not reversed. In addition, like the pulse cycle Cp(n+1), during the pulse cycle Cp(n+2), the fourth preset value δ1 is set to zero. For this reason, during the pulse cycle Cp(n+2), the maximum input-current value Ids is determined as the target current value Idir for the next pulse cycle Cp(n+3) from the time t53 to time t56 (see steps S11A, S50, and S12).

In contrast, during the pulse cycle Cp(n+3) from the time t53 to the time t56, the polarity of the deviation ΔI between the measured input-current value Id and the target current value Idir is reversed at time t54. This means that the measured input-current value Id instantly exceeds the target current value Idir, which is expressed by the equation Idir<Id.

Then, output of the PWM signals for the corresponding pair of switching elements, that is Q2 and Q3, from the driver 14 are stopped from the driver 14 (see time t55). This causes the corresponding switching elements Q2 and Q3 to be turned off at the time t55. Theoretically, it is preferable to turn off the corresponding switching elements Q2 and Q3 simultaneously with the reverse of the polarity of the deviation ΔI, i.e., the time t54 is identical to the time t55. The delay of the turnoff of the corresponding switching elements Q2 and Q3 relative to the reverse of the polarity of the deviation ΔI is based on the response delay of the feedback unit 17.

Note that, at the time t55, because no PWM signals are output to the switching elements Q2 and Q3, no calculation of the deviation ΔI is performed. That is, at time t55, the polarity of the deviation ΔI cannot be considered.

In response to the reverse of the polarity of the deviation current deviation ΔI, the operation mode of the feedback unit 17 is switched to the feedback control mode. Thus, for the next pulse cycle Cp(n+4) from the time t56 to time t57, the feedback command-current value Iref is selected as the target current value Idir (see steps S10, S14A, S14B, and S15). At that time, the target current value Idir for the next pulse cycle Cp(n+4) is calculated based on the value Vd of the output voltage Vout measured during the pulse cycle Cp(n+3) and the command voltage value Vref determined during it. For this reason, the target current value Idir for the next pulse cycle Cp(n+4) is more likely to be different from that for the pulse cycle Cp(n). In addition, each of the target current value Idir for the pulse cycle Cp(n) and that obtained for the next pulse cycle Cp(n+4) is set to be higher than the input current Id.

During the pulse cycle Cp(n+4) from the time t56 to the time t57, the polarity of the deviation ΔI between the measured input-current value Id and the target current value Idir is not reversed, which is expressed by the equation Idir>Id. For this reason, the operation mode of the feedback unit 17 is switched to the direct control mode.

In the direct control mode, a maximum input-current value (peak value) is selected as the specified value Ids in the measured input-current values Id. Subtracting the maximum input-current value Ids from the target current value Idir output in the pulse cycle Cp(n+4) obtains a value δ2 as the fourth preset value δ. Because the command current value Iref is output as the target current value Idir in the pulse cycle Cp(n+4), the subtraction of the maximum input-current value Ids from the command current value Iref is obtained as the fourth preset value δ2, which is expressed as δ2=Iref−Ids.

Thus, subtracting the fourth preset value δ2 from the target current value Idir output in the pulse cycle Cp(n+4) obtains the subtracted current value Isub. The subtracted current value is selected as the target current value Idir for the next pulse cycle Cp(n+5) from the time t57 to time t58 (see steps S11A, S50, and S12). The fourth preset value δ2 obtained during the pulse cycle Cp(n+4) can be different from or equal to the fourth preset value δ1 obtained during the pulse cycle Cp(n). Because the fourth preset value δ2 is expressed as Iref−Ids, the target current value Idir for the next pulse cycle Cp(n+1) is determined as the following equation:

$$Idir(n+5)=Idir(n+4)-\delta 2=Iref-(Iref-Ids)=Ids$$

where Idir (n+5) represents the target current value Idir for the next pulse cycle Cp(n+5), and the Idir (n+4) represents the target current value Idir for the pulse cycle Cp(n+4).

After lapse of the dead time DEAD, at the start of the next pulse cycle Cp(n+5), the driver 14 supplies the PWM signals to the second set of switching elements Q2 and Q3 to simultaneously turn them on while keeping off the first set of switching elements Q1 and Q4. The driver 14 continues the on state of the switching elements Q2 and Q3 up to time that is before time t58 corresponding to the end of the pulse cycle Cp(n+5) by the dead time DEAD.

During the pulse cycle Cp(n+5) from the time t57 to the time t58, the polarity of the deviation ΔI between the measured input-current value Id and the target current value Idir is not reversed, which is expressed by the equation Idir>Id. For this reason, the operation mode of the feedback unit 17 is kept in the direct control mode.

In addition, in the direct control mode, a maximum input-current value (peak value) is selected as the specified value Ids in the measured input-current values Id. Subtracting the maximum input-current value Ids from the target current value Idir output in the pulse cycle Cp(n+5) obtains a value δ2 as the fourth preset value δ. Because the maximum input-current value Ids is output as the target current value Idir in the pulse cycle Cp(n+5), the subtraction of the maximum input-current value Ids from the target current value Idir, which is zero, is obtained as the fourth preset value δ2. Thus, during the pulse cycle Cp(n+5), the fourth preset value δ2 is set to zero.

Thus, subtracting the fourth preset value δ2 from the target current value Idir output in the pulse cycle Cp(n+5) obtains the subtracted current value Isub. The subtracted current value Isub is selected as the target current value Idir for the next pulse cycle Cp(n+6) from the time t58 to time t59 (see steps S11A, S50, and S12). Because the fourth preset value δ2 is set to zero, the maximum input-current value Ids is determined as the target current value Idir for the next pulse cycle Cp(n+6) from the time t58 to the time t59 (see steps S11A, S50, and S12).

During the pulse cycle Cp(n+6) from the time t58 to time t59, the polarity of the deviation ΔI between the measured input-current value Id and the target current value Idir is not reversed. In addition, like the pulse cycle Cp(n+5), during the pulse cycle Cp(n+6), the fourth preset value δ2 is set to zero. For this reason, during the pulse cycle Cp(n+6), the maximum input-current value Ids is determined as the target current value Idir for the next pulse cycle Cp(n+7) from the time t59 (see steps S11A, S50, and S12).

After the time t59, during a current pulse cycle, selection of one of the feedback command-current value Iref and the subtracted current value Isub as the target current value Idir for the next pulse cycle is carried out as described above. Specifically, if the polarity of the deviation ΔI between the measured input-current value Id and the target current value Idir is reversed during the current pulse cycle, the feedback command-current value Iref obtained during the current pulse cycle is selected as the target current value Idir for the next pulse cycle. Otherwise, if the polarity of the deviation ΔI between the measured input-current value Id and the target current value Idir is not reversed during the current pulse cycle, the subtracted current value Isub determined based on the fourth preset value δ is selected as the target current value Idir for the next pulse cycle.

In the example illustrated in FIG. 12, the fourth preset value δ is determined as the difference between a maximum input-current value (peak value) and the target current value Idir selected by the selector 17b in the previous pulse cycle, but the fourth embodiment is not limited thereto. Specifically, another value δ1a, δ1b, δ1c, which is obtained by the subtraction of a given input-current value Id during a corresponding current pulse cycle Cp from the target current value Idir selected by the selector 17b in the previous pulse cycle, can be used as the fourth preset value δ (see FIG. 12).

Specifically, in a current pulse cycle, the calculator 17fa can determine, as a specified value Ids used to determine the fourth preset value δ, a minimum input-current value in the measured input-current values Id, a maximum input-current value therein, or an average value of the minimum and maximum input-current values in the measured input-current values Id. The calculator 17fa also can determine, as the specified value Ids, a value measured by the first measuring unit 13a at the time when a preset time has elapsed since the start of the corresponding current pulse cycle Cp. The calculator 17fa also can determine, as the specified value Ids, a value based on preset calculations of the measured input-current values Id.

As described above, if the operation mode is set to the direct control mode, the calculator 17fa according to the fourth embodiment is configured to:

determine the fourth preset value δ based on at least one of the measured input-current values Id during a current pulse cycle Cp; and subtract, for the current pulse cycle Cp, the determined fourth preset value δ from the target current value Idir obtained in the previous pulse cycle, thus outputting the subtracted current value Isub to be selected as the target current value Idir. This configuration immediately reduces the current deviation ΔI between the measured input-current value Id and the subtracted value Isub selected as the target current value Idir, thus accurately adjusting the output voltage Vout to the command voltage value Vref in addition to the aforementioned effects achieved by the power converter 10.

Fifth Embodiment

A power converter 10E according to a fifth embodiment of the present disclosure will be described hereinafter with reference to FIGS. 13 to 15.

The structure and/or functions of the power converter 10E according to the fifth embodiment are different from those of the power converter 10 by the following points. So, the different points will be mainly described hereinafter, and therefore, redundant descriptions of like parts between the embodiments, to which like reference characters are assigned, are omitted or simplified.

Figure 13:
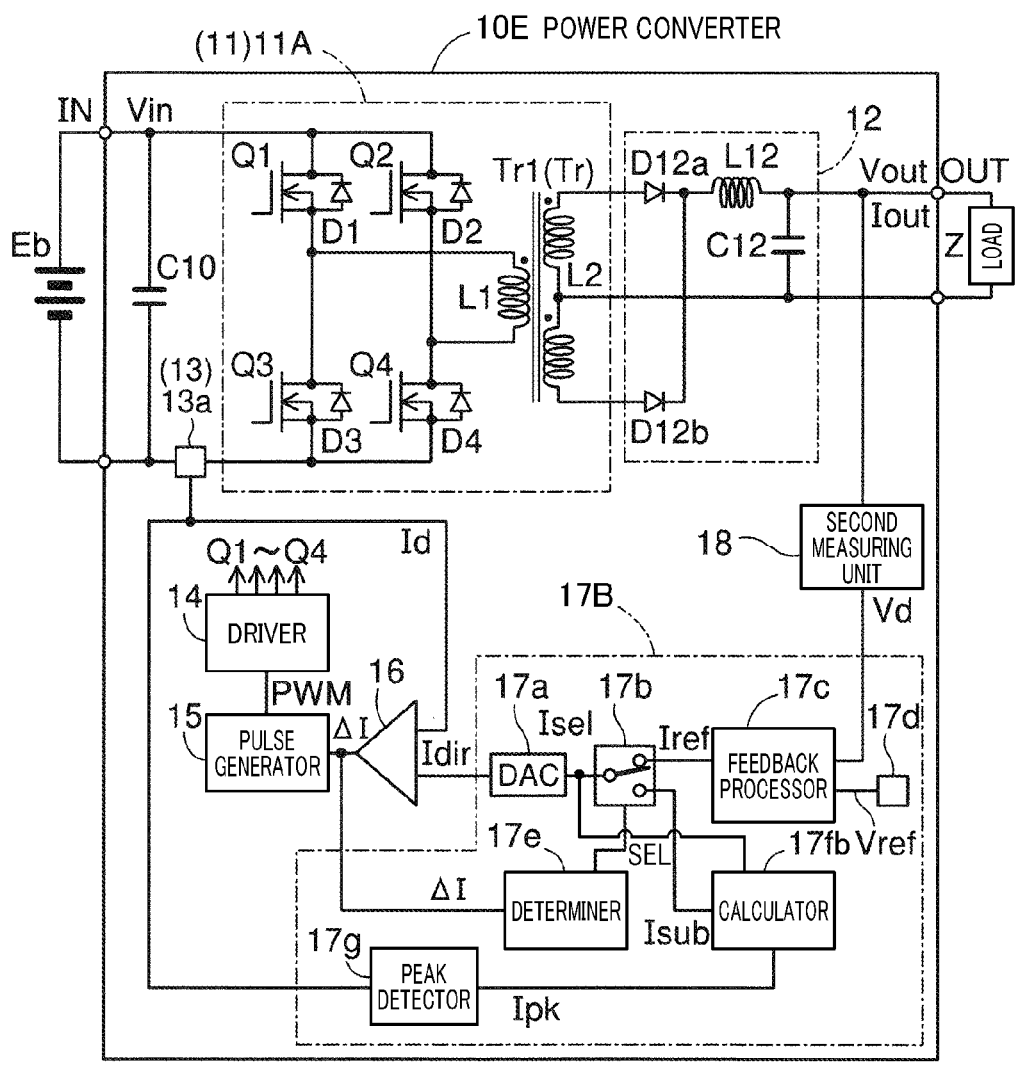
FIG. 13 is a circuit diagram schematically illustrating an example of the overall configuration of a power converter according to a fifth embodiment of the present disclosure.

Referring to FIG. 13, a feedback unit 17B of the power converter 10E further includes a peak detector 17g. In the power converter 10E, the output of the first measuring unit 13a is connected to the peak detector 17g in addition to the deviation calculator 16, so that the measured input-current value Id is input to the peak detector 17g in addition to the deviation calculator 16.

The peak detector 17g is operative to detect peaks in the measured input-current values Id for each switching cycle Csw, and transfer the detected peaks for each switching cycle Csw to a calculator 17fb.

If the feedback unit 17B is operating in the direct control mode, the calculator 17fb according to the fifth embodiment is operative to calculate, as a subtracted current value Isub, an average current value Iave based on the detected peaks for each switching cycle Csw. Then, if the feedback unit 17B is operating in the direct control mode, the calculator 17fb is operative to output the subtracted current value Isub, i.e. the average current value Iave, to the selector 17b.

The selection control task according to the fifth embodiment is slightly different from that according to the first embodiment. The different points therebetween will be described hereinafter.

Figure 14:
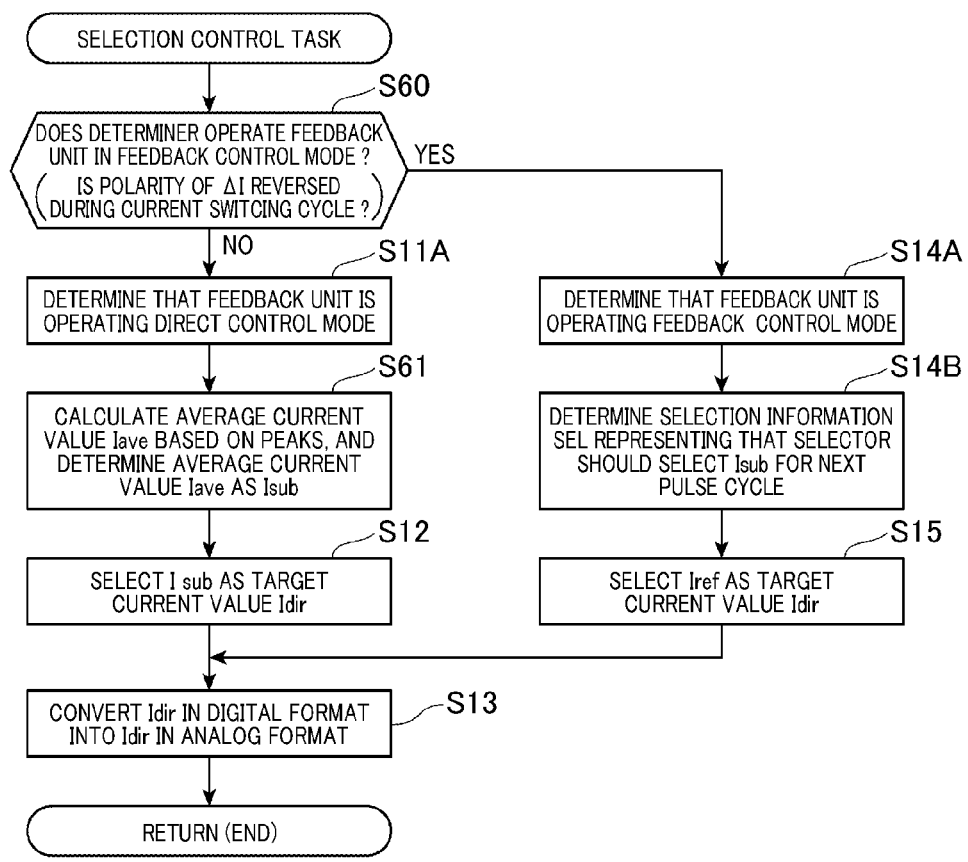
FIG. 14 is a flowchart schematically illustrating the selection control task carried out by the feedback unit of a power converter according to the fifth embodiment.

FIG. 14 schematically illustrates specific operations of the selection control task according to the fifth embodiment. The feedback unit 17B performs the selection control task after initialization of the power converter 10 in each switching cycle Csw.

In the selection control task illustrated in FIG. 14, the feedback unit 17B serves as the determiner 17e to determine whether to operate the feedback unit 17B in the feedback control mode based on the current deviation ΔI in step S60. Specifically, in step S60, the determiner 17e determines whether the polarity of the current deviation ΔI is reversed during a current switching cycle Csw in step S60. In other words, the feedback unit 17B determines whether the polarity of the current deviation ΔI is reversed before the current switching cycle Csw has elapsed since turn-on of a corresponding pair of switching elements in step S60.

Upon determination that the polarity of the current deviation ΔI is reversed during a current switching cycle Csw (YES in step S60), the feedback unit 17B recognizes that the actual current value Id is not deviated from the feedback command-current value Iref.

Then, the feedback unit 17B performs the operations in steps S14A, S14B, and S15 set forth above, thus selecting the feedback command-current value Iref as the target current value Idir for the next switching cycle based on the selection information SEL. Thereafter, in the next switching cycle, the feedback unit 17B serves as the DAC 17a to convert the target current value Idir in the digital format into the target current value Idir in the analog format, and to output the target current value Idir to the deviation calculator 16 in step S13.

Otherwise, upon determination that the polarity of the current deviation ΔI is not reversed during the current switching cycle Csw (NO in step S60), the feedback unit 17B recognizes that the actual current value Id is deviated from the target current value Idir due to, for example, the input DC voltage Vin to the switch circuit 11A being within a low-level range. As a result, the feedback control of the output voltage value Vd by the feedback calculator 17c may make it difficult to match the measured output-voltage value Vd with the command voltage value Vref in each switching cycle Csw.

Then, the feedback unit 17B serves as the determiner 17e to determine that the feedback unit 17B is operating in the direct control mode in step S11A.

Following the operation in step S11A, the feedback unit 17B serves as the peak detector 17g and the calculator 17fb to perform an operation in step S61 in place of the operation in step S11B. In the operation S61, the peak detector 17g detects, i.e. samples, peaks in the measured input-current values Id supplied from the first measuring unit 13a, and the calculator 17fb calculates an average current value Iave of the sampled peaks. Then, in step S61, the calculator 17fb determines the average current value Iave as a subtracted current value Isub, thus outputting the average current value Iave to the selector 17b.

The other operations in the selection control task according to the fifth embodiment are identical to those in the selection control task according to the first embodiment, and therefore, descriptions of them are omitted.

Figure 15:
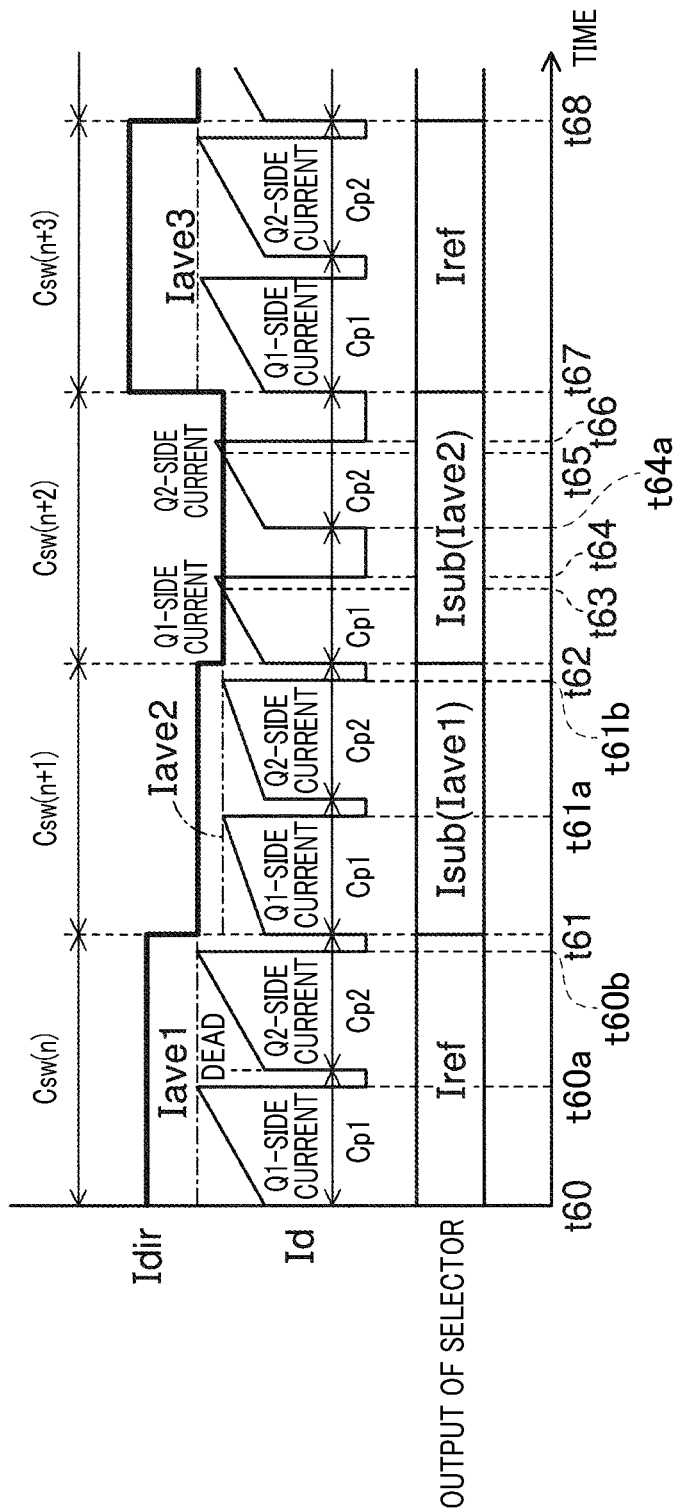
FIG. 15 is a timing chart schematically illustrating an example of how: a target current value, a measured input-current value, and output of a selector vary during execution of the selection control task according to the fifth embodiment.

FIG. 15 schematically illustrates an example of how: the target current value Idir in the digital/analog format, the measured input-current value Id, and the output of the selector 17b vary during execution of the selection control task according to the fifth embodiment. The variations of the respective parameters illustrated in FIG. 15 are examples of them, and therefore, the variations of the respective parameters can be changed depending on variations of the output voltage Vout, the load Z, and other electrical parameters. As described above, each switching cycle Csw consists of two pulse cycles Cp. In the fifth embodiment, the former pulse cycle Cp during a switching cycle Csw will be referred to as a first pulse cycle Cp1, and the latter pulse cycle Cp during the same switching cycle Csw will be referred to as a second pulse cycle Cp2.

It is assumed that, during a previous switching cycle Csw(n−1) previous to a pulse cycle Csw(n) from time t60 to time t61 illustrated in FIG. 15, the polarity of the current deviation ΔI between the measured input-current value Id and the target current value Idir is reversed. As a result, the operation mode of the feedback unit 17 is set to the feedback control mode, and the feedback command-current value Iref is selected as the target current value Idir used by the deviation calculator 16 for the next switching cycle Csw(n) (see steps S60, S14A, S14B, and S15).

At the start of the first pulse cycle Cp1 of the switching cycle Csw(n), i.e., at the time t60, the driver 14 supplies the PWM signals to, for example, the first set of switching elements Q1 and Q4 to simultaneously turn them on while keeping off the second set of switching elements Q2 and Q3. The driver 14 continues the on state of the switching elements Q1 and Q4 to time 60a that is before the time corresponding to the end of the first pulse cycle Cp1 by the dead time DEAD.

After lapse of the dead time DEAD, at the start of the second pulse cycle Cp2 of the switching cycle Csw(n), the driver 14 supplies the PWM signals to the second set of switching elements Q2 and Q3 to simultaneously turn them on while keeping off the first set of switching elements Q1 and Q4. The driver 14 continues the on state of the switching elements Q2 and Q3 up to time t60b that is before the time corresponding to the end of the pulse cycle Cp2, i.e., the end of the switching cycle Csw(n) by the dead time DEAD. That is, as described above, the driver 14 alternately turns on the first set of switching elements Q1 and Q4 and the second set of switching elements Q2 and Q3 during the switching cycle Csw (n).

During the switching cycle Csw(n), the polarity of the deviation ΔI between the measured input-current value Id and the target current value Idir is not reversed, which is expressed by the equation Idir>Id. For this reason, the operation mode of the feedback unit 17 is switched to the direct control mode. As described above, a Q1-side current flowing through the switching elements Q1 and Q4 during the first pulse cycle Cp1 increases with time, and similarly, a Q2-side current flowing through the switching elements Q2 and Q3 during the second pulse cycle Cp2 increases with time. For this reason, a peak Ipk1 of the Q-1 side current is measured as a measured input-current value Id at the end timing t60a of the turn-on of the switching elements Q1 and Q4. Similarly, a peak Ipk2 of the Q2-side current is measured as a measured input-current value Id at the end timing t60b of the turn-on of the switching elements Q2 and Q3. Thus, in the direct control mode, an average current value Iave1 is calculated based on the measured peaks Ipk1 and Ipk2, and the average current value Iave1 is determined as a subtracted current value Isub. The subtracted current value Isub is selected as the target current value Idir for the next switching cycle Csw(n+1) from the time t61 to time t62 (see steps S60, S11A, S61, and S12).

In other words, subtracting the average current value Iave1 from the target current value Idir obtained in the previous pulse cycle obtains a preset value that means the first preset value α. Thus, subtracting the preset value from the target current value Idir obtained in the previous pulse cycle in the same manner as the first embodiment obtains the average current value Iave1. As a result, the average current value Iave1 can be taken as a subtracted current value Isub for the next switching cycle Csw(n+1); the subtracted current is calculated based on the subtraction of the preset value from the target current value Idir obtained in the previous pulse cycle.

After lapse of the dead time DEAD, at the start of the first pulse cycle Cp1 of the switching cycle Csw(n+1), i.e., at the time t61, the driver 14 supplies the PWM signals to the first set of switching elements Q1 and Q4 to simultaneously turn them on while keeping off the second set of switching elements Q2 and Q3. The driver 14 continues the on state of the switching elements Q1 and Q4 to time 61a that is before the time corresponding to the end of the first pulse cycle Cp1 by the dead time DEAD.

After lapse of the dead time DEAD, at the start of the second pulse cycle Cp2 of the switching cycle Csw(n+1), the driver 14 supplies the PWM signals to the second set of switching elements Q2 and Q3 to simultaneously turn them on while keeping off the first set of switching elements Q1 and Q4. The driver 14 continues the on state of the switching elements Q2 and Q3 up to time t61b that is before the time corresponding to the end of the pulse cycle Cp2, i.e., the end of the switching cycle Csw(n+1) by the dead time DEAD. That is, as described above, the driver 14 alternately turns on the first set of switching elements Q1 and Q4 and the second set of switching elements Q2 and Q3 during the switching cycle Csw (n+1).

During the switching cycle Csw(n+1), the polarity of the deviation ΔI between the measured input-current value Id and the target current value Idir is not reversed, which is expressed by the equation Idir>Id. For this reason, the operation mode of the feedback unit 17 is kept in the direct control mode. In the direct control mode, like the switching cycle Csw(n), an average current value Iave2 is calculated based on a measured peak Ipk1 of the Q1-side current and a measured peak Ipk2 of the Q2-side current during the switching cycle Csw(n+1), and the average current value Iave2 is determined as a subtracted current value Isub. The subtracted current value Isub is selected as the target current value Idir for the next switching cycle Csw(n+2) from the time t62 to time t67 (see steps S60, S11A, S61, and S12). Like the switching cycle Csw(n), the average current value Iave2 can be taken as a subtracted current value Isub for the next switching cycle Csw(n+2); the subtracted current is calculated based on the subtraction of the preset value from the target current value Idir obtained in the previous pulse cycle.

After lapse of the dead time DEAD since the end timing of the second pulse cycle Cp2, in other words, the end timing of the switching cycle Csw(n+1), at the start t62 of the first pulse cycle Cp1 of the switching cycle Csw(n+2), the driver 14 supplies the PWM signals to the first set of switching elements Q1 and Q4 to simultaneously turn them on while keeping off the second set of switching elements Q2 and Q3.

During the switching cycle Csw(n+2) from the time t62 to the time t67, the polarity of the deviation ΔI between the measured input-current value Id and the target current value Idir is reversed first at time t63. This means that the measured input-current value Id instantly exceeds the target current value Idir at the time t63, which is expressed by the equation Idir<Id.

Then, output of the PWM signals for the corresponding pair of switching elements, that is Q1 and Q4, are stopped from the driver 14 (see time t64). This causes the corresponding switching elements Q1 and Q4 to be turned off at the time t64. Note that, at the time t64, because no PWM signals are output to the switching elements Q1 and Q4, no calculation of the deviation ΔI is performed. That is, at time t64, the polarity of the deviation ΔI cannot be considered.

Thereafter, at the start (time 64a) of the second pulse cycle Cp2 of the switching cycle Csw(n+2), the driver 14 supplies the PWM signals to the second set of switching elements Q2 and Q3 to simultaneously turn them on while keeping off the first set of switching elements Q1 and Q4.

During the switching cycle Csw(n+2), the polarity of the deviation ΔI between the measured input-current value Id and the target current value Idir is reversed again at time t65. This means that the measured input-current value Id instantly exceeds the target current value Idir at the time t65, which is expressed by the equation Idir<Id.

Then, output of the PWM signals for the corresponding pair of switching elements, that is Q2 and Q3, are stopped from the driver 14 (see time t66). This causes the corresponding switching elements Q2 and Q3 to be turned off at the time t66. Note that, at the time t66, because no PWM signals are output to the switching elements Q2 and Q3, no calculation of the deviation ΔI is performed. That is, at time t66, the polarity of the deviation ΔI cannot be considered.

That is, during the switching cycle Csw(n+2) from the time t62 to the time t67, the polarity of the deviation ΔI between the measured input-current value Id and the target current value Idir is reversed two times. Then, the operation mode of the feedback unit 17 for the next switching cycle Csw(n+3) is switched to the feedback control mode. Thus, for the next switching cycle Csw(n+3) from the time t67 to time t68, the feedback command-current value Iref is selected as the target current value Idir (see steps S60, S14A, S14B, and S15). At that time, the target current value Idir for the next switching cycle Csw(n+3) is calculated based on the value Vd of the output voltage Vout measured during the switching cycle Csw(n+2) and the command voltage value Vref determined during it. For this reason, the target current value Idir for the next switching cycle Csw(n+3) is more likely to be different from that for the switching cycle Csw(n). In addition, each of the target current value Idir for the switching cycle Csw(n) and that obtained for the next switching cycle Csw(n+3) is set to be higher than the input current Id.

During the switching cycle Csw(n+3), the polarity of the deviation ΔI between the measured input-current value Id and the target current value Idir is not reversed, which is expressed by the equation Idir>Id. For these reasons, the operation mode of the feedback unit 17 is switched to the direct control mode. In the direct control mode, like the switching cycle Csw(n), an average current value Iave3 is calculated based on a measured peak Ipk1 of the Q1-side current and a measured peak Ipk2 of the Q2-side current during the switching cycle Csw(n+3), and the average current value Iave3 is determined as a subtracted current value Isub. The subtracted current value Isub is selected as the target current value Idir for the next switching cycle Csw(n+4) from the time t68 (see steps S60, S11A, S61, and S12). Like the switching cycle Csw(n), the average current value Iave3 can be taken as a subtracted current value Isub for the next switching cycle Csw(n+4); the subtracted current is calculated based on the subtraction of the preset value from the target current value Idir obtained in the previous pulse cycle.

After the time t68, during a current switching cycle, selection of one of the feedback command-current value Iref and the subtracted current value Isub obtained based on the average current value Iave as the target current value Idir for the next switching cycle is carried out as described above.

Specifically, if the polarity of the deviation ΔI between the measured input-current value Id and the target current value Idir is reversed during the current switching cycle, the feedback command-current value Iref obtained during the current switching cycle is selected as the target current value Idir for the next switching cycle. Otherwise, if the polarity of the deviation ΔI between the measured input-current value Id and the target current value Idir is not reversed during the current switching cycle, the subtracted current value Isub based on the average current value Iave is selected as the target current value Idir for the next switching cycle.

As described above, if the operation mode is set to the direct control mode, the feedback unit 17B is configured to:

sample peaks in the measured input-current values Id for each switching cycle Csw; and calculate, as a subtracted current value Isub, an average current value Iave based on the sampled peaks for each switching cycle Csw.

This configuration immediately reduces the current deviation ΔI between the measured input-current value Id and the subtracted value Isub, that is the average current value Iave of the measured peaks, selected as the target current value Idir.

Thus, it is possible to accurately adjust the output voltage Vout to the command voltage value Vref in addition to the aforementioned effects achieved by the power converter 10.

Sixth Embodiment

A power converter 10 according to a sixth embodiment of the present disclosure, which will be referred to as a power converter 10F, will be described hereinafter with reference to FIGS. 16 and 17.

The structure and/or functions of the power converter 10F according to the sixth embodiment are different from those of the power converter 10E according to the fifth embodiment by the following points. So, the different points will be mainly described hereinafter, and therefore, redundant descriptions of like parts between the embodiments, to which like reference characters are assigned, are omitted or simplified.

Specifically, the power converter 10F is designed such that the feedback unit 17B according to the fifth embodiment performs the selection control task according to the second embodiment and the first aspect of the third embodiment.

Figure 16:
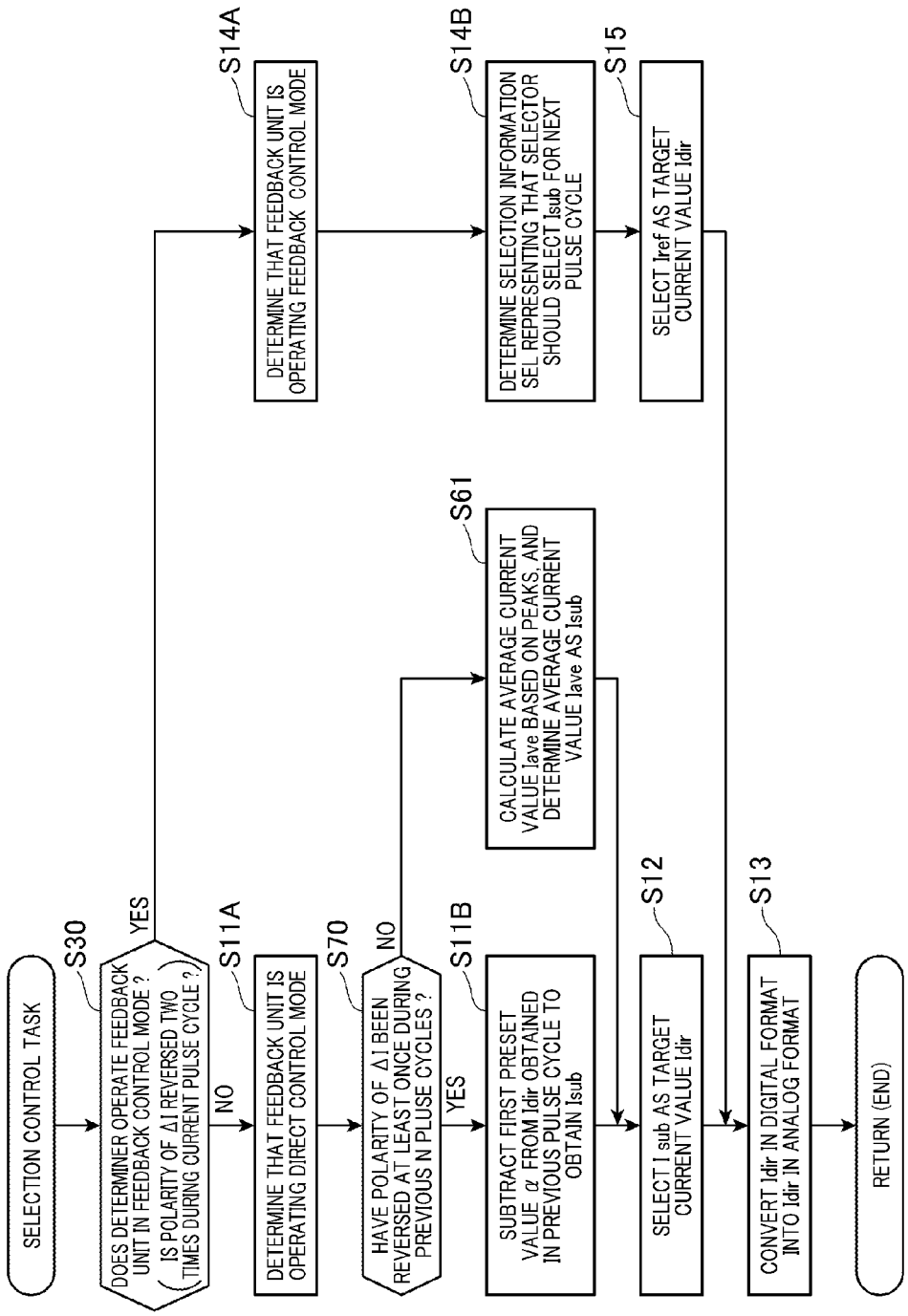
FIG. 16 is a flowchart schematically illustrating the selection control task carried out by the feedback unit of a power converter according to a sixth embodiment of the present disclosure.

FIG. 16 schematically illustrates specific operations of the selection control task according to the sixth embodiment. The feedback unit 17 performs the selection control task after initialization of the power converter 10 in each switching cycle Csw.

In the selection control task illustrated in FIG. 16, the feedback unit 17B serves as the determiner 17e to determine whether to operate the feedback unit 17 in the feedback control mode based on the current deviation ΔI in step S30. Specifically, in step S30, the determiner 17e determines whether the polarity of the current deviation ΔI is reversed at least two times during a current switching cycle Csw in step S30.

Upon determination that the polarity of the current deviation ΔI is reversed at least two times during a current switching cycle Csw (YES in step S30), the feedback unit 17 recognizes that the actual current value Id is not deviated from the feedback command-current value Iref.

Then, the feedback unit 17 performs the operations in steps S14A, S14B, and S15, thus selecting the feedback command-current value Iref as the target current value Idir for the next switching cycle based on the selection information SEL.

Otherwise, upon determination that the polarity of the current deviation ΔI is not reversed at least two times during the current switching cycle Csw (NO in step S30), the feedback unit 17 recognizes that the actual current value Id is deviated from the target current value Idir.

Then, the feedback unit 17 serves as the determiner 17e to determine that the feedback unit 17 is operating in the direct control mode in step S11A.

Next, in step S70, the feedback unit 17 determines whether the polarity of the current deviation ΔI has been reversed at least once during the previous N switching cycles Csw including the current switching cycle in step S70. The N is set to an integer equal to or higher than 1.

Upon determination that the polarity of the current deviation ΔI has been reversed at least once during the previous N switching cycles Csw including the current switching cycle (YES in step S70), the feedback unit 17 performs the operation in step S11B in the same manner as the feedback unit 17 according to the first embodiment. That is, the operation in step S11B subtracts the first preset value α from the target current value Idir selected by the selector 17b in the N-th cycle (last previous cycle) to obtain a subtracted current value Isub.

Otherwise, upon determination that the polarity of the current deviation ΔI has not been reversed at least once during the previous N switching cycles Csw including the current switching cycle (NO in step S70), the feedback unit 17 serves as the peak detector 17g and the calculator 17f to perform the operation in step S61. That is, in the operation S61, the peak detector 17g detects, i.e. samples, peaks in the measured input-current values Id supplied from the first measuring unit 13a, and the calculator 17fb calculates an average current value Iave of the sampled peaks. Then, in step S61, the calculator 17fb determines the average current value Iave as a subtracted current value Isub, thus outputting the average current value Iave to the selector 17b.

The other operations in the selection control task according to the sixth embodiment are identical to those in the selection control task according to the first embodiment, and therefore, descriptions of them are omitted.

Figure 17:
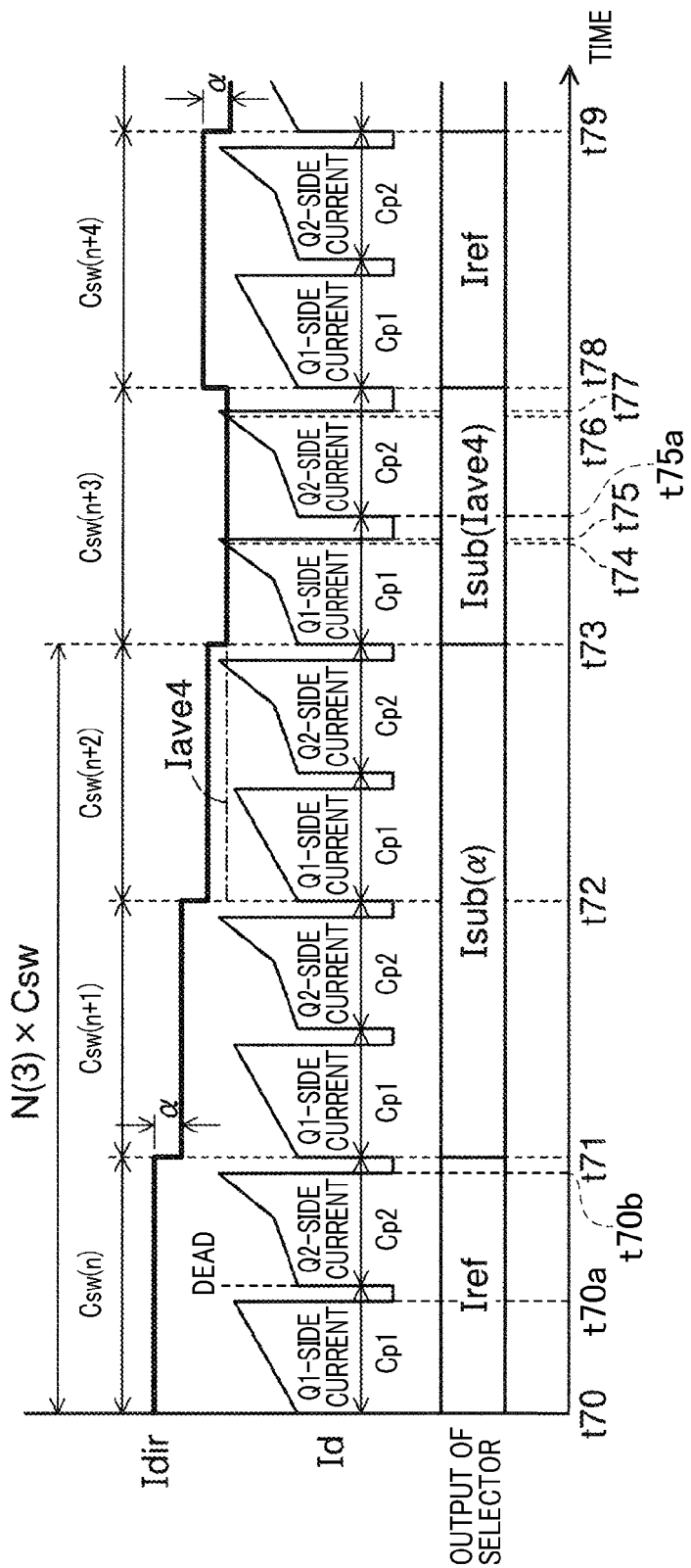
FIG. 17 is a timing chart schematically illustrating an example of how: a target current value, a measured input-current value, and output of a selector vary during execution of the selection control task according to the sixth embodiment.

FIG. 17 schematically illustrates an example of how: the target current value Idir in the digital/analog format, the measured input-current value Id, and the output of the selector 17b vary during execution of the selection control task according to the sixth embodiment. The variations of the respective parameters illustrated in FIG. 17 are examples of them, and therefore, the variations of the respective parameters can be changed depending on variations of the output voltage Vout, the load Z, and other electrical parameters. As described above, each switching cycle Csw consists of two pulse cycles Cp. In the sixth embodiment, the former pulse cycle Cp during a switching cycle Csw will be referred to as a first pulse cycle Cp1, and the latter pulse cycle Cp during the same switching cycle Csw will be referred to as a second pulse cycle Cp2.

In the example illustrated in FIG. 17, the number N is set to 2.

It is assumed that, during a previous switching cycle Csw(n−1) previous to a pulse cycle Csw(n) from time t70 to time t71 illustrated in FIG. 17, the polarity of the current deviation ΔI between the measured input-current value Id and the target current value Idir is reversed two times. As a result, the operation mode of the feedback unit 17 is set to the feedback control mode, and the feedback command-current value Iref is selected as the target current value Idir used by the deviation calculator 16 for the next switching cycle Csw(n) (see steps S30, S14A, S14B, and S15).

At the start of the first pulse cycle Cp1 of the switching cycle Csw(n), i.e., at the time t70, the driver 14 supplies the PWM signals to, for example, the first set of switching elements Q1 and Q4 to simultaneously turn them on while keeping off the second set of switching elements Q2 and Q3. The driver 14 continues the on state of the switching elements Q1 and Q4 to time 70a that is before the time corresponding to the end of the first pulse cycle Cp1 by the dead time DEAD.

After lapse of the dead time DEAD, at the start of the second pulse cycle Cp2 of the switching cycle Csw(n), the driver 14 supplies the PWM signals to the second set of switching elements Q2 and Q3 to simultaneously turn them on while keeping off the first set of switching elements Q1 and Q4. The driver 14 continues the on state of the switching elements Q2 and Q3 up to time t70b that is before the time corresponding to the end of the pulse cycle Cp2, i.e., the end of the switching cycle Csw(n) by the dead time DEAD. That is, as described above, the driver 14 alternately turns on the first set of switching elements Q1 and Q4 and the second set of switching elements Q2 and Q3 during the switching cycle Csw (n).

During the switching cycle Csw(n), the polarity of the deviation ΔI between the measured input-current value Id and the target current value Idir has been unchanged, which is expressed by the equation Idir>Id. This results in the operation mode of the feedback unit 17 being switched to the direct control mode.

In addition, the polarity of the deviation ΔI between the measured input-current value Id and the target current value Idir has been reversed at least once during the previous two pulse cycles Csw(n−1) and Csw(n). Thus, subtracting the first preset value α from the target current value Idir output in the switching cycle Csw(n+1) obtains the subtracted current value Isub. The subtracted current value Isub is selected as the target current value Idir for the next switching cycle Csw(n+2) from the time t71 to time t72 (see steps S30, S11A, S70, S11B, and S12).

During the switching cycle Csw(n+1), the polarity of the deviation ΔI between the measured input-current value Id and the target current value Idir has been unchanged, which is expressed by the equation Idir>Id. For this reason, the operation mode of the feedback unit 17 is kept in the direct control mode. In addition, the polarity of the deviation ΔI has been reversed at least once during the previous three switching cycles Csw(n+1), Csw(n), and Csw(n−1). Thus, subtracting the first preset value α from the target current value Idir output in the switching cycle Csw(n+1) obtains the subtracted current value Isub. The subtracted current value Isub is selected as the target current value Idir for the next switching cycle Csw(n+2) from the time t72 to time t73 (see steps S30, S11A, S70, S11B, and S12).

During the switching cycle Csw(n+2), the polarity of the deviation ΔI between the measured input-current value Id and the target current value Idir has been unchanged, which is expressed by the equation Idir>Id. On the other hand, the polarity of the current deviation ΔI has not been reversed at any time during the previous three switching cycles Csw(n+2), Csw(n+1), and Csw(n). Thus, as described above, an average current value Iave4 is calculated based on a measured peak Ipk1 of the Q1-side current and a measured peak Ipk2 of the Q2-side current during the switching cycle Csw(n+2), and the average current value Iave4 is determined as a subtracted current value Isub. The subtracted current value Isub is selected as the target current value Idir for the next switching cycle Csw(n+3) from the time t73 to time t78 (see steps S30, S11A, S70, S61, and S12).

Note that, the average current value Iave4 is an example of various average current values during a current switching cycle. For example, another average current value based on: all peaks Ipk1 of Q1-side currents sampled during the N switching cycles; and all peaks Ipk2 of Q2-side currents sampled during the N switching cycles can be used. A further average current value based on all peaks Ipk1 of Q1-side currents sampled during M switching cycles before a current switching cycle; and all peaks Ipk2 of Q2-side currents sampled during the M switching cycles before the current switching cycle can be used; the M is an integer lower than the N.

At the start t73 of the first pulse cycle Cp1 of the switching cycle Csw(n+3), the driver 14 supplies the PWM signals to the first set of switching elements Q1 and Q4 to simultaneously turn them on while keeping off the second set of switching elements Q2 and Q3.

During the switching cycle Csw(n+3) from the time t73 to time t78, the polarity of the deviation ΔI between the measured input-current value Id and the target current value Idir is reversed first at time t74. This means that the measured input-current value Id instantly exceeds the target current value Idir at the time t74, which is expressed by the equation Idir<Id.

Then, output of the PWM signals for the corresponding pair of switching elements, that is Q1 and Q4, are stopped from the driver 14 (see time t75). This causes the corresponding switching elements Q1 and Q4 to be turned off at the time t75. Note that, at the time t75, because no PWM signals are output to the switching elements Q1 and Q4, no calculation of the deviation ΔI is performed. That is, at time t75, the polarity of the deviation ΔI cannot be considered.

Thereafter, at the start (time t75a) of the second pulse cycle Cp2 of the switching cycle Csw(n+3), the driver 14 supplies the PWM signals to the second set of switching elements Q2 and Q3 to simultaneously turn them on while keeping off the first set of switching elements Q1 and Q4.

During the switching cycle Csw(n+3), the polarity of the deviation ΔI between the measured input-current value Id and the target current value Idir is reversed again at time t76. This means that the measured input-current value Id instantly exceeds the target current value Idir at the time t76, which is expressed by the equation Idir<Id.

Then, output of the PWM signals for the corresponding pair of switching elements, that is Q2 and Q3, are stopped from the driver 14 (see time t77). This causes the corresponding switching elements Q2 and Q3 to be turned off at the time t77. Note that, at the time t77, because no PWM signals are output to the switching elements Q2 and Q3, no calculation of the deviation ΔI is performed. That is, at time t77, the polarity of the deviation ΔI cannot be considered.

That is, during the switching cycle Csw(n+3) from the time t73 to the time t78, the polarity of the deviation ΔI between the measured input-current value Id and the target current value Idir is reversed two times. Then, the operation mode of the feedback unit 17 for the next switching cycle Csw(n+4) is switched to the feedback control mode. Thus, for the next switching cycle Csw(n+4) from the time t78 to time t79, the feedback command-current value Iref is selected as the target current value Idir (see steps S30, S14A, S14B, and S15). At that time, the target current value Idir for the next switching cycle Csw(n+4) is calculated based on the value Vd of the output voltage Vout measured during the switching cycle Csw(n+3) and the command voltage value Vref determined during it. For this reason, the target current value Idir for the next switching cycle Csw(n+4) is more likely to be different from that for the switching cycle Csw(n). In addition, each of the target current value Idir for the switching cycle Csw(n) and that obtained for the next switching cycle Csw(n+4) is set to be higher than the input current Id.

During the switching cycle Csw(n+4), the polarity of the deviation ΔI between the measured input-current value Id and the target current value Idir has been unchanged, which is expressed by the equation Idir>Id. For this reason, the operation mode of the feedback unit 17 is switched to the direct control mode. In addition, the polarity of the deviation ΔI between the measured input-current value Id and the target current value Idir has been reversed at least once during the previous three pulse cycles Csw(n+4), Csw(n+3), and Csw(n+2). Thus, subtracting the first preset value α from the target current value Idir output in the pulse cycle Cp(n+4) obtains the subtracted current value Isub. The subtracted current value Isub is selected as the target current value Idir for the next switching cycle Csw(n+5) from the time t79 (see steps S30, S11A, S70, S11B, and S12).

Specifically, if the polarity of the deviation ΔI between the measured input-current value Id and the target current value Idir is reversed at least two times during the current switching cycle, the feedback command-current value Iref obtained during the current switching cycle is selected as the target current value Idir for the next switching cycle.

In addition, if the polarity of the deviation ΔI between the measured input-current value Id and the target current value Idir has been reversed at least once during the previous N switching cycles including the current switching cycle, the subtracted current value Isub based on the first preset value α is selected as the target current value Idir for the next switching cycle.

Otherwise, if the polarity of the deviation ΔI between the measured input-current value Id and the target current value Idir has not been reversed at least once during previous N switching cycles including the current switching cycle, the subtracted current value Isub based on the average current value Iave is selected as the target current value Idir for the next switching cycle.

As described above, if the polarity of the current deviation ΔI has not been reversed at least once during the previous N switching cycles including the current switching cycle although the target current value Idir has been reduced by the first preset value α for each of the previous N switching cycles in the direct control mode, the feedback unit 17B is configured to:

sample peaks in the measured input-current values Id for a current switching cycle or the previous N switching cycles;

calculate an average current value Iave4 based on the sampled peaks;

determine the average current value Iave4 as a subtracted current value Isub; and subtract the average current value Iave4 from the target current value Idir obtained in the previous cycle to determine a preset value that means the first preset value α according to the first embodiment.

This configuration immediately reduces the current deviation ΔI between the measured input-current value Id and the subtracted value Isub, that is the average current value Iave4 of the sampled peaks, selected as the target current value Idir.

Thus, it is possible to accurately adjust the output voltage Vout to the command voltage value Vref in addition to the aforementioned effects achieved by the power converter 10.

Seventh Embodiment

Figure 18:
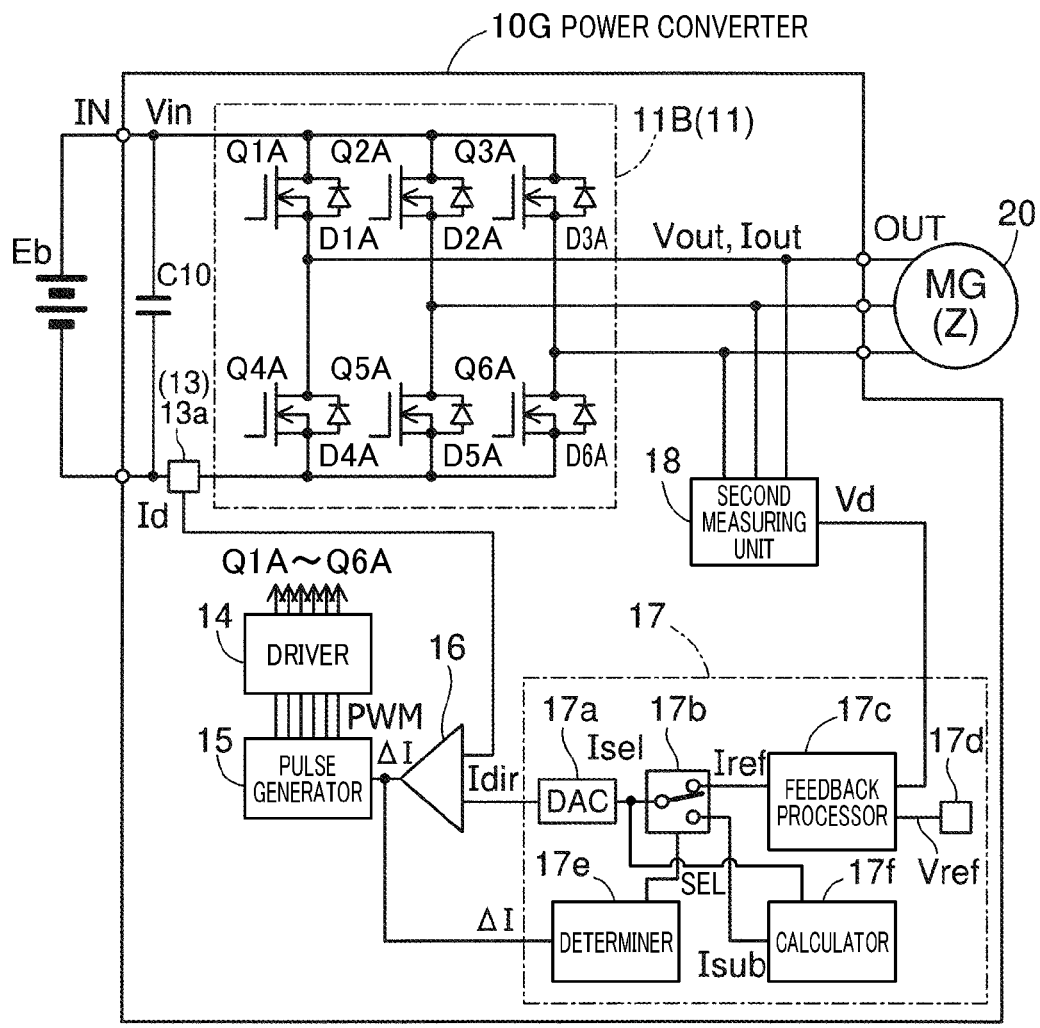
FIG. 18 is a circuit diagram schematically illustrating an example of the overall configuration of a power converter according to a seventh embodiment of the present disclosure.

A power converter 10G according to a seventh embodiment of the present disclosure will be described hereinafter with reference to FIG. 18.

The structure and/or functions of the power converter 10G according to the seventh embodiment are different from those of the power converter 10 by the following points. So, the different points will be mainly described hereinafter, and therefore, redundant descriptions of like parts between the embodiments, to which like reference characters are assigned, are omitted or simplified.

The power converter 10G according to the seventh embodiment is comprised of a switch circuit 11B in place of the switch circuit 11A according to the first embodiment. The switch circuit 11B is operative to output a three-phase AC voltage as an example of periodic voltage signals whose at least one of voltage and frequency varies with time. The three-phase AC voltage is configured to be supplied to a three-phase rotary electric machine 20 as an example of inductive loads in place of the load Z. That is, the power converter 10G serves as a three-phase inverter.

For example, the three-phase rotary electric machine 20 is provided with: an armature comprised of an inductive core and three-phase armature windings wound therearound; and a field member comprised of, for example, one or more magnets. When the armature is energized to generate a magnetic field, the generated magnetic field of the armature and a magnetic field generated by the field member rotate any one of the armature and the field member relative to the other thereof to thereby create torque.

The power converter 10G has first, second, and third-phase output terminals OUT, such as, U-, V-, and W-phase output terminals OUT connected, via cables, to respective the three-phase armature windings, that is, U-, V-, and W-phase armature windings, of the three-phase rotary electric machine 20.

The switch circuit 11B is comprised of a first set of series-connected switching elements Q1A and Q4A, a second set of series-connected switching elements Q2A and Q5A, a third set of series-connected switching elements Q3A and Q6A, and diodes D1A to D6A. For example, as the switching elements Q1A to Q6A, IGBTs or power MOSFETs can be respectively used.

Each of the switching elements Q1A to Q6A has a first terminal, a second terminal, and a conductive path formed therebetween. The first terminal of the switching element Q1A is connected to the positive input terminal IN via the positive DC input line. The second terminal of the switching element Q1A is connected to the first terminal of the switching element Q4A to constitute the series-connected switching elements Q1A and Q4A. The second terminal of the switching element Q4A is connected to the negative input terminal IN via the negative DC input line.

Similarly, the first terminal of the switching element Q2A is connected to the positive input terminal IN via the positive DC input line. The second terminal of the switching element Q2A is connected to the first terminal of the switching element Q5A to constitute the series-connected switching elements Q2A and Q5A. The second terminal of the switching element Q5A is connected to the negative input terminal IN via the negative DC input line.

In addition, the first terminal of the switching element Q3A is connected to the positive input terminal IN via the positive DC input line. The second terminal of the switching element Q3A is connected to the first terminal of the switching element Q6A to constitute the series-connected switching elements Q3A and Q6A. The second terminal of the switching element Q6A is connected to the negative input terminal IN via the negative DC input line.

With the configuration, the switching elements Q1A to Q3A will also be referred to as high-side switching elements or upper-arm switching elements, and the switching elements Q4A to Q6A will also be referred to as low-side switching elements or lower-arm switching elements.

Each of the diodes D1A to D6A is connected between the first end and second end of a corresponding one of the switching elements Q1A to Q6A in antiparallel thereto, and serves as a free-wheel diode.

If power MOSFETs are used as the switching elements Q1A to Q6A, intrinsic diodes of the power MOSFETs can be used as the flee-wheel diodes, thus eliminating the free-wheel diodes.

The series-connected upper and lower arm switching elements Q1A and Q4A, the series-connected upper and lower arm switching elements Q2A and Q5A, and the series-connected upper and lower arm switching elements Q3A and Q6A are parallelly connected to each other in half-bridge configuration.

Each of the switching elements Q1A to Q6A has a control terminal connected to the driver 14.

In the seventh embodiment, a connecting point between the series-connected switching elements Q1A and Q4A is connected to the first-phase output terminal OUT connected to the U-phase armature winding. A connecting point between the series-connected switching elements Q2A and Q5A is connected to the second-phase output terminal OUT connected to the V-phase armature winding. A connecting point between the series-connected switching elements Q3A and Q6A is connected to the third-phase output terminal OUT connected to the W-phase armature winding.

Because the output voltage Vout output from the switch circuit 11B is a three-phase AC voltage, the second measuring unit 18 is operative to measure an instantaneous value, an absolute value, a peak value, an effective value, or the like as a value Vd of the output voltage Vout for each phase in an analog format. The second measuring unit 18 is also operative to output the measured value Vd of the output voltage Vout for each phase to the feedback unit 17.

Specifically, the high- and low-side switching elements Q1A and Q4A correspond to the pair of switching elements Q1 and Q3 or the pair of switching elements Q2 and Q4. Similarly, the high- and low-side switching elements Q2A and Q5A correspond to the pair of switching elements Q1 and Q3 or the pair of switching elements Q2 and Q4. The high- and low-side switching elements Q3A and Q6A correspond to the pair of switching elements Q1 and Q3 or the pair of switching elements Q2 and Q4.

That is, one of the high-side switching elements Q1A to Q3A is sequentially turned on with dead times between the adjacent on durations while a corresponding same-phase low-side switching element is sequentially turned off (see, for example, FIGS. 2 to 5 or FIGS. 8 and 9). This causes the switch circuit 11B to serve as an inverter.

Other elements of the power converter 10G according to the seventh embodiment are substantially identical to those of the power converter 10 according to the first embodiment.

The configuration of the power converter 10G according to the seventh embodiment is substantially identical to that of the power converter 10 except for only the configuration of the switch circuit 11B set forth above.

This configuration of the power converter 10G therefore achieves the same effects as those achieved by the power converter 11 according to the first embodiment. Particularly, this configuration prevents the rotary electric machine 20, that is, its inductive core, from being magnetically biased even if an input voltage rapidly increases from a low-level range. This makes it possible to prevent the occurrence of an overcurrent due to the magnetically biased rotary electric machine 20.

Although illustration is omitted, the communication path of the measured input-current value Id from the first measuring unit 13a to the feedback unit 17 can be provided in the power converter 10G according to the seventh embodiment like the fourth embodiment. This modified configuration can achieve the effects achieved by the power converter 10D according to the fourth embodiment. Moreover, although illustration is omitted, the peak detector 17g according to the fifth embodiment can be provided in the feedback unit 17 of the power converter 10G. This modified configuration can achieve the effects achieved by the power converter 10E according to the fifth embodiment.

The first to seventh embodiments of the present disclosure and their modifications have been described, but the present disclosure is not limited thereto. Specifically, the first to seventh embodiments and their modifications can be freely changed within the scope of the present disclosure.

Some of the power converters 10 to 10F according to the respective first to seventh embodiments can be suitably combined with each other to create a modified power converter based on, for example, a load Z therefor. The modified power converter can achieve the corresponding effects achieved by some of the power converters.

In each of the first to sixth embodiments, the switch circuit 11A is comprised of the switching elements Q1 to Q4 and the transformer Tr1, and, in the seventh embodiment, the switch circuit 11B is comprised of the switching elements Q1A to Q6A. However, switch circuits according to the present disclosure are not limited to the switch circuit 11A or switch circuit 11B.

Figure 19:
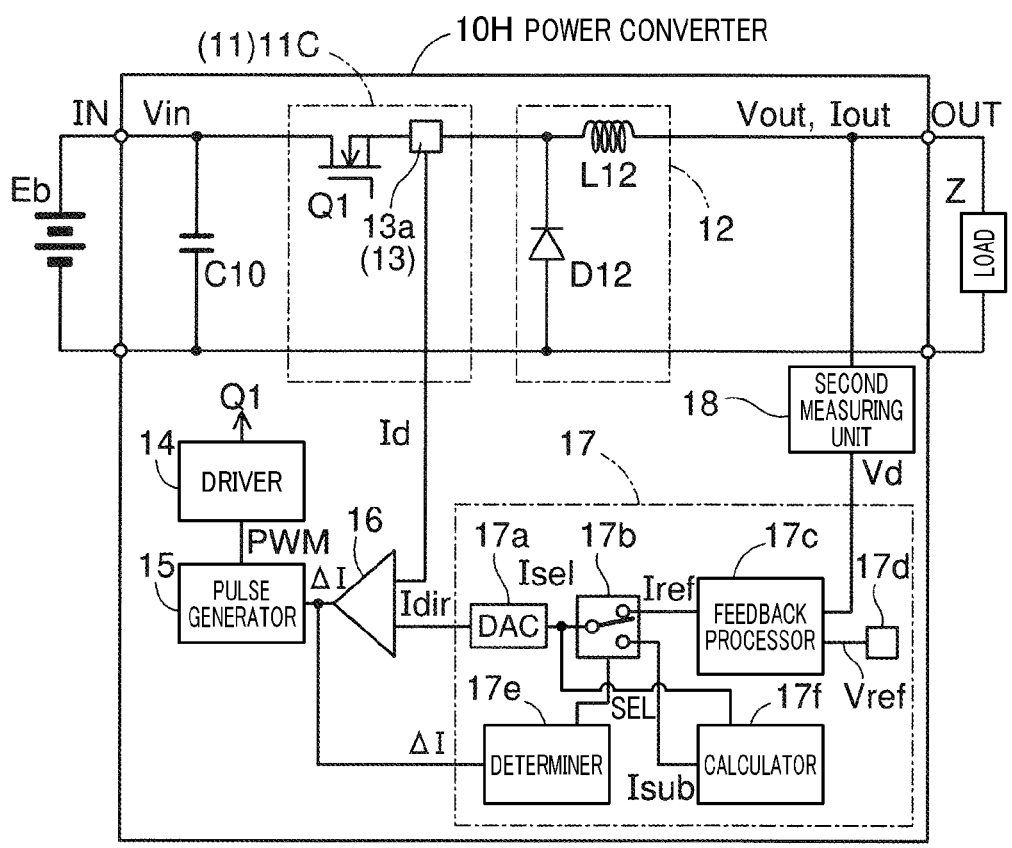
FIG. 19 is a circuit diagram schematically illustrating an example of the overall configuration of a power converter according to a first modification of the first embodiment.

FIG. 19 schematically illustrates a power converter 10H designed as a non-isolated step-down converter including a switch circuit 11C without providing transformers according to a first modification of the first embodiment.

As illustrated in FIG. 19, the switch circuit 11C is comprised of a switching element Q1B having a first terminal, a second terminal, and a conductive path formed therebetween. The first terminal of the switching element Q1B is connected to the positive input terminal IN via the positive DC input line. The second terminal of the switching element Q1B is connected to a rectifying and smoothing circuit 12A via the first measuring unit 13a. The switching element Q1B has a control terminal connected to the driver 14. As described above, a drive signal sent from the driver 14 and input to the control terminal of the switching element Q1B opens or closes the conductive path thereof, that is, turns on or off the switching element Q1B. The rectifying and smoothing circuit 12A is comprised of a diode 12 connected between the output of the first measuring unit 13a, i.e. the output of the switching element Q1B and the negative DC input line. The rectifying and smoothing circuit 12A is also comprised of a coil L12 having one end connected to the cathode of the diode 12, and the other end connected to the positive output terminal OUT.

Specifically, turn-on and turn-off operations of the switching element Q1B by the driver 14 convert the DC voltage input to the switch circuit 11C into an AC voltage in the same manner as the first embodiment. The AC voltage is input to the rectifying and smoothing circuit 12A, and the rectifying and smoothing circuit 12A rectifies and smoothes the AC voltage, thus generating a DC voltage lower in level than the input DC voltage. Thus, the power converter 10H can achieve substantially the same effects achieved by the power converter 10 according to the first embodiment.

Figure 20:
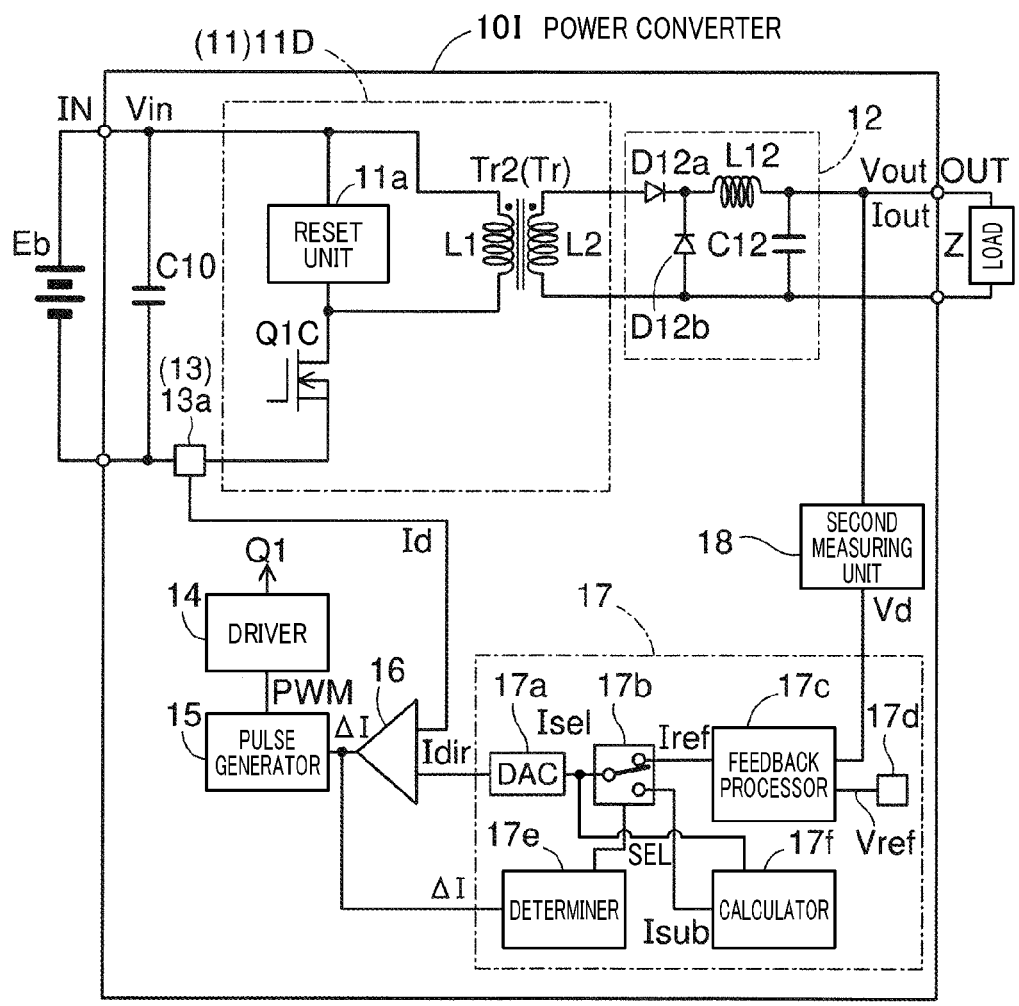
FIG. 20 is a circuit diagram schematically illustrating an example of the overall configuration of a power converter according to a second modification of the first embodiment.

FIG. 20 schematically illustrates a power converter 10I designed as a feedforward converter including a switch circuit 11D according to a second modification of the first embodiment.

As illustrated in FIG. 20, the switch circuit 11D is comprised of a reset unit 11a having a pair of first and second terminals, and a switching element Q1C having a first terminal, a second terminal, and a conductive path formed therebetween. The first terminal of the switching element Q1C is connected to the second terminal of the reset unit 11a, and the first terminal of the reset unit 11a is connected to the positive input terminal IN via the positive DC input line. The second terminal of the switching element Q1B is connected to the negative input terminal IN via the negative DC input line on which the first measuring unit 13a is provided. That is, the reset unit 11a and the switching element Q1C is connected in series. The switching element Q1C has a control terminal connected to the driver 14. As described above, a drive signal sent from the driver 14 and input to the control terminal of the switching element Q1C opens or closes the conductive path thereof, that is, turns on or off the switching element Q1C.

The switch circuit 11D is also comprised of a transformer Tr2 including a primary winding L1 and a secondary winding L2. The primary winding L1 is connected to be parallel to the reset unit 11a. The secondary winding L2 has a first end and a second end opposite thereto. The first end of the secondary winding L2 is connected to the anode of the first diode 12a, and the second end thereof is connected to the negative output terminal OUT. The second diode 12b is connected in parallel to the secondary winding L2. The cathode of the first diode 12a and the cathode of the second diode 12b are commonly connected to one end of the coil L12. The other end of the coil L12 is connected to the positive output terminal OUT. The capacitor C12 is connected between the coil L12 and the load Z to be in parallel to the load Z.

Specifically, turn-on and turn-off operations of the switching element Q1C by the driver 14 convert the DC voltage input to the switch circuit 11D into an AC voltage in the same manner as the first embodiment. The AC voltage is input to the rectifying and smoothing circuit 12, and the rectifying and smoothing circuit 12 rectifies and smoothes the AC voltage, thus generating a DC voltage different from the input DC voltage.

Thus, the power converter 10I can achieve substantially the same effects achieved by the power converter 10 according to the first embodiment.

Figure 21:
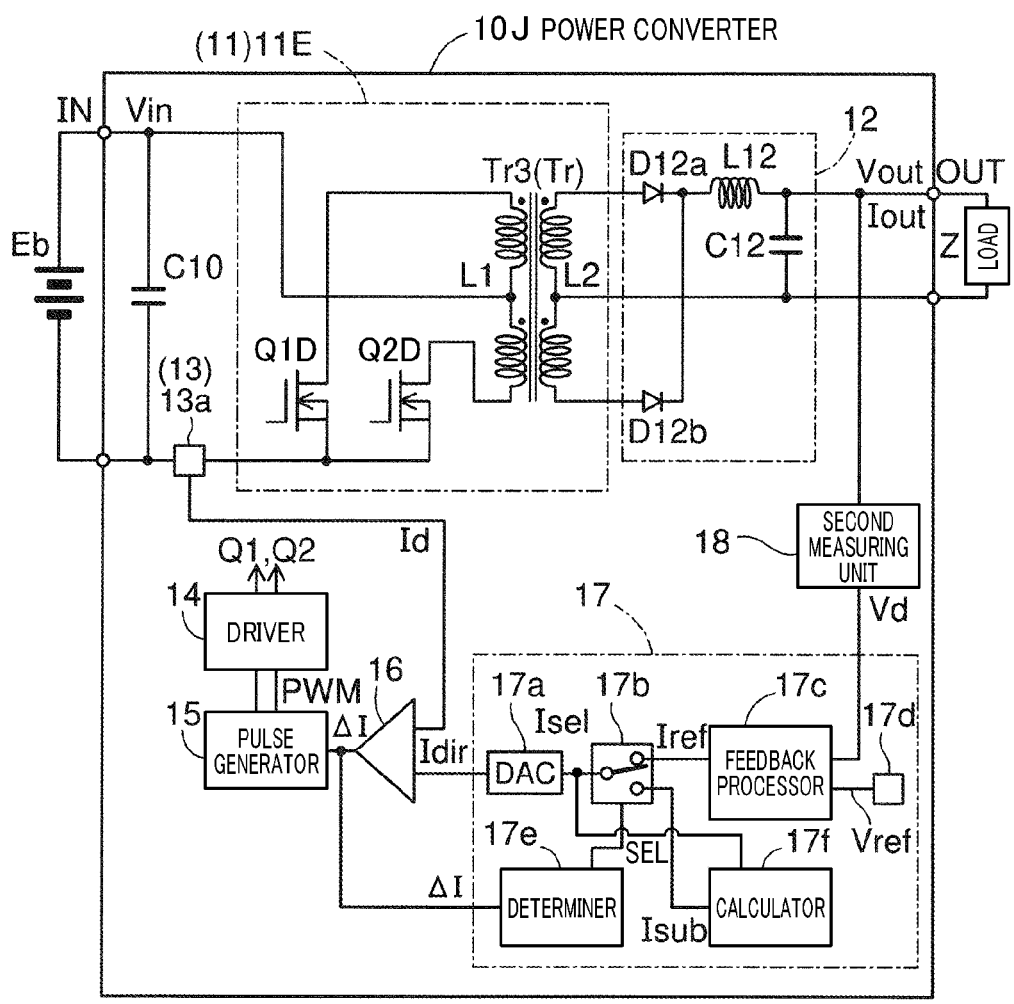
FIG. 21 is a circuit diagram schematically illustrating an example of the overall configuration of a power converter according to a third modification of the first embodiment.

FIG. 21 schematically illustrates a power converter 10J designed as a push-pull converter including a switch circuit 11E according to a third modification of the first embodiment.

As illustrated in FIG. 21, the switch circuit 11E is comprised of a pair of switching elements Q1D, Q2D, and a transformer Tr3. Each of the switching elements Q1D and Q2D has a first terminal, a second terminal, and a conductive path formed therebetween. The transformer Tr3 is comprised of a primary winding L1 and a secondary winding L2 each having a center tap. The positive input terminal IN is connected to the center tap of the primary winding L1 via the positive DC input line, and the negative input terminal IN is connected to the first terminal of each of the switching elements Q1D and Q2D. One end of the primary winding L1 is connected to the second terminal of the switching element Q1D, and the other end of the primary winding L1 is connected to the second terminal of the switching element Q2D. Each of the switching elements Q1D and Q2D has a control terminal connected to the driver 14. As described above, drive signals sent from the driver 14 and input to the control terminals of the respective switching elements Q1D and Q2D complementarily close their conductive paths, that is, complementarily turn on the switching elements Q1D and Q2D.

Specifically, turn-on and turn-off operations of the switching elements Q1D and Q2D by the driver 14 convert the DC voltage input to the switch circuit 11E into an AC voltage in the same manner as the first embodiment. The AC voltage is input to the rectifying and smoothing circuit 12, and the rectifying and smoothing circuit 12 rectifies and smoothes the AC voltage, thus generating a DC voltage different from the input DC voltage.

Thus, the power converter 10J can achieve substantially the same effects achieved by the power converter 10 according to the first embodiment.

In each of the first to sixth embodiments, the switch circuit 11A including the transformer Tr1 whose secondary winding L2 has a center tap is used. However, as described above, the switch circuit 11A can be designed as another switching circuit, such as the switch circuit 11D illustrated in FIG. 20, including a transformer whose primary and secondary windings have no center taps. In addition, the switch circuit 11A can be designed as a further switching circuit, such as the switch circuit 11E illustrated in FIG. 21, including a transformer whose primary and secondary windings each have a center tap. Although illustration is omitted, the switch circuit 11A can be designed as a still further switching circuit including a transformer whose primary winding has a center tap. Each of the transformers of the aforementioned modified switch circuits is commonly configured to convert an AC voltage applied to the primary winding into an AC voltage induced across the secondary winding; the magnitude of the AC voltage induced across the secondary winding is determined based on the turns ratio of the primary and secondary windings. Thus, even if a power converter according to one of the first to sixth embodiments uses one of the aforementioned modified switch circuits, it is possible to achieve the same affects achieved by the power converter according to one of the first to sixth embodiments.

In each of the first to sixth embodiments, the secondary winding L2 of the transformer Tr1 has a center tap, and the first and second diodes 12a and 12b are connected to respective both ends of the secondary winding L2. This configuration causes the corresponding power converter to full-wave rectify an AC voltage induced across the secondary winding L2, thus generating a DC voltage. If the secondary winding L2 has no center taps, as illustrated in FIG. 20, the first and second diodes 12a and 12b are connected to respective both ends of the secondary winding L2, which permits an AC voltage induced across the secondary winding L2 to be full-wave rectified. Of course, a power converter according to one of the first to sixth embodiments can be designed to half-wave rectify an AC voltage induced across the secondary winding L2. Even if a power converter according to one of the first to sixth embodiments is designed to half-wave rectify an AC voltage induced across the secondary winding L2, it is possible to achieve the same affects achieved by the power converter according to one of the first to sixth embodiments.

In each of the first to seventh embodiments, the corresponding power converter is designed to control the switching elements based on the results of comparison between a value Id of an input current to the corresponding switch circuit, measured by the first measuring unit 13a, and the target current value. However, the present disclosure is not limited thereto.

Figure 22:
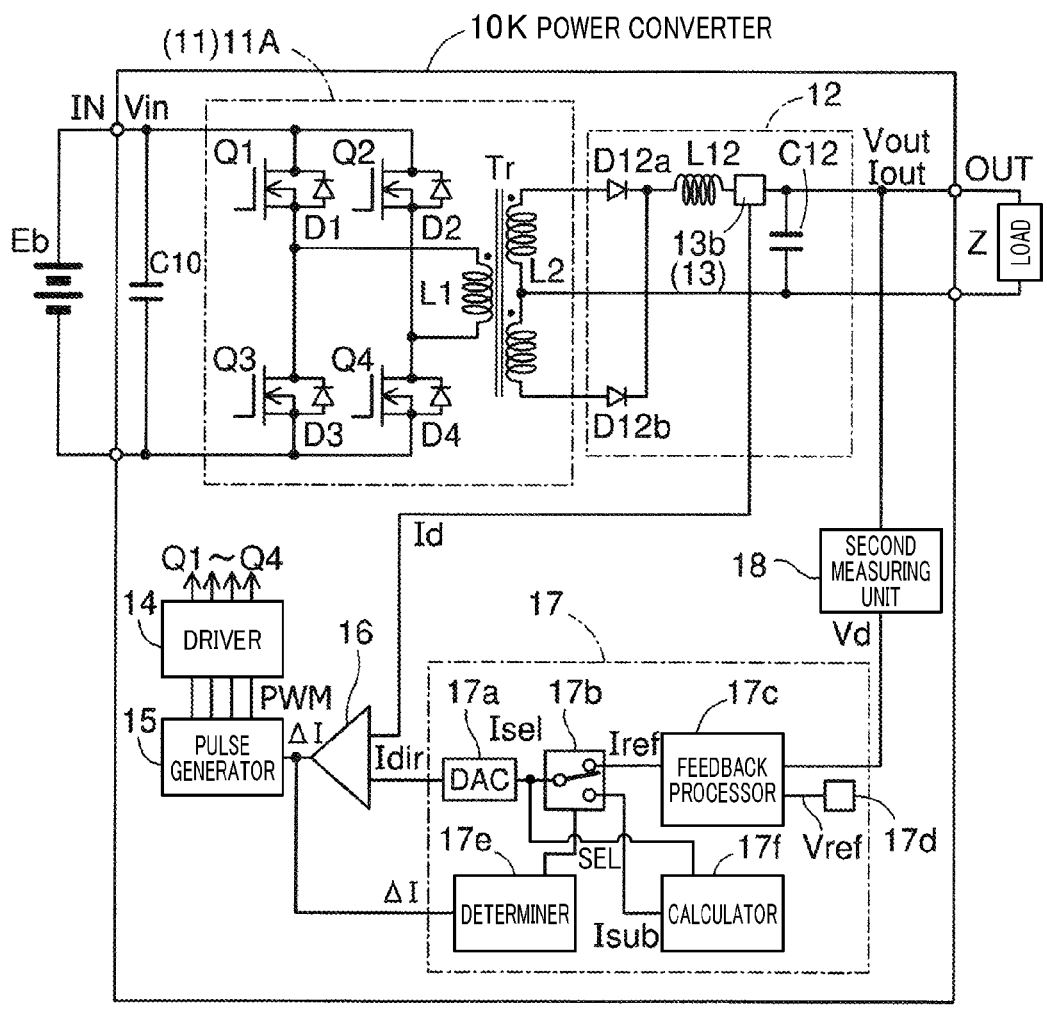
FIG. 22 is a circuit diagram schematically illustrating an example of the overall configuration of a power converter according to a first exemplary modification of the first embodiment.

Specifically, as illustrated in FIG. 22, a power converter 10K according to a first exemplary modification of, for example, the first embodiment can be provided with, in place of the first measuring unit 13a, a third measuring unit 13b located at, for example, the downstream of the coil L12. The third measuring unit 13b is operative to measure a value of output current Iout flowing through the coil L12; the output current Iout depends on the input current to the switching circuit 11A.

Then, the deviation calculator 16 can be configured to compare the measured output-current value Iout with a target current value Idir sent from the feedback unit 17, thus calculating the current deviation ΔI between the measured output-current value Iout and the target current value Idir.

In each of the first to seventh embodiments, the corresponding power converter according to a second exemplary modification can be provided with the third measuring unit 13b illustrated in FIG. 22 in addition to the first measuring unit 13a.

That is, the deviation calculator 16 can be configured to:
select one of the measured input-current value Id and the measured output-current value Iout; and
compare a target current value Idir sent from the feedback unit 17 with the selected one of the measured input-current value Id and the measured output-current value Iout, thus calculating the current deviation ΔI between the target current value Idir with the selected one of the measured input-current value Id and the measured output-current value Iout.

In the second exemplary modification, the deviation calculator 16 can select one of the measured input-current value Id and the measured output-current value Iout; one of the measured input-current value Id and the measured output-current value Iout is higher or lower than the other thereof. In the second exemplary modification, the deviation calculator 16 can select a local peak in the measured input-current value Id and the measured output-current value Iout while a corresponding pair of switching elements is on.

In the second exemplary modification, the deviation calculator 16 can select:
a given value of the measured values Id of the input current to the switch circuit 11A while a corresponding pair of switching elements is on; and
a given value of the measured values Iout of the output current while the corresponding pair of switching elements is on.

Then, the deviation calculator 16 can calculate the average value of the selected value of the measured values Id of the input current and the selected value of the measured values Iout of the output current. Then, the deviation calculator 16 can compare a target current value Idir sent from the feedback unit 17 with the average value, thus calculating the current deviation ΔI between the target current value Idir with the average value.

Because the output current Iout depends on the input current to the switch circuit 11A, each of the first and second exemplary modifications can achieve substantially the same effects as those achieved by the corresponding one of the first to seventh embodiments.

In each of the first to seventh embodiments, the feedback processor 17c is operative to calculate a difference Δ between the measured value Vd of the output voltage Vout and the command voltage value Vref, but the present disclosure is not limited thereto.

Specifically, in a third exemplary modification, in place of the second measuring unit 18, the third measuring unit 13b can be provided as illustrated in FIG. 22.

The feedback processor 17c according to the third exemplary modification can be operative to calculate a difference Δ between a value of the output current Tout measured by the third measuring unit 13b illustrated in FIG. 22 and a target current. The target current value can be for example set to a value required for the load Z. The corresponding power converter can be provided with a unit for setting the target current value, or can be designed to set the target current value based on signals and/or data supplied from an external unit, such as an external ECU or an external computer.

This configuration achieves the same effects as those achieved by the power converter 10 according to the first embodiment. That is, this configuration prevents the transformer Tr from being magnetically biased due to a transient increase of DC components caused by the rapid increase of the input voltage Vin, making it possible to prevent the occurrence of an overcurrent due to the magnetically biased transformer Tr.

In the fifth embodiment, the calculator 17f is configured to calculate, as a subtracted current value Isub, an average current value Iave based on peaks in the measured input-current values sampled by the peak detector 17g for each switching cycle Csw. The present disclosure is however not limited to the configuration.

Specifically, the calculator 17f according to the fifth embodiment can be configured to calculate another value based on the sampled peaks as a subtracted current value Isub.

For example, the calculator 17f can be configured to select the highest peak or the lowest peak in the sampled peaks as a subtracted current value Isub. The calculator 17f can also be configured to assign the sampled peaks into a predetermined equation, that is a functional formula, thus calculating a subtracted current value Isub. It is preferable to determine a subtracted current value Isub based on the sampled peaks based on the rating or the purpose of use of the corresponding power converter, or the type of the load Z. This modification can achieve the same effects as those achieved by the power converter according to the fifth embodiment.

In the first to sixth embodiments, the corresponding power converters are each designed as a DC-DC converter, and in the seventh embodiment, the power converter 10G is designed as an inverter. However, power converters according to the present disclosure can be designed as other devices equipped with at least one switching element and an inductive element, such as a transformer or a rotary machine including an inductive core. These power converters are capable of preventing the inductive element from being magnetically biased even if an input voltage rapidly increases from a low-level range. This makes it possible to prevent the occurrence of an overcurrent due to the magnetically biased inductive element.

In the first to sixth embodiments, the corresponding power converters are each equipped with the transformer Tr1 as an inductive element. In addition, in the seventh embodiment, the power converter 10G is designed to convert input power into output power different therefrom, and output the converted power to the rotary machine 20 as an inductive element. However, the present disclosure is not limited thereto. Specifically, the power converters according to the present disclosure can be each equipped with at least one coil as an inductive element. The power converters can be designed to convert input power into output power different therefrom, and output the converted power to an electric device including at least one coil as an inductive element. These power converters are capable of preventing the coil from being magnetically biased even if an input voltage rapidly increases from a low-level range. This makes it possible to prevent the occurrence of an overcurrent due to the magnetically biased coil.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A power converter comprising:
   a driver that drives a switching element of a switch circuit to convert input power to the switch circuit into output power of the switch circuit;
   a first calculator that calculates a value of a first feedback controlled variable based on a value of an output electrical parameter of the switch circuit indicative of the output power of the switch circuit and a command value for the output electrical parameter;
   a selector that selects, in each cycle, one of the value of the first feedback controlled variable and a value of a second feedback controlled variable as a target value of an input electrical parameter of the switch circuit for a next cycle, the input electrical parameter depending on the input power to the switch circuit;
   a deviation calculator that calculates, in each cycle, a deviation between a value of the input electrical parameter of the switch circuit and the target value selected by the selector in a previous cycle;
   a second calculator that calculates, in each cycle, the value of the second feedback controlled variable such that the value of the second feedback controlled variable approaches the value of the input electrical parameter; and
   a controller that controls, in each cycle, the selector to select one of the value of the first feedback controlled variable and the value of the second feedback controlled variable as the target value for the next cycle according to the deviation calculated by the deviation calculator.

2. The power converter according to claim 1, wherein the controller is configured to:
   determine, in each cycle, whether a polarity of the deviation calculated by the deviation calculator has been reversed at any time during a corresponding cycle; and
   when it is determined that the polarity of the deviation calculated by the deviation calculator has never been reversed during a given cycle, control, in the given cycle, the selector to select the value of the second feedback controlled variable as the target value for the next cycle.

3. The power converter according to claim 1, wherein the controller is configured to control, in each cycle, the selector to select the value of the first feedback controlled variable when a polarity of the deviation calculated by the deviation calculator has been reversed at any time during a corresponding cycle.

4. The power converter according to claim 1, wherein the second calculator subtracts, in each cycle, a first preset value from the target value selected by the selector in a previous cycle, thus determining the value of the second feedback controlled variable.

5. The power converter according to claim 4, wherein:
the controller is configured to determine, in each cycle, whether a polarity of the deviation calculated by the deviation calculator has not been reversed at any time during previous N cycles including the current cycle, and
when it is determined that the polarity of the deviation calculated by the deviation calculator has not been reversed at any time during the previous N cycles including the current cycle, the second calculator subtracts, in the current cycle, a second preset value from the target value selected by the selector in the N-th cycle, thus determining the value of the second feedback controlled variable, the second preset value being higher than the first preset value, the N being an integer equal to 1.

6. The power converter according to claim 1, wherein the switch circuit is comprised of, as the switching element, a pair of a first switching element and a second switching element connected thereto;
the driver turns on the first switching element while the second switching element is off, and turns on the second switching element while the first switching element is off during each switching cycle, the switching cycle being defined as the cycle according to claim 1;
the input electrical parameter comprises a first input current to the first switching element and a second input current to the second switching element; and
the second calculator is configured to:
determine, in each switching cycle, whether a predetermined condition is met based on the first input current and the second input current;
subtract, in each switching cycle, a first preset value from the target value selected by the selector in a previous switching cycle, thus determining the value of the second feedback controlled variable as long as it is determined that the predetermined condition is not met based on the first input current and the second input current; and
subtract, in each switching cycle, a third preset value from the target value selected by the selector in a previous switching cycle, thus determining the value of the second feedback controlled variable when it is determined that the predetermined condition is met based on the first input current and the second input current.

7. The power converter according to claim 1, wherein the controller is configured to determine, in each cycle, whether the deviation calculated by the deviation calculator has been reversed during a corresponding cycle; and
when it is determined that the deviation calculated by the deviation calculator has never been reversed during a given cycle, the second calculator determines a fourth preset value based on the value of the input electrical parameter, and subtracts, in the given cycle, the fourth preset value from the target value selected by the selector in a previous switching cycle, thus determining the value of the second feedback controlled variable.

8. The power converter according to claim 7, wherein the value of the input electrical parameter is input to the switch circuit in plurality during each cycle, and the second calculator determines the fourth preset value based on the plurality of values of the first parameter.

9. The power converter according to claim 4, wherein:
the input electrical parameter varies with time during each cycle so that the input electrical parameter has peaks during a corresponding cycle; and
the second calculator calculates, in each cycle, an average value of the peaks of the input electrical parameter to thereby calculate the first preset value based on the average value.

10. The power converter according to claim 1, wherein:
the second calculator subtracts, in each cycle, a first preset value from the target value selected by the selector in a previous cycle, thus determining the value of the second feedback controlled variable;
the controller is configured to determine, in each cycle, whether a polarity of the deviation calculated by the deviation calculator has not been reversed at any time during previous N cycles including the current cycle,
when it is determined that the polarity of the deviation calculated by the deviation calculator has not been reversed at any time during previous N cycles including the current cycle, the second calculator changing the first preset value to another value.

11. The power converter according to claim 10, wherein:
the input electrical parameter varies with time during each cycle so that the input electrical parameter has peaks during a corresponding cycle; and
the second calculator is configured to change the first preset value to an average value of the peaks of the input electrical parameter.

12. The power converter according to claim 1, wherein the second calculator is configured to:
determine whether a quantity of change of the input electrical parameter per unit time exceeds a predetermined threshold range; and
when it is determined, in a given cycle, that the quantity of change of the input electrical parameter per unit time exceeds the predetermined threshold range, subtract, in the given cycle, a fifth preset value from the target value selected by the selector in a previous cycle, thus determining the value of the second feedback controlled variable.

13. The power converter according to claim 12, wherein the second calculator is configured to determine the fifth preset value based on the quantity of change of the input electrical parameter.

14. The power converter according to claim 1, wherein:
the switch circuit is comprised of, as the switching element, a plurality of switching elements connected in full-bridge configuration; and
the input electrical parameter is an input current to at least one of the plurality of switching elements while the at least one of the switching elements is on.

15. The power converter according to claim 1, wherein:
the switch circuit includes a transformer comprised of a primary winding and a secondary winding magnetically coupled thereto;
the switching element is connected to the primary winding;
the input electrical parameter defines the input power applied to the primary winding; and
the first calculator is configured to calculate the value of the first feedback controlled variable based on the value of the output electrical parameter of the switch circuit indicative of the output power of the switch circuit and the command value for the output electrical parameter, the output electrical parameter defining the output power induced across the secondary winding.

* * * * *